(12) United States Patent
Talebi Fard et al.

(10) Patent No.: US 12,089,093 B2
(45) Date of Patent: *Sep. 10, 2024

(54) HANDOVER FOR CLOSED ACCESS GROUP

(71) Applicant: Ofinno, LLC, Reston, VA (US)

(72) Inventors: Peyman Talebi Fard, Vienna, VA (US); Esmael Hejazi Dinan, McLean, VA (US); Jinsook Ryu, Oakton, VA (US); Kyungmin Park, Vienna, VA (US); Weihua Qiao, Herndon, VA (US); Jayshree Bharatia, Plano, TX (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,543

(22) Filed: Oct. 17, 2022

(65) Prior Publication Data

US 2023/0041912 A1  Feb. 9, 2023

Related U.S. Application Data

(63) Continuation of application No. 16/826,793, filed on Mar. 23, 2020, now Pat. No. 11,490,291.

(Continued)

(51) Int. Cl.
*H04W 36/00* (2009.01)
*H04W 36/08* (2009.01)
*H04W 92/20* (2009.01)

(52) U.S. Cl.
CPC ............ *H04W 36/0016* (2013.01); *H04W 36/0033* (2013.01); *H04W 36/08* (2013.01); *H04W 92/20* (2013.01)

(58) Field of Classification Search
CPC ......... H04W 36/0016; H04W 36/0033; H04W 36/08; H04W 92/20
See application file for complete search history.

(56) References Cited

U.S. PATENT DOCUMENTS

| 8,380,201 B2* | 2/2013 | Takahashi ............ H04W 36/08 370/332 |
| 2012/0236828 A1 | 9/2012 | Hapsari et al. |

(Continued)

FOREIGN PATENT DOCUMENTS

| CA | 2797422 A1 | 11/2011 | |
| CA | 2797422 C * | 5/2018 | ......... G02B 27/0101 |

(Continued)

OTHER PUBLICATIONS

Translation of CN110536483 A (Year: 2019).*

(Continued)

*Primary Examiner* — Nishant Divecha
(74) *Attorney, Agent, or Firm* — Peter Flanagan; Kavon Nasabzadeh; Philip R. Smith

(57) ABSTRACT

A first base station receives, from a second base station, a next generation radio access network (NG-RAN) configuration update message including a neighbor information evolved universal mobile telecommunications system terrestrial radio access (E-UTRA) information element (IE), a served cells new radio (NR) to add IE, a slice identifier of a first network slice supported by a cell of the second base station, and a second served cell information NR IE indicating that the cell of the second base station is in a second closed access group (CAG). The first base station sends, to the second base station, an NG-RAN configuration update acknowledge message including a first served cell information NR IE indicating that a cell of the first base station is in a first CAG. The first base station sends, to the second base station, a handover request message to the cell of the second base station.

20 Claims, 34 Drawing Sheets

Related U.S. Application Data

(60) Provisional application No. 62/825,179, filed on Mar. 28, 2019.

(56) References Cited

U.S. PATENT DOCUMENTS

| | | |
|---|---|---|
| 2013/0079021 A1 | 3/2013 | Centonza |
| 2015/0056989 A1 | 2/2015 | Lee et al. |
| 2015/0079972 A1 | 3/2015 | Drazynski et al. |
| 2018/0352491 A1 | 12/2018 | Shih et al. |
| 2019/0158360 A1 | 5/2019 | Xu et al. |
| 2019/0357131 A1* | 11/2019 | Sivavakeesar ........ H04W 68/02 |
| 2020/0037214 A1 | 1/2020 | Jin et al. |
| 2020/0053619 A1 | 2/2020 | Sartori et al. |
| 2020/0154326 A1 | 5/2020 | Deenoo et al. |
| 2020/0228968 A1 | 7/2020 | Bernardos et al. |
| 2020/0267639 A1 | 8/2020 | Wei et al. |
| 2020/0305001 A1 | 9/2020 | Li et al. |
| 2020/0367109 A1 | 11/2020 | Chen et al. |
| 2021/0029601 A1 | 1/2021 | Jin et al. |
| 2021/0068073 A1 | 3/2021 | Sivavakeesar et al. |

FOREIGN PATENT DOCUMENTS

| | | | | |
|---|---|---|---|---|
| EP | 2645754 A1 * | 10/2013 | ............ | H04W 12/08 |
| WO | 2018/084646 A1 | 5/2018 | | |

OTHER PUBLICATIONS

RAN2 #105 NPN; 3GPP TSG-RAN WG2 Meeting #105 Athens, Greece, Feb. 25-Mar. 1, 2019; 11.13 Other NR Rel-16 WIs/SLS; NPN (related to LS R2-1900072 from SA2).
3GPP TS 22.261 V16.6.0 (Dec. 2018); Technical Specification; 3rd Generation Partnership Project; Technical Specification Group Services and System Aspects; Service requirements for the 5G system; Stage 1; (Release 16).
3GPP TS 23.501 V15.4.0 (Dec. 2018); Technical Specification; 3rd Generation Partnership Project; Technical Specification Group Services and System Aspects; System Architecture for the 5G System; Stage 2; (Release 15).
3GPP TS 23.502 V15.4.1 (Jan. 2019); Technical Specification; 3rd Generation Partnership Project; Technical Specification Group Services and System Aspects; Procedures for the 5G System; Stage 2; (Release 15).
3GPP TR 23.734 V16.0.0 (Dec. 2018); Technical Report; 3rd Generation Partnership Project; Technical Specification Group Services and System Aspects; Study on enhancement of 5GS for Vertical and LAN Services (Release 16).
3GPP TS 24.501 V15.2.1 (Jan. 2019); Technical Specification; 3rd Generation Partnership Project; Technical Specification Group Core Network and Terminals; Non-Access-Stratum (NAS) protocol for 5G System (5GS); Stage 3; (Release 15).
3GPP TS 36.423 V15.4.0 (Dec. 2018); Technical Specification; 3rd Generation Partnership Project; Technical Specification Group Radio Access Network; Evolved Universal Terrestrial Radio Access Network(E-UTRAN); X2 application protocol (X2AP); (Release 15).
3GPP TS 38.300 V15.4.0 (Dec. 2018); Technical Specification; 3rd Generation Partnership Project; Technical Specification Group Radio Access Network; NR; NR and NG-RAN Overall Description; Stage 2; (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
3GPP TS 38.413 V15.2.0 (Dec. 2018); Technical Specification; 3rd Generation Partnership Project; Technical Specification Group Radio Access Network; NG-RAN; NG Application Protocol (NGAP); (Release 15).
3GPP TS 38.423 V15.2.0 (Dec. 2018); Technical Specification; 3rd Generation Partnership Project; Technical Specification Group Radio Access Network; NG-RAN; Xn application protocol (XnAP); (Release 15).
R2-1900071_S2-1813392; 3GPP TSG RAN WG2#105; Athens, Greece, Feb. 25-Mar. 1, 2019; SA WG2 Meeting #S2-129bisS2-1813392; Nov. 26-30, 2018, West Palm Beach, USA(revision of S2-181xxxx).
R2-1900072_S2-1813393; 3GPP TSG RAN WG2#105; Athens, Greece, Feb. 25-Mar. 1, 2019; SA WG2 Meeting #S2-129bisS2-1813393; Nov. 26-30, 2018, West Palm Beach, USA(revision of S2-181xxxx).
R2-1900408—RAN2 aspects of Non-Public Networks (NPN); 3GPP TSG-RAN WG2 #105Tdoc ; Athens, Greece, Feb. 25-Mar. 1, 2019; Agenda Item: 11.7.2.4; Source: Ericsson; Title:RAN2-aspects of Non-Public Networks (NPN).
R2-1900409—Draft Reply LS on RAN Impact analysis due to NPN; 3GPP TSG-RAN WG2#105Tdoc ; Athens, Greece, Feb. 25-Mar. 1, 2019; Title:Draft Reply LS on RAN Impact analysis due to NPN; Release:Release 16.
R2-1900760—NPN_Solution1_v02.DOCX3GPP TSG RAN WG2 Meeting #105 ; Athens, Greece, Feb. 25-Mar. 1, 2019; Agenda Item: 11.13; Source: Intel Corporation; Title: RAN2 impact on Non-Public Network Deployment using SNPN.
R2-1900761—NPN_Solution2_v02.DOCX3GPP TSG RAN WG2 Meeting #105; Athens, Greece, Feb. 25-Mar. 1, 2019 Agenda Item:11.13; Source: Intel Corporation; Title:RAN2 impact on Non-Public Network Deployment using CAG.
R2-1901444 Impact analysis of NPN support; 3GPP TSG-RAN WG2 #105; Athens, Greece, Feb. 25-Mar. 1, 2019; Agenda Item: 11.7.1; Source: Huawei, HiSilicon; Title: Impact analysis of NPN support.
R2-1901445 Reply LS on RAN Impact analysis due to NPN; 3GPP TSG-RAN WG2 #105; Athens, Greece, Feb. 25-Mar. 1, 2019; Title:[Draft] Reply LS on RAN Impact analysis due to NPN; Response to:S2-1813393; Release:Rel-16.
R2-1901805 RAN2 impacts of NPN; 3GPP TSG-RAN WG2 Meeting #105; Athens, Greece, Feb. 25-Mar. 1, 2019; Agenda item:11.7.1; Source: Qualcomm Incorporated; Title: RAN2 impacts of Non-public Networks (NPN) work In SA2.
R2-1902716 Reply LS on RAN Impact analysis due to NPN; 3GPP TSG-RAN WG2 #105; Athens, Greece, Feb. 25-Mar. 1, 2019; Title:Reply LS on RAN Impact analysis due to NPN; Response to:R2-1900072/S2-1813393; Release:Rel-16.
S2-1901576_NPN-23502; 3GPP TSG-SA WG2 Meeting #131 S2-1901576; Feb. 25-Mar. 1, 2019, Tenerife, Spain; CR-Form-v11.4 Change Request.
S2-1901612-DP-manipulations-on-White-list; 3GPP TSG-SA WG2 Meeting #131; 2 Tenerife (Spain), Feb. 25-Mar. 1, 2019; Source:OPPO; Title:Discussion on update of White/Allowed List when NW rejects UE on CAG access attempt; Agenda item:6.15.3—Vertical_LAN; Document for: Discussion and action.
S2-1901613-CR-23501-additions-to-S2-1901391-on-CAG-list; 3GPP TSG-SA WG2 Meeting #131; 3 Tenerife (Spain), Feb. 25-Mar. 1, 2019; CR-Form-v11.1; Change Request.
S2-1901646; SA WG2 Meeting #131; 6 Feb. 25-Mar. 1, 2019, Tenerife, Spain(revision of S2-19xxxx); Source: NICT; Title: FS_Vertical_LAN: Proposed solution to EN on the list of NIDs per PLMN ID per cell for stand-alone NPN; Document for: Approval.
S2-1901764_was_1901329_was_S2-1901109_was_S2-1900061_v3; 3GPP TSG-SA2 Meeting #131S2-1901764; Tenerife, Spain, Feb. 25, 2019-Mar. 1, 2019; CR-Form-v11.4; Change Request.
S2-1901953_SNPN update; SA WG2 Meeting #131; 3 Feb. 25-Mar. Mar. 1, 2019, Santa Cruz—Tenerife(revision of S2-19xxxxx); Source:Samsung; Title:update on Standalone NPN description; Document for:Approval ; Agenda Item:6.15.3.
S2-1901956_nonstandaloneNPN; SA WG2 Meeting #131; 6 Feb. 25-Mar. 1, 2019, Santa Cruz—Tenerife (revision of S2-19xxxxx); Source:Samsung; Title:Update on non-standalone NPN description; Document for:Approval; Agenda Item:6.15.3.
S2-1902001 Discussion and proposal on the relation between CAG and slice; 3GPP TSG-SA WG2 Meeting #131; 1 Feb. 25-Mar. Mar. 1, 2019, Tenerife, Spain(revision of S2-19xxxxx); Source:ZTE;

(56) References Cited

OTHER PUBLICATIONS

Title: Discussion and proposal on the relation between CAG and slice; Document for:Agreement; Agenda Item:6.15.3.
S2-1902017; SA WG2 Meeting #131; 7 Feb. 25-Mar. 1, 2019, Santa Cruz, Tenerife, Spain; Source:vivo, Charter Communications, Orange, China Telecom, China Unicom; Title:Discussion on the QoS differentiation issue when accessing to PLMN services via SNPN and vice versa; Document for Approval; Agenda Item:6.15.
S2-1902675_was01574_was1391_VLAN-23501-CAG_rev2; 3GPP TSG-SA WG2 Meeting #131 ; 5 Feb. 25-Mar. 1, 2019, Tenerife, Spain[merge of S2-1901574, 1613, 1956]; CR-Form-v11.1; Change Request.
S2-1902677_was01576_NPN-23502_rev3; 3GPP TSG-SA WG2 Meeting #131 S2-1902677; Feb. 25-Mar. 1, 2019, Tenerife, Spain; CR-Form-v11.4;Change Request.
S2-1902810_was02676_was01575_CAG-23502; 3GPP TSG-SA WG2 Meeting #131 S2-1902810; Feb. 25-Mar. 1, 2019, Tenerife, Spain; CR-Form-v11.4; Change Request.
S2-1902811; 3GPP TSG-SA2 Meeting #131; 1 Feb. 25-Mar. 1, 2019, Santa Cruz, Tenerife, Spain; CR-Form-v11.2; Change Request.
S2-1902812_was_S2-1902808_was_S2-1902674_was_S2-1902101_v4; 3GPP TSG-SA2 Meeting #131S2-1902812; Santa Cruz—Tenerife, Spain, Feb. 25, 2019-Mar. 1, 2019; CR-Form-v11.4; Change Request.
S2-1902898_was02809_was02675_was01574_was1391_VLAN-23501-CAG; 3GPP TSG-SA WG2 Meeting #131 ; Feb. 25-Mar. 1, 2019, Tenerife, Spain[rev of S2-1902809]; CR-Form-v11.1; Change Request.
ETSI TS 136 423 v11.2.0 published Oct. 2012, retrieved from https://www.etsi.org/deliver/etsi_ts/136400_136499/136423/11.02.00_60/ts_ 136423v110200p.pdf (Year: 2012).
S2-1901391; 3GPP TSG-SA WG2 Meeting #130; Jan. 21-25, 2019, Kochi, India; CR-Form-v11.1; Change Request; 23.501 CR 0757; rev 3; Current version: 15.4.0; Title: Introducing support for Non-Public Networks.
S2-1901573; SA WG2 Meeting #S2-131; Feb. 25-Mar. 1, 2019, Tenerife, Spain; Source: Ericsson, Nokia, Nokia Shanghai Bell, AT Title: Resolution of ENs for CAG; Document for: Discussion; Agenda Item: 6.15.3; Work Item / Release: Vertical_LAN/Rel-16.
S2-1902100; Sa WG2 Meeting S2#131; Feb. 25-Mar. 1, 2019, Tenerife, Spain; Source: Qualcomm Incorporated; Title: Resolution of Editor's notes for non-public networks; Document for: Discussion; Agenda Item: 6.15.3; Work Item / Release: Vertical_LAN/Rel-16.
S2-1902108; 3GPP TSG-SA WG2 Meeting #130; Jan. 8, 2019, Kochi, India; CR-Form-v11.1; Change Request; 23.501 CR 0757; rev 5; Current version: 15.4.0; Title: Introducing support for Non-Public Networks.

* cited by examiner

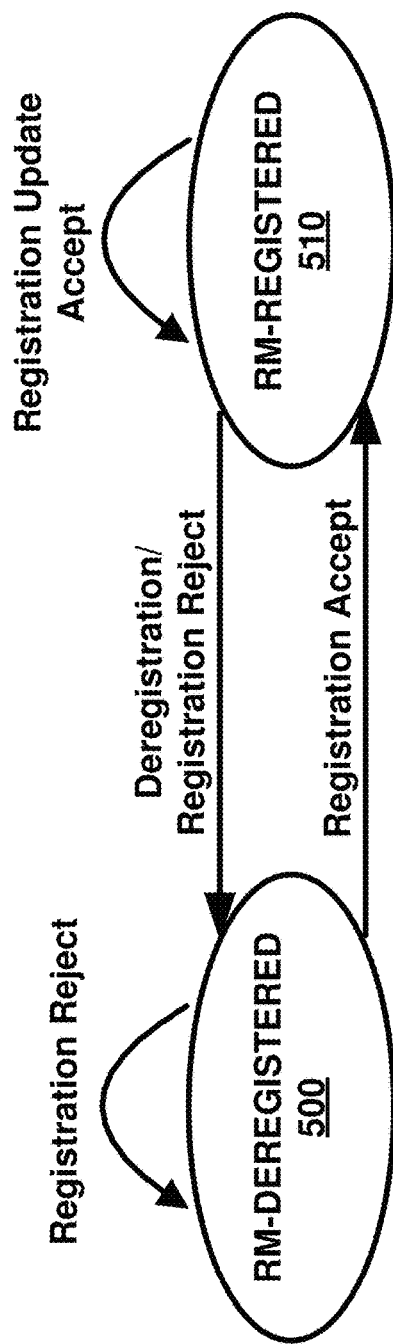
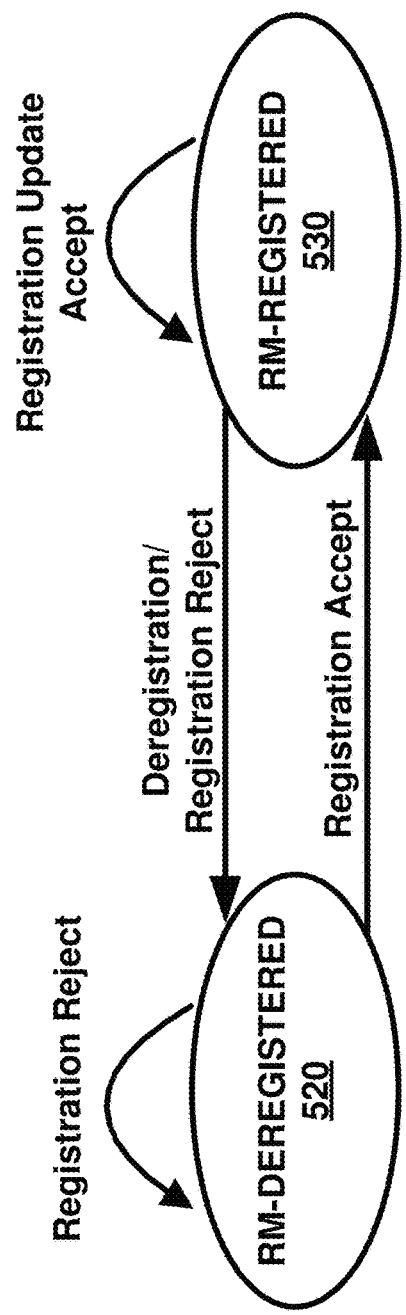

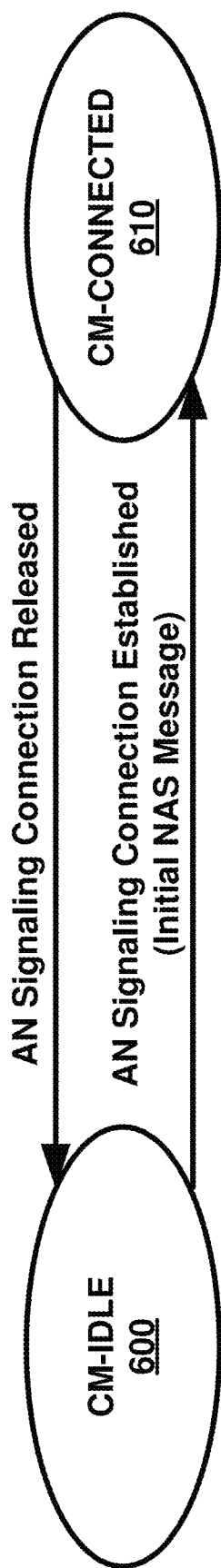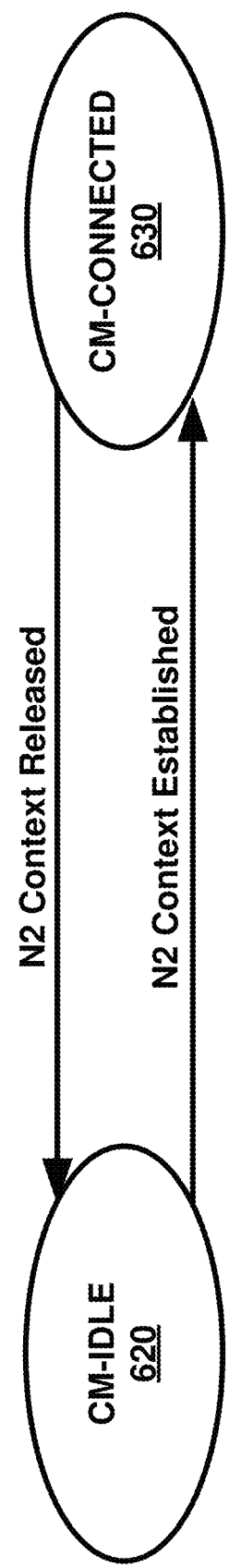

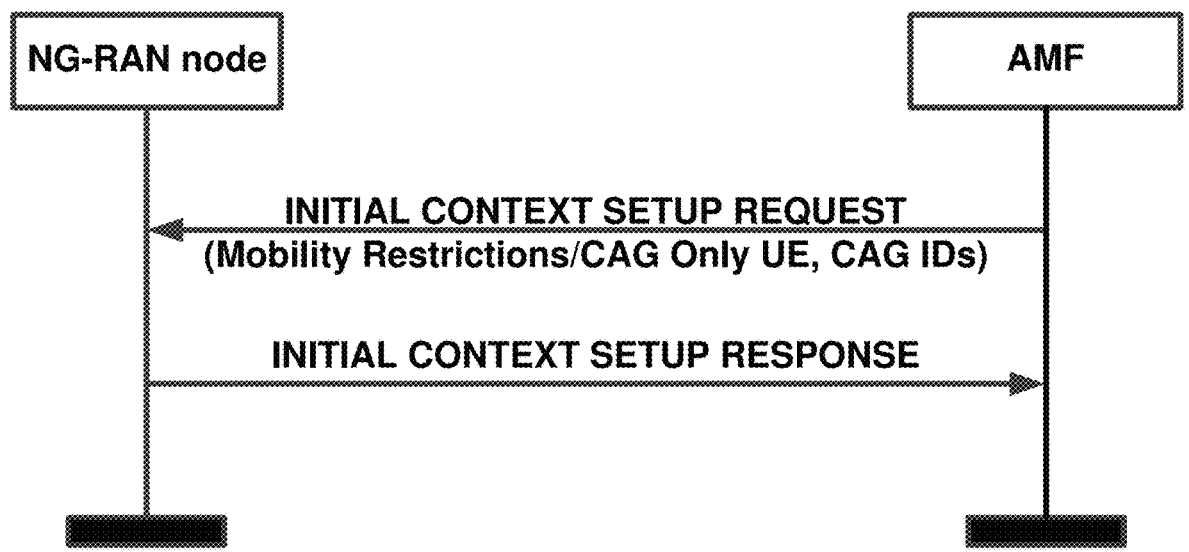
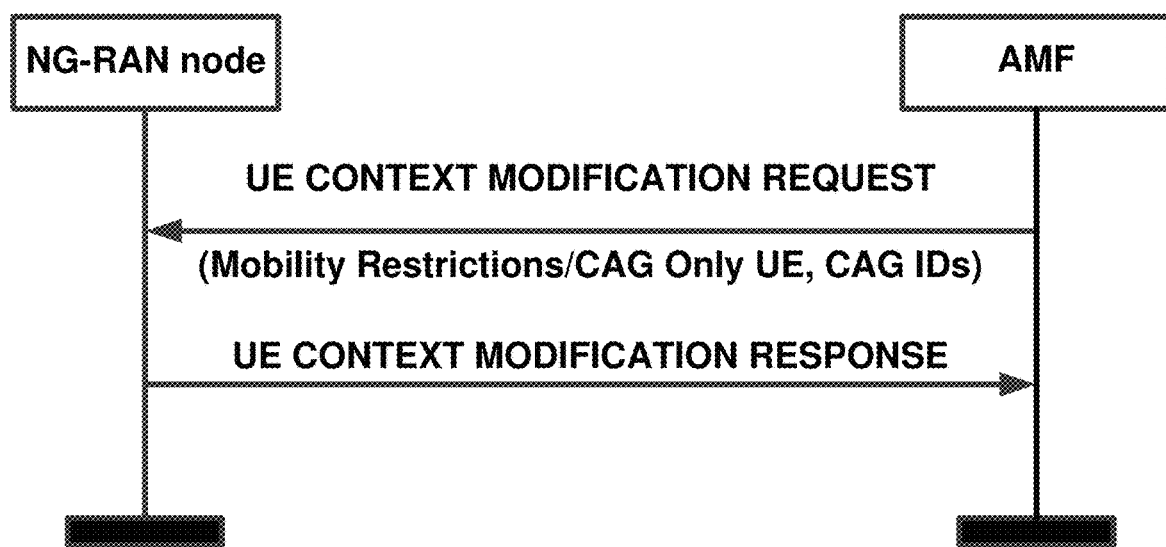
FIG. 18

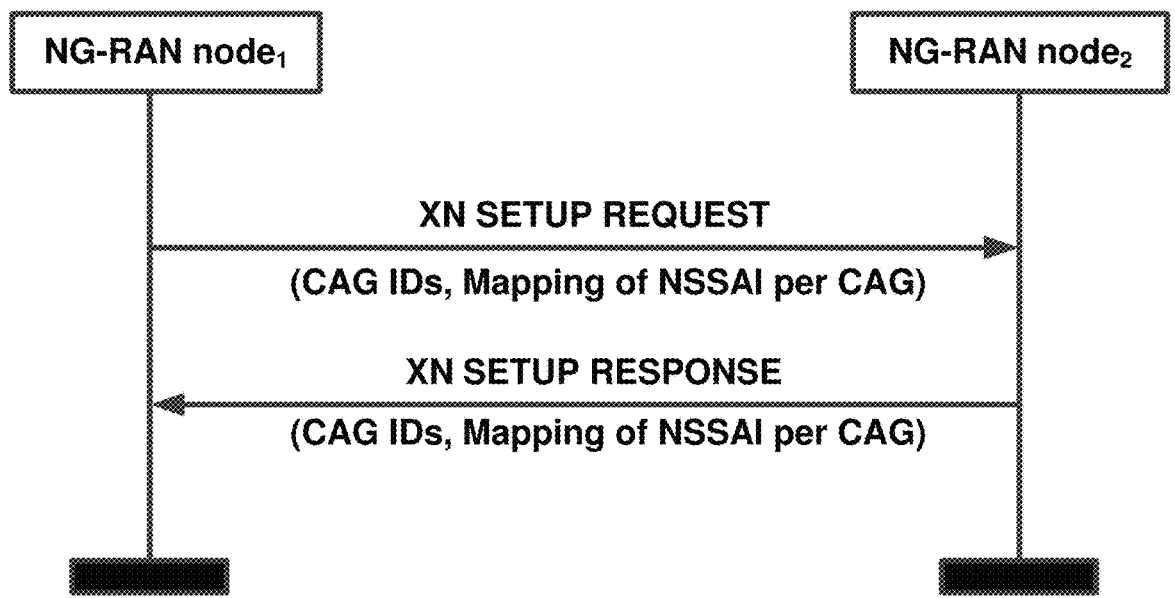
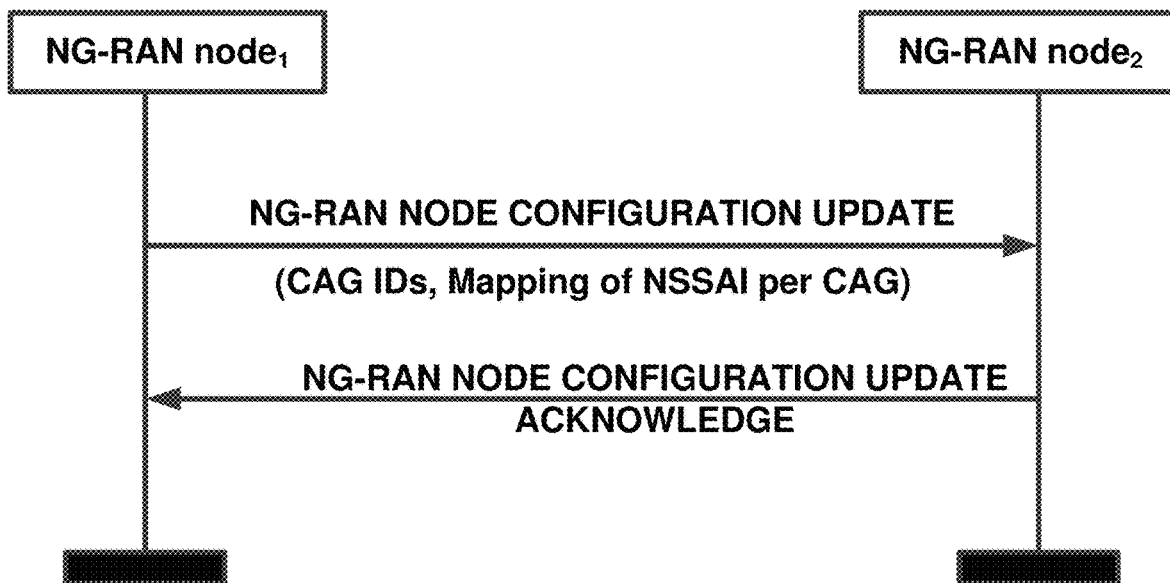
FIG. 19

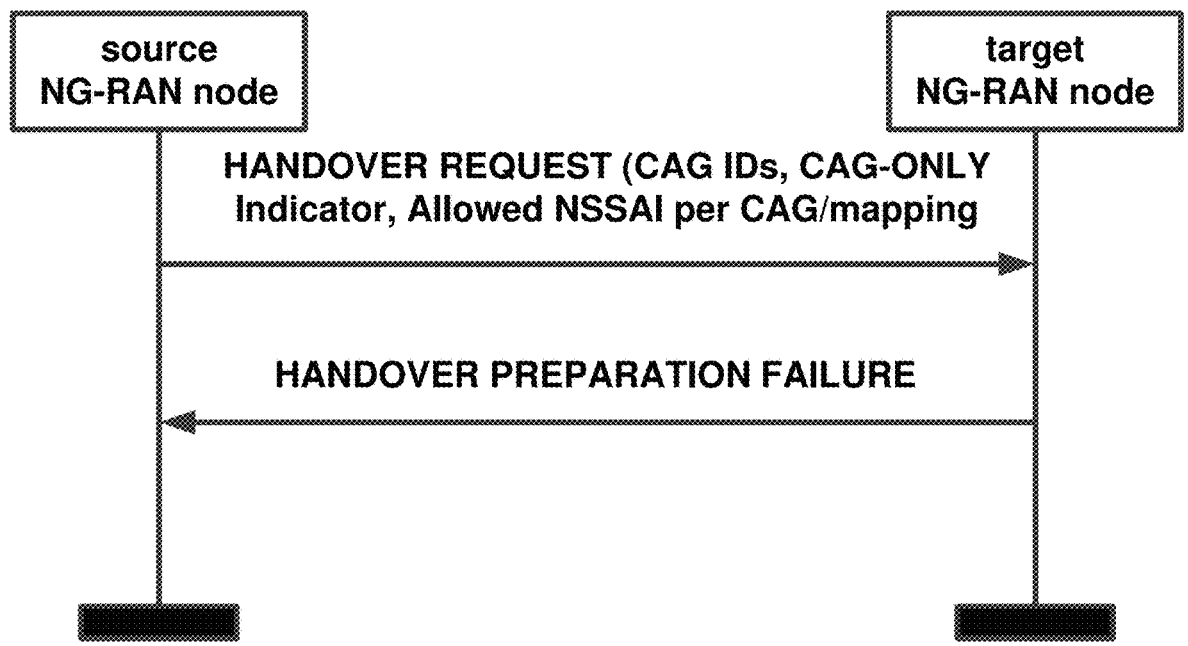
FIG. 20

SENDING, BY A TARGET BASE STATION TO A SOURCE BASE STATION, A CONFIGURATION SETUP MESSAGE COMPRISING A LIST OF CLOSED ACCESS GROUP IDENTIFIERS THAT ONE OR MORE CELLS OF THE TARGET BASE STATION SUPPORTS

RECEIVING A REQUEST FOR A HANDOVER TO A TARGET CELL OF THE TARGET BASE STATION, THE REQUEST COMPRISING: AN IDENTIFIER OF THE CLOSED ACCESS GROUP ASSOCIATED WITH A WIRELESS DEVICE, AND A CLOSED ACCESS GROUP RESTRICTION INDICATOR INDICATING WHETHER THE WIRELESS DEVICE IS RESTRICTED TO CELLS ASSOCIATED WITH CLOSED ACCESS GROUPS

DETERMINING WHETHER TO HAND OVER TO THE TARGET CELL OF THE TARGET BASE STATION BASED ON:
THE CLOSED ACCESS GROUP RESTRICTION INDICATOR; AND
THE IDENTIFIER OF THE CLOSED ACCESS GROUP ASSOCIATED WITH THE WIRELESS DEVICE.

FIG. 31 receive by a 1st base station from a 2nd base station, a message comprising a network slice configuration parameter associated with a closed access group that one or more cells of the 2nd base station support

3310 determining, based on the network slice configuration parameter, a handover for the wireless device to a cell of the one or more cells

3320 sending, to the 2nd base station, a request message for the handover, the request message comprising an identifier of the closed access group of the wireless device.

3330

FIG. 33 receiving, by a 1st AMF from a base station, a message indicating that a handover is required, the message comprising an identifier of a closed access group

3410 selecting, by the 1st AMF, a 2nd AMF that supports the closed access group

3420 sending, by the 1st AMF to the 2nd AMF, a handover request message comprising a network slice configuration parameter associated with the closed access group

HANDOVER FOR CLOSED ACCESS GROUP

CROSS-REFERENCE TO RELATED APPLICATIONS

This application is a continuation of U.S. patent application Ser. No. 16/826,793, filed Mar. 23, 2020, which claims the benefit of U.S. Provisional Application No. 62/825,179, filed Mar. 28, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 18 is an example call flow as per an aspect of an embodiment of the present disclosure.

FIG. 19 is an example call flow as per an aspect of an embodiment of the present disclosure.

FIG. 20 is an example call flow as per an aspect of an embodiment of the present disclosure.

FIG. 31 is an example diagram as per an aspect of an embodiment of the present disclosure.

FIG. 33 is an example diagram as per an aspect of an embodiment of the present disclosure.

FIG. 34 is an example diagram as per an aspect of an embodiment of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
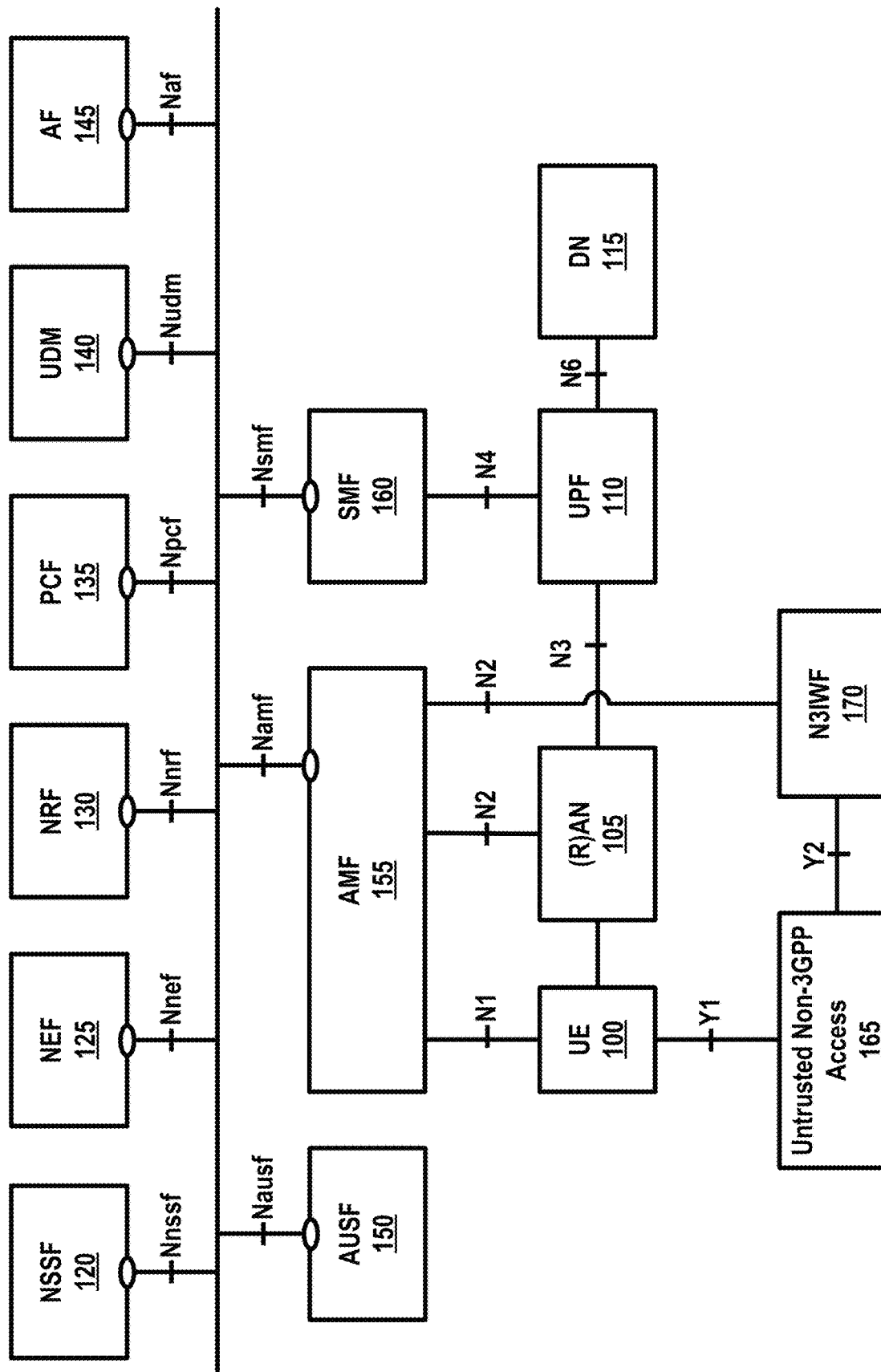
FIG. 1 is a diagram of an example 5G system architecture as per an aspect of an embodiment of the present disclosure.
Figure 2:
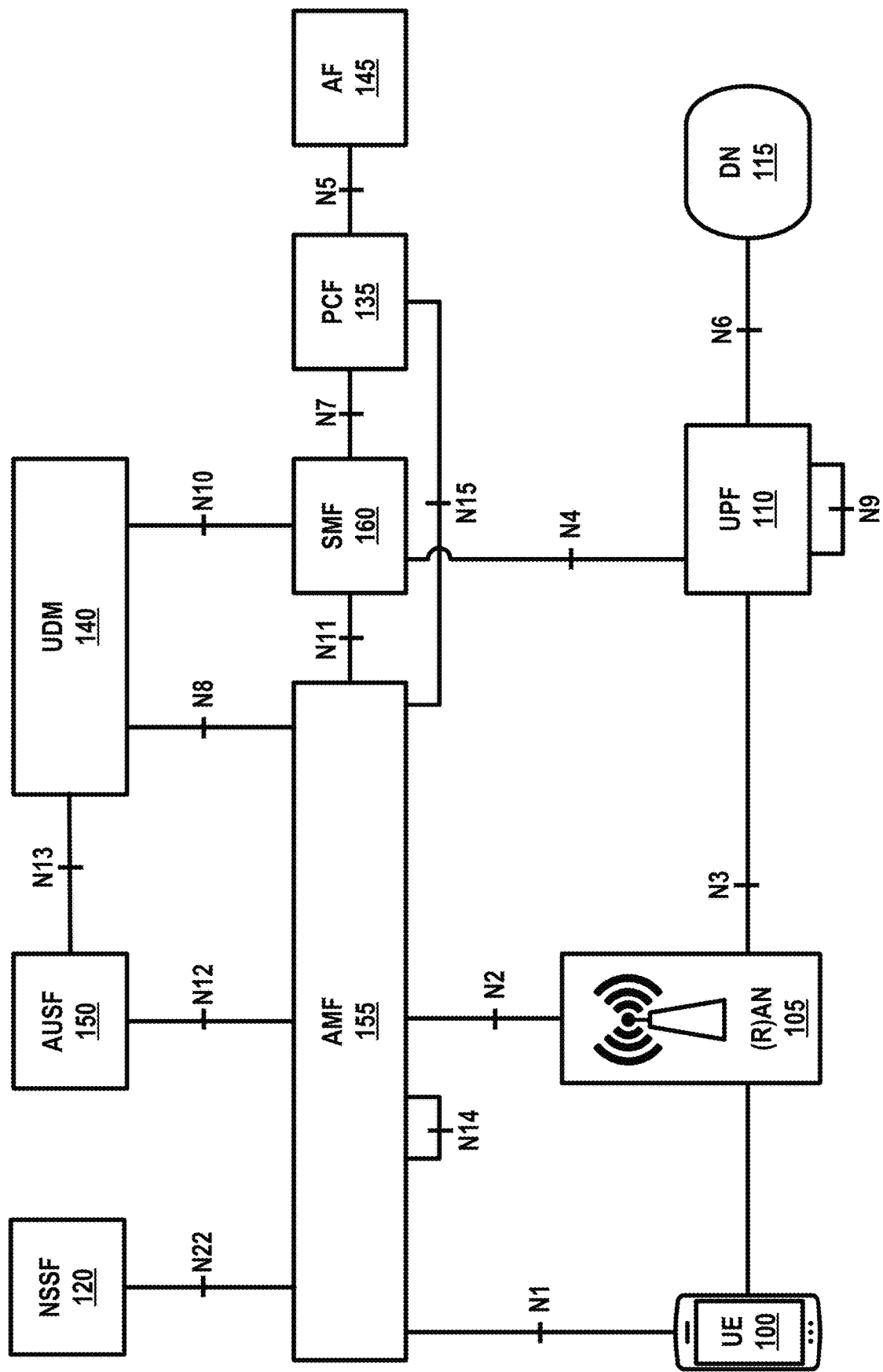
FIG. 2 is a diagram of an example 5G system architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CAG Closed Access Group
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol
GUTI Globally Unique Temporary Identifier
HFN Hyper Frame Number
HO Handover
IMSI International Mobile Subscriber Identity
LADN Local Area Data Network
LI Lawful Intercept
MEI Mobile Equipment Identifier
MICO Mobile Initiated Connection Only
MME Mobility Management Entity MO Mobile Originated
MSISDN Mobile Subscriber ISDN
MT Mobile Terminating
N3 IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NPN Non Public Network
NSI Network Slice Instance
NSSAI Network Slice Selection Assistance Information
NSSF Network Slice Selection Function
OCS Online Charging System
OFCS Offline Charging System
PCF Policy Control Function
PDCP Packet Data Convergence Protocol
PDU Packet/Protocol Data Unit
PEI Permanent Equipment Identifier
PLMN Public Land Mobile Network
RAN Radio Access Network
RLC-AM Radio Link Control Acknowledge mode
QFI QoS Flow Identity
RM Registration Management
RRM Radio Resource Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SSB Synchronization Signal Block
SUCI Served User Correlation ID
SUPI Subscriber Permanent Identifier
TA Tracking Area
TEID Tunnel Endpoint Identifier
TSN Time Sensitive Networking
UE User Equipment
UL Uplink
UL CL Uplink Classifier
UPF User Plane Function Example FIG. 1 and FIG. 2 depict a 5G system comprising of access networks and a 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
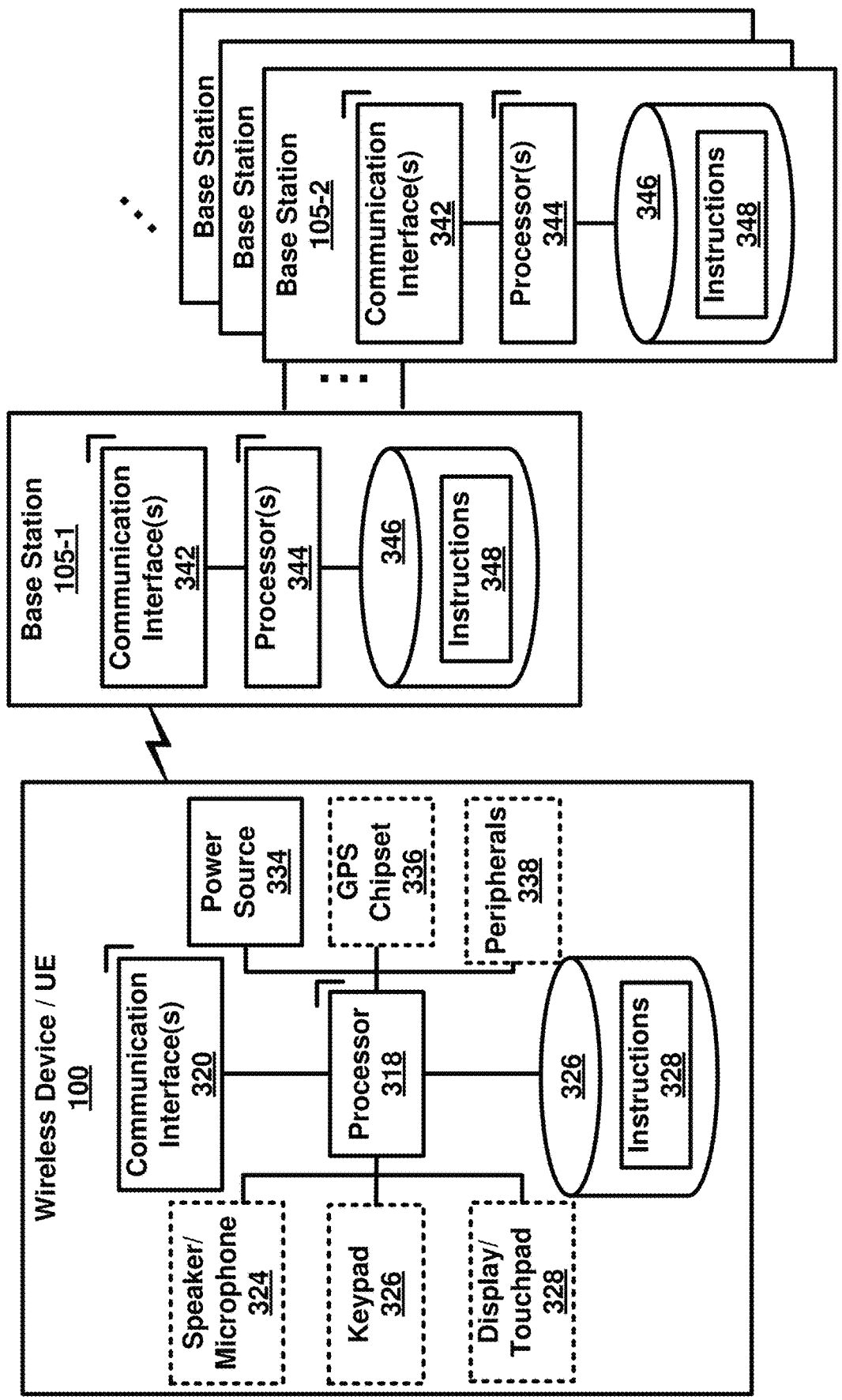
FIG. 3 is a system diagram of an example wireless device and a network node in a 5G system as per an aspect of an embodiment of the present disclosure.
Figure 4:
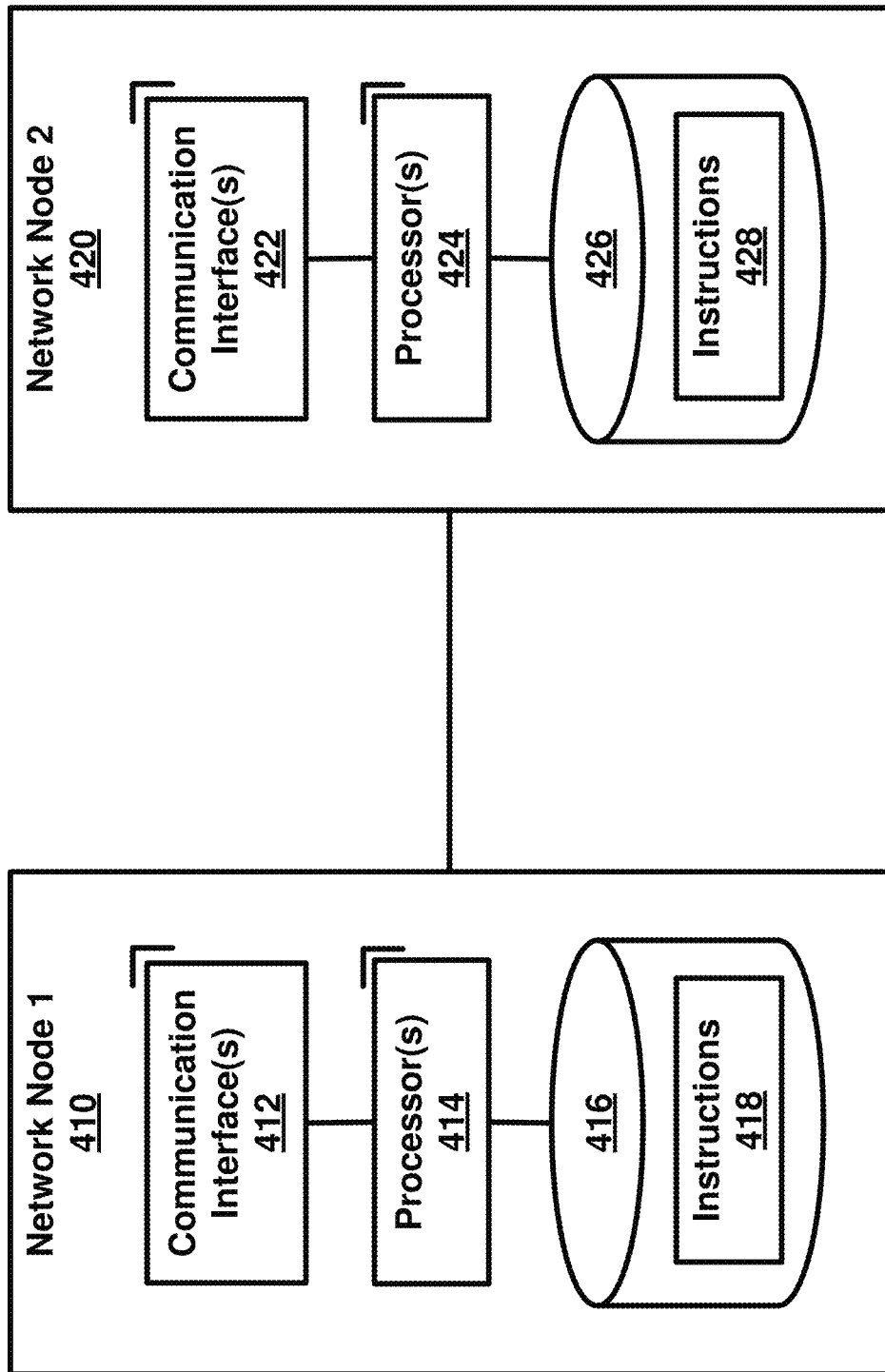
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3 IWF 170, NAS signaling with a UE 100 over N3 IWF 170, authentication of UEs connected over N3 IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3 IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
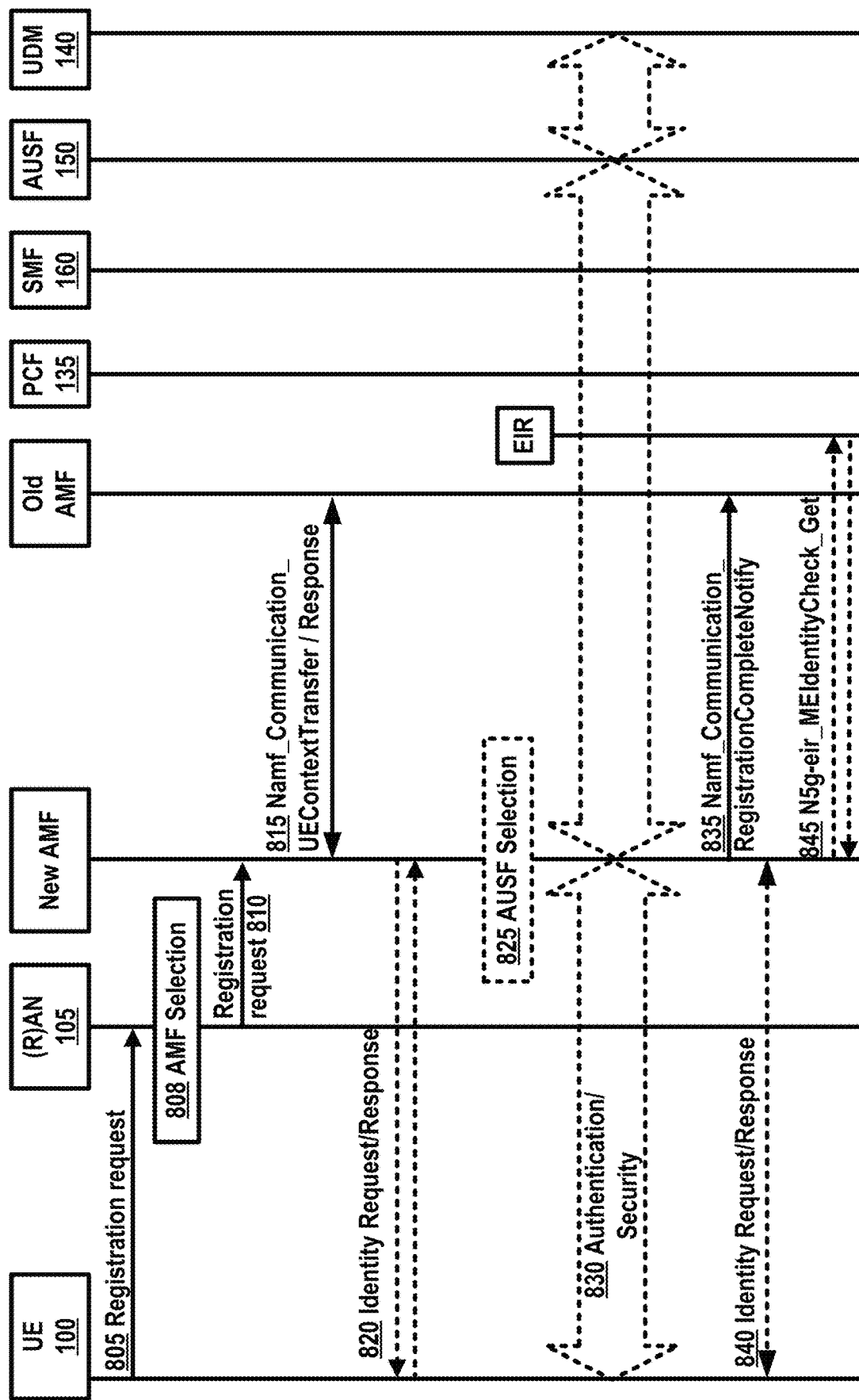
FIG. 8 is an example call flow as per an aspect of an embodiment of the present disclosure.
Figure 9:
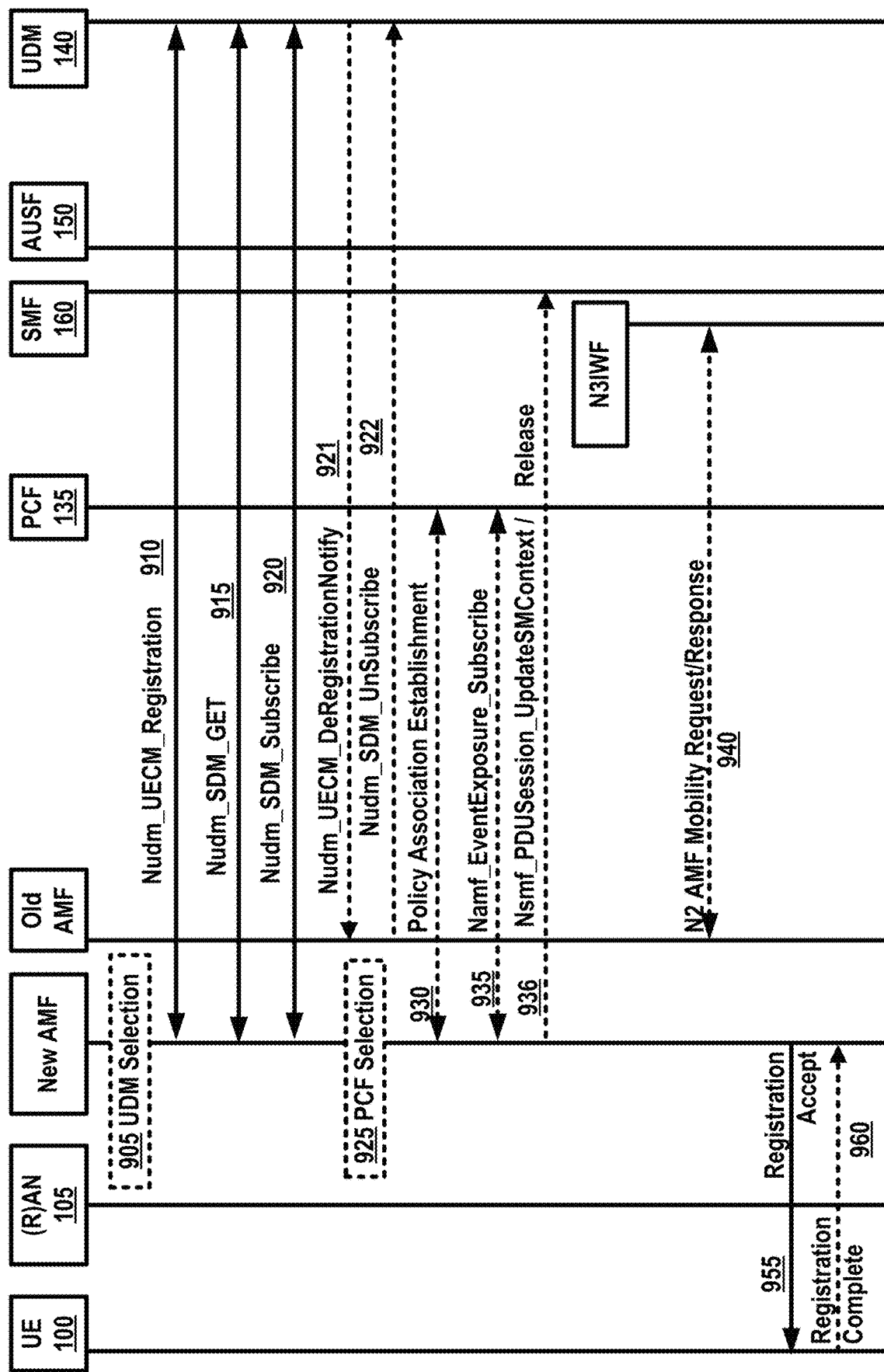
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
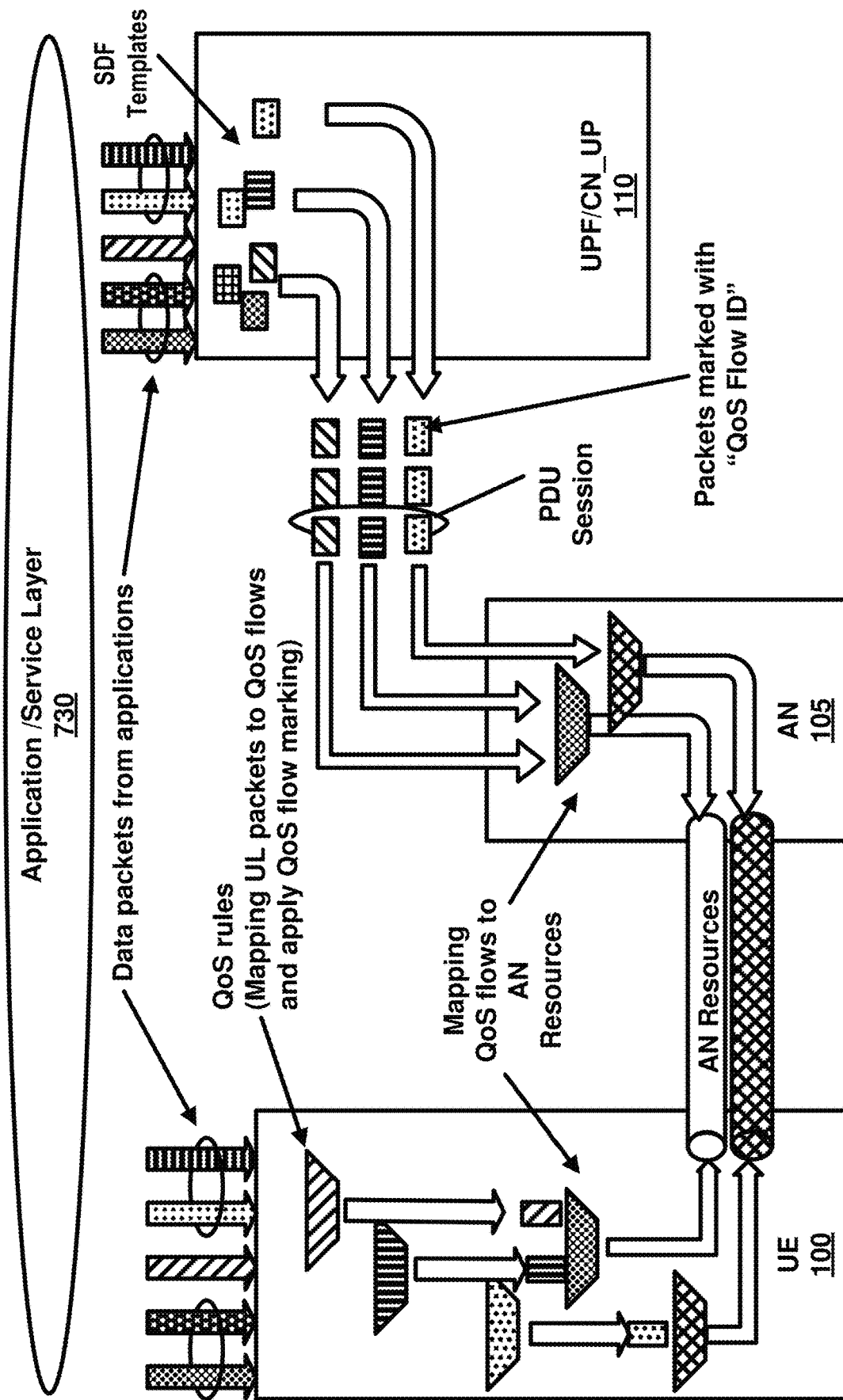
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3 IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3 IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3 IWF an N2 AMF 155 mobility request 940. If the AMF 155 has changed, the new AMF 155 may create an NGAP UE 100 association towards the N3 IWF to which the UE 100 is connected. In an example, the N3 IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
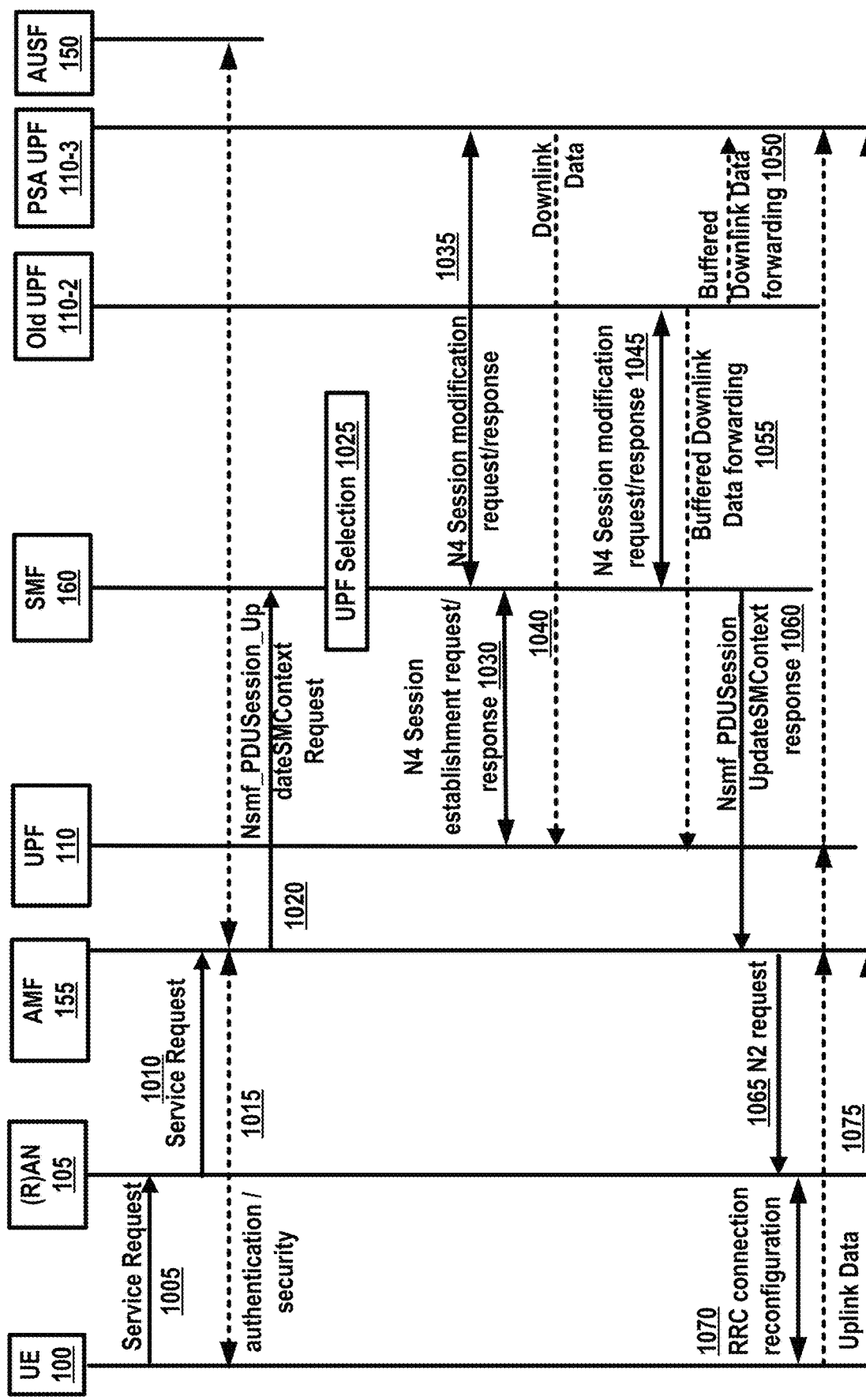
FIG. 10 is an example call flow as per an aspect of an embodiment of the present disclosure.
Figure 11:
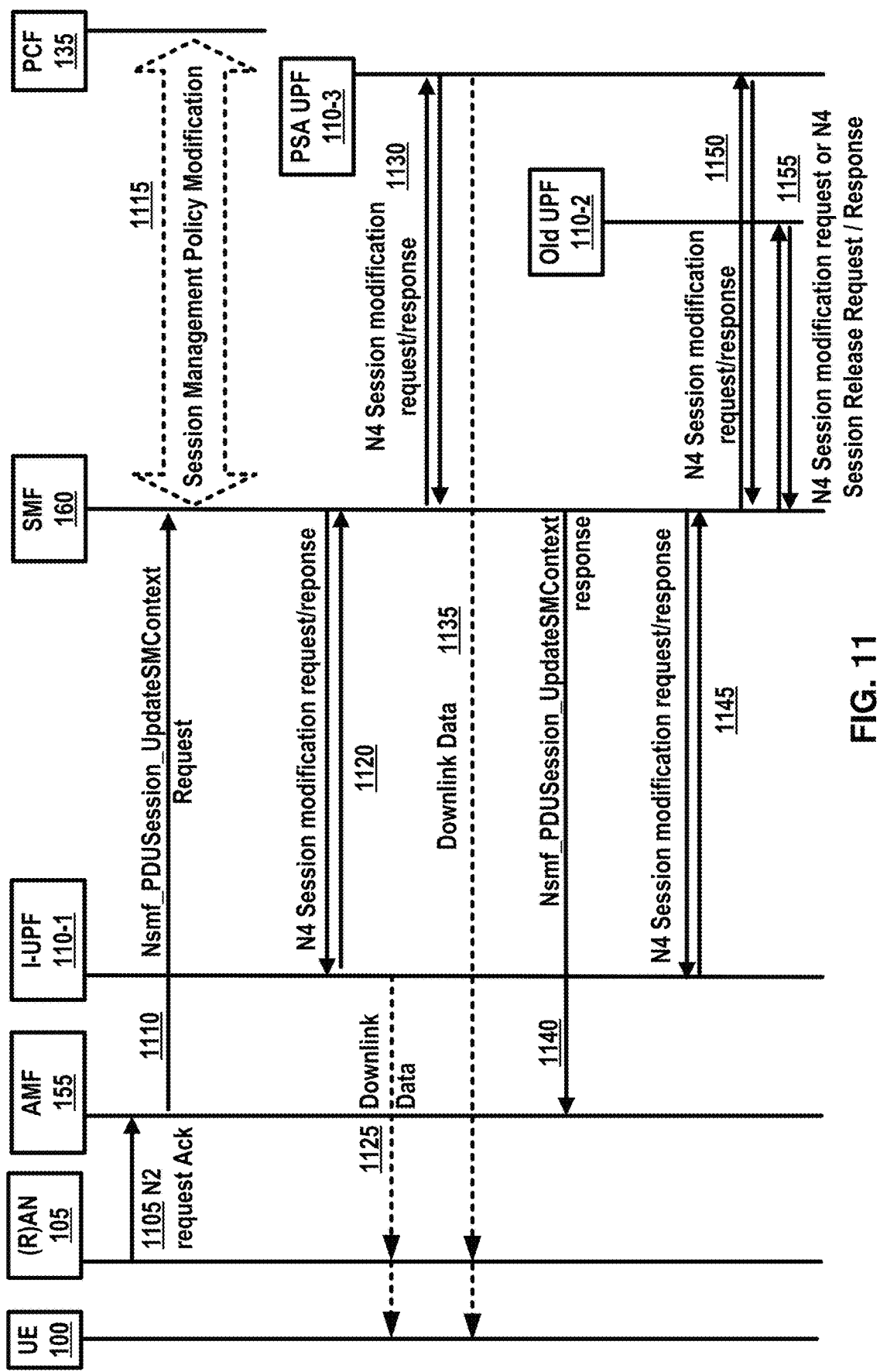
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2 MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
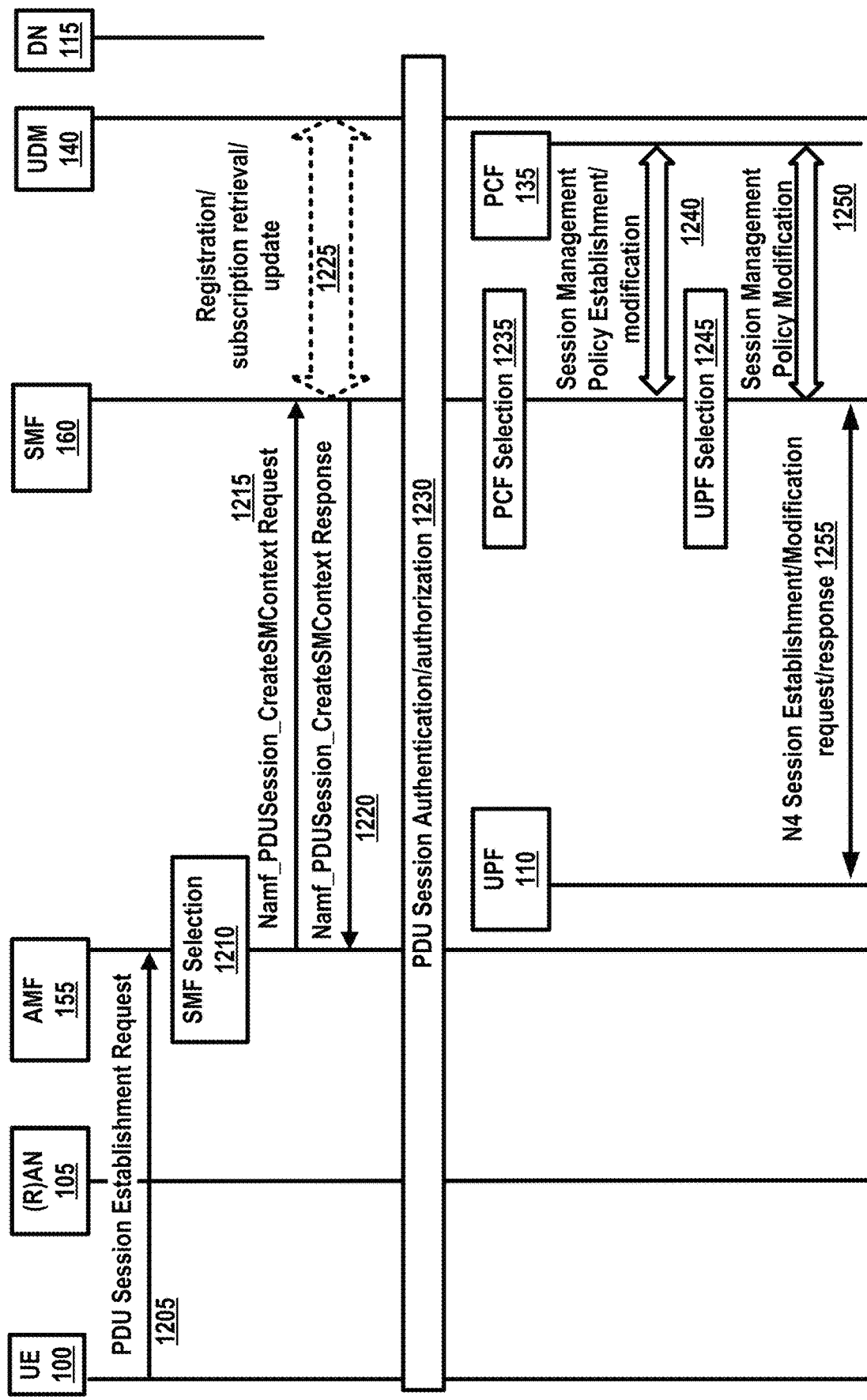
FIG. 12 is an example call flow as per an aspect of an embodiment of the present disclosure.
Figure 13:
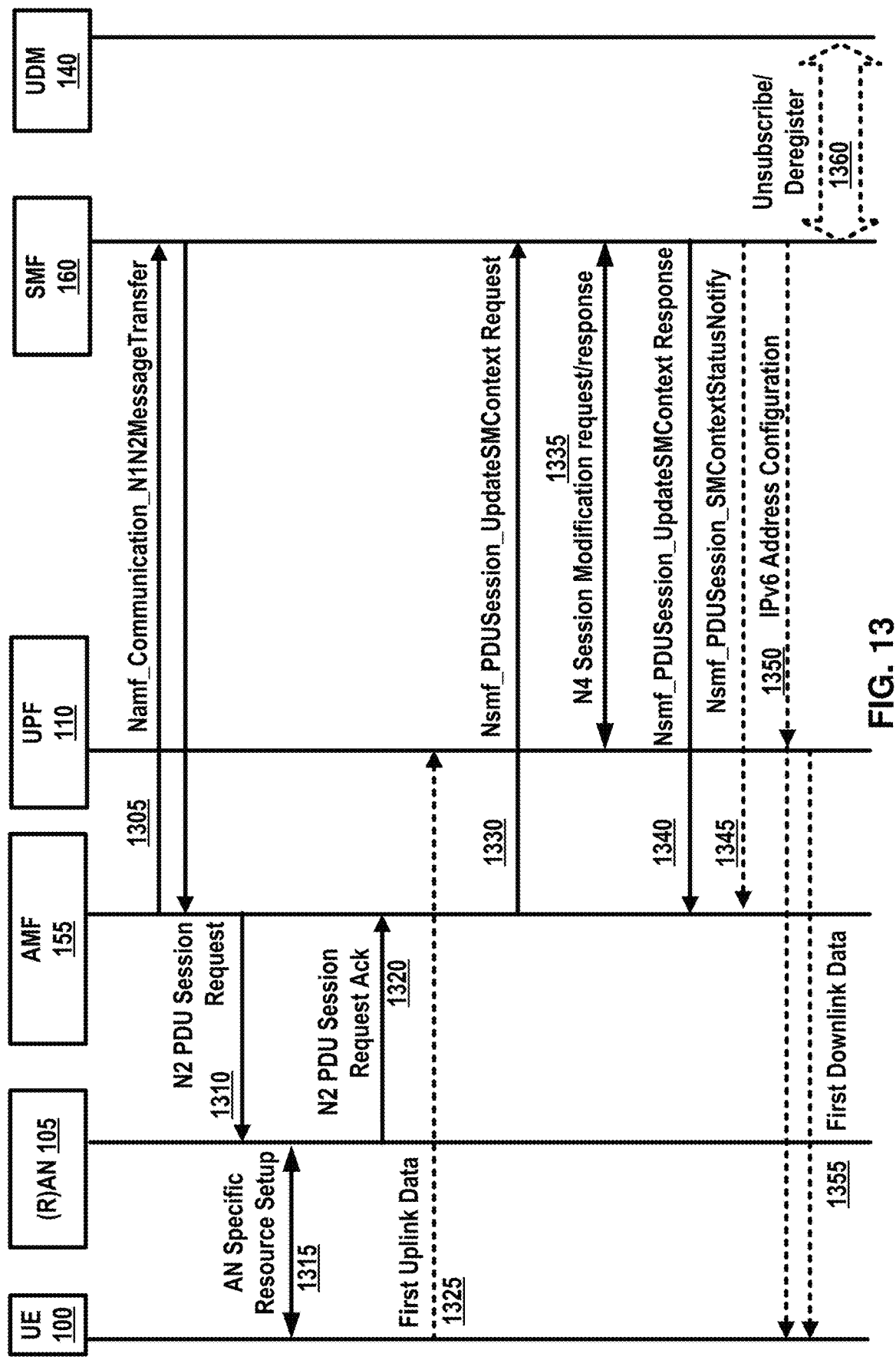
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g when request type indicates initial request), the AMF 155 may invoke the Nsmf_PDUSession_CreateSMContext request, but if the AMF 155 already has an association with an SMF 160 for the PDU session ID provided by the UE 100 (e.g when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2 MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2 MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

In an example, 3GPP systems may support public networks (for example, PLMN) and non public networks (NPN). To enable NPNs deployed as part of a PLMN, a closed access group (CAG) may be employed to restrict access to NPN resources, cells, slices, DNN, and/or the like. In an example, a UE may be restricted to access only CAGs and not allowed to access PLMN resources. During a handover procedure of a CAG-only UE, the UE may attempt to hand over to a target cell of a target RAN node of a PLMN that the UE is not authorized to access, which may result in excessive signaling and communication failure such as a handover reject/failure.

Example embodiments are directed to improved techniques for implementing RAN (NG-RAN) connection setup and configuration signaling. Additional example embodiments are directed to improved techniques for implementing handover signaling procedures when attempting handover to a target base station. These techniques may assist in determining a target base station that supports one or more CAGs associated with the UE, thereby facilitating fast and efficient handover. Additionally or alternatively, these techniques may prevent a UE from attempting to access a cell that the UE is restricted from accessing, thereby reducing signaling overhead associated with futile handover attempts. For example, a CAG-only UE may be restricted to CAG cells and may be unable to access non-CAG cells (also referred to herein as normal cells) of a target RAN node. The techniques of the present disclosure may facilitate selection of a target RAN node that supports the CAGs associated with the UE and avoidance of overhead signaling associated with attempts by a CAG-only UE to access non-CAG cells of a target RAN node.

In an example, mobility restrictions may restrict mobility handling or service access of a UE. The mobility restriction functionality may be provided by the UE, the radio access network, and/or the core network. Mobility restrictions may apply to 3GPP access. Service area restrictions and handling of forbidden areas for CM-IDLE state and, for CM-CONNECTED state when in RRC Inactive state may be executed by the UE based on information received from the core network. Mobility restrictions for CM-CONNECTED state when in RRC-Connected state may be executed by the radio access network and/or the core network. In CM-CONNECTED state, the core network may provide mobility restrictions to the radio access network within mobility restriction list. Mobility restrictions may comprise RAT restriction, forbidden area, service area restrictions, core network type restriction and closed access group information, and/or the like. In an example, RAT restriction may define/determine the 3GPP radio access technology(ies) that a UE may not be allowed to access in a PLMN. In a restricted RAT the UE based on subscription may not be permitted to access to the network for this PLMN. For CM-CONNECTED state, when radio access network determines a target RAT and a target PLMN during a handover procedure, it may take per-PLMN RAT restriction into consideration. The RAT restriction may be enforced in the network, and not provided to the UE. In an example, in a forbidden area, the UE, based on subscription, may not be permitted to initiate any communication with the network for this PLMN. The UE behaviour in terms of cell selection, RAT selection, PLMN selection, and/or the like, may depend on (be determined by) the network response that informs the UE of forbidden area. In an example, service area restriction may define/determine areas in which the UE may or may not initiate communication with the network based on Allowed Area (in an Allowed Area, the UE is permitted to initiate communication with the network as allowed by the subscription), Non-Allowed Area, Core Network type restriction, closed access group information, and/or the like. In a Non-Allowed Area, a UE may be service area restricted based on subscription. The UE and the network may not be allowed to initiate service request or SM signalling to obtain user services (both in CM-IDLE and in CM-CONNECTED states). The UE may not use the entering of a Non-Allowed Area as a criterion for Cell Reselection, a trigger for PLMN Selection or Domain selection for UE originating sessions or calls. The RRC procedures while the UE is in CM-CONNECTED with RRC Inactive state may be unchanged compared to when the UE is in an Allowed Area. The RM procedures may remain unchanged compared to when the UE is in an Allowed Area. The UE in a Non-Allowed Area may respond to core network paging or NAS Notification message from non-3GPP access with service request and RAN paging. Core network type restrictions may define whether the UE is allowed to connect to 5GC for this PLMN.

For a given UE, the core network may determine the mobility restrictions based on UE subscription information, UE location and local policy. The mobility restriction may change due to e.g. UE's subscription, location change and local policy. The service area restrictions or the non-allowed area may be fine-tuned by the PCF e.g. based on UE location, PEI and network policies. Service area restrictions may be updated during a registration procedure or UE configuration update procedure.

In an example, if the network sends service area restrictions to the UE, the network may send an allowed area, or a non-allowed area to the UE. If the UE has received an allowed area from the network, any TA not part of the allowed area may be considered by the UE as non-allowed. If the UE has received an indication of a non-allowed area from the network, any TA not part of the non-allowed area may be considered by the UE as allowed. If the UE has not received any service area restrictions, any TA in the PLMN may be considered as allowed. If the UE has overlapping areas between forbidden areas, service area restrictions, or any combination of them, the evaluation of forbidden areas may take precedence over the evaluation of service area restrictions. The UE and the network may override any forbidden area, non-allowed area restrictions and core network type restriction whenever access to the network for regulatory prioritized services like Emergency services, MPS, and/or the like.

In an example, public network may be integrated with non-public network (NPNs). NPNs may be made available via PLMNs e.g. by means of dedicated DNNs, or by one (or more) network slice instances allocated for the NPN. The existing network slicing functionalities may apply. When an NPN is made available via a PLMN, then the UE may have a subscription for the PLMN. As network slicing may not enable the possibility to prevent UEs from trying to access the network in areas which the UE is not allowed to use the network slice allocated for the NPN, closed access groups may be employed in addition to network slicing to apply access control. A closed access group (CAG) may identify a group of subscribers who are permitted to access one or more cells associated to the CAG. The CAG may be employed for the public network integrated NPNs to prevent UE(s), which are not allowed to access the NPN via the associated cell(s), from automatically selecting and accessing the associated cell(s). In an example, a CAG may be identified by a CAG identifier (CAG ID) which is unique within the scope of a PLMN ID. A CAG cell may broadcast one or multiple CAG identifiers per PLMN. An NG-RAN node may support broadcasting one or more (e.g., a total of twelve) CAGIDs. A CAG cell may broadcast a human-readable network name per CAG ID. The human-readable network name per CAG ID may be employed for presentation to user when user requests a manual CAG selection.

Figure 16:
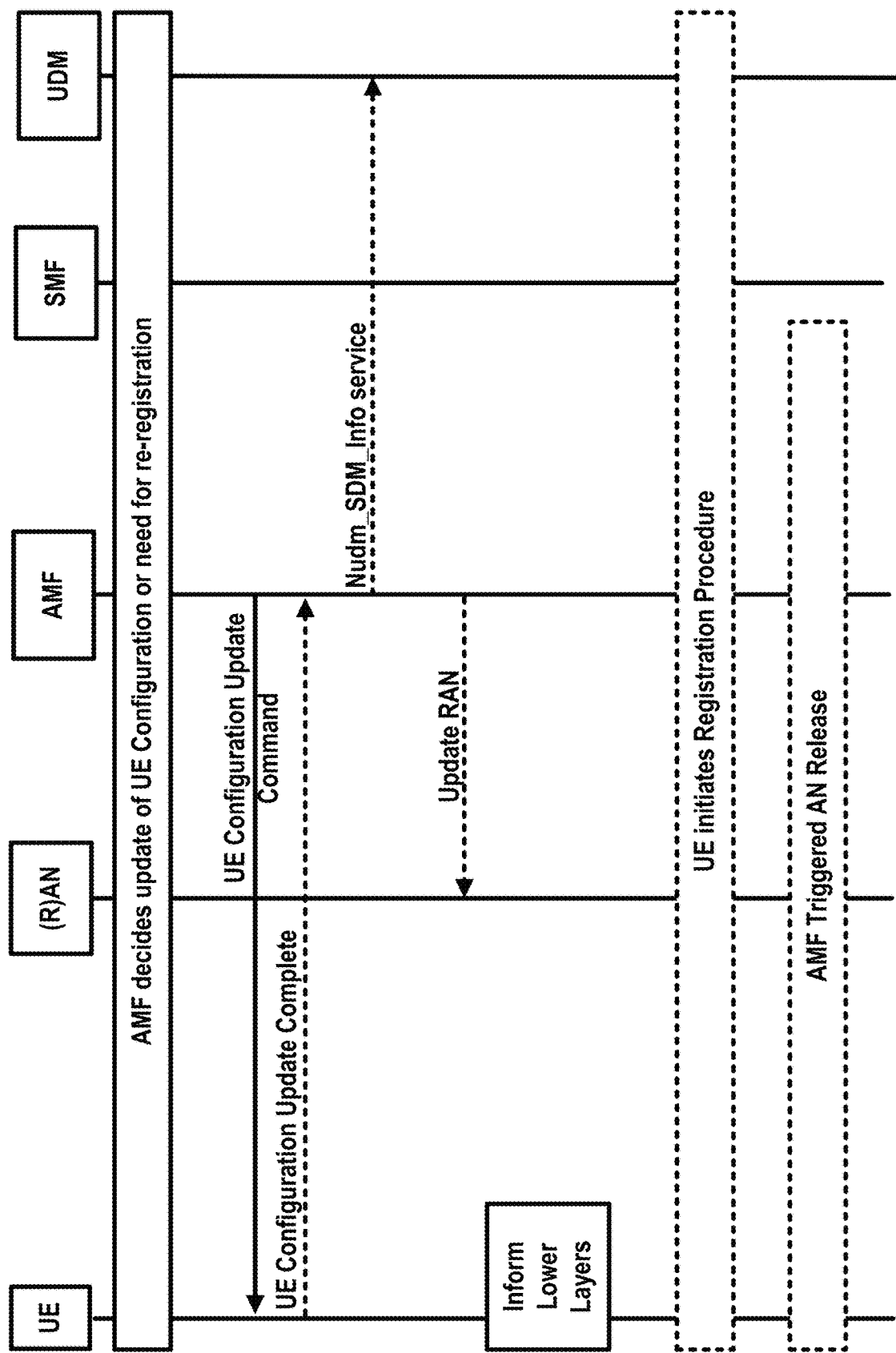
FIG. 16 is an example call flow as per an aspect of an embodiment of the present disclosure.

In an example, to support CAG, the UE may be configured using a UE configuration update procedure (as depicted in FIG. 16) for access and mobility management related parameters. The UE configuration update procedure may be employed to provide an Allowed CAG list, an indication whether the UE is only allowed to access the 5GS via CAG cells, or any other suitable information. The CAG information may be included in the subscription as part of the mobility restrictions. The Allowed CAG list may be, for example, a list of CAG IDs that the UE is allowed to access. The indication whether the UE is only allowed to access the 5GS via CAG cells may be a closed access group restriction indicator (for example, a CAG-only indication, a CAG-only UE indication, a cell mobility restriction for the UE, and/or the like).

In an example, the CAG list, CAG IDs, CAG restriction indicator, and/or the like may be employed by the network to select a target RAN node, a target cell of the target RAN node, a target AMF, and/or the like during a handover procedure. For example, when a RAN node receives a second closed access group identifier associated with a wireless device, and the second closed access group identifier is different from a first closed access group identifier, the handover may not be accepted. In an example, when a RAN node receives a closed access group restriction indicator indicating that the wireless device is restricted to cells associated with closed access groups, and the target cells of the target RAN node do not support the CAGs, the handover may not be accepted at the target RAN node. In an example, when the RAN node receives the closed access group restriction indicator indicating that the wireless device is restricted to cells associated with closed access groups, the RAN node may determine that the non-CAG cells, or normal cells of the target RAN node may not be selected for the handover of the wireless device/UE.

In an example embodiment, the CAG cell may broadcast information such that the UEs supporting CAG are accessing the cell. Cells may be CAG cells, normal PLMN cells, and/or the like.

The mobility restrictions may be able to restrict the UE's mobility according to the allowed CAG list (if configured in the subscription) and may include an indication whether the UE is only allowed to access CAG cells (if configured in the subscription). During transition from CM-IDLE to CM-CONNECTED, if the UE is accessing the 5GS via a CAG cell, the NG-RAN may provide the CAG Identifier to the AMF. The AMF may verify whether UE access is allowed by Mobility Restrictions. If the CAG Identifier received from the NG-RAN is part of the UE's Allowed CAG list, then the AMF accepts the NAS request. If the CAG Identifier received from the NG-RAN is not part of the UE's Allowed CAG list, then the AMF rejects the NAS request with an appropriate cause code, whereas the UE may remove that CAG Identifier, if it exists, from its Allowed CAG list. The AMF may release the NAS signalling connection for the UE by triggering the AN release procedure. If the UE is accessing the network via a non-CAG cell and the UE's subscription contains an indication that the UE is only allowed to access CAG cells, then the AMF rejects the NAS request with an appropriate cause code, whereas the UE updates its local configuration. The AMF may release the NAS signalling connection for the UE by triggering the AN release procedure. During connected mode mobility procedures based on the Mobility Restrictions received from the AMF, source NG-RAN may not handover the UE to a target NG-RAN node if the target is a CAG cell and the related CAG Identifier is not part of the UE's Allowed CAG list. Source NG-RAN may not handover the UE to a non-CAG cell if the UE is only allowed to access CAG cells. When the AMF receives the Nudm_SDM_Notification from the UDM and the AMF determines that the Allowed CAG list or the indication whether the UE is only allowed to access CAG cells have changed, The AMF may update the mobility restrictions in the UE and NG-RAN accordingly. If the UE is currently accessing a CAG cell and the related CAG Identifier has been removed from the Allowed CAG list or if the UE is currently accessing a non-CAG cell and the indication that the UE is only allowed to access CAG cells has been set in the subscription, then the AMF may release the NAS signalling connection for the UE by triggering the AN release procedure.

The PLMN operator may provide access to an NPN by employing network slicing mechanisms. The UE may have subscription and credentials for the PLMN. The PLMN and NPN service provider may have an agreement of where the NPN network slice is to be deployed (i.e. in which TAs of the PLMN and optionally including support for roaming PLMNs). The PLMN subscription may comprise support for Subscribed S-NSSAI to be used for the NPN. The PLMN operator may offer possibilities for the NPN service provider to manage the NPN network slice. When the UE registers the first time to the PLMN, the PLMN may configure the UE with URSP including NSSP associating applications to the NPN S-NSSAI. The PLMN may configure the UE with Configured NSSAI for the Serving PLMN. The PLMN and NPN may perform a network slice specific authentication and authorization using additional NPN credentials.

In an example embodiment, the UE may be configured with the following to support CAG. An Allowed CAG list e.g., a list of CAG Identifiers the UE is allowed to access, an indication whether the UE is only allowed to access 5GS via CAG cells, allowed NSSAI (e.g., mapping of CAG and NSSAI, S-NSSAIs) for one or more CAGs, and/or the like. The AMF may provide the UE's Allowed CAG list (if configured in the subscription) and an indication whether the UE is only allowed to access CAG cells (if configured in the subscription) as part of the Mobility Restrictions to NG-RAN. Based on the Mobility Restrictions received from the AMF, source NG-RAN may not handover the UE to a target NG-RAN node if the target is a CAG cell and the related CAG Identifier is not part of the UE's Allowed CAG list. Based on the Mobility Restrictions received from the AMF, source NG-RAN may not handover the UE to a non-CAG cell if the UE is only allowed to access CAG cells.

Figure 14:
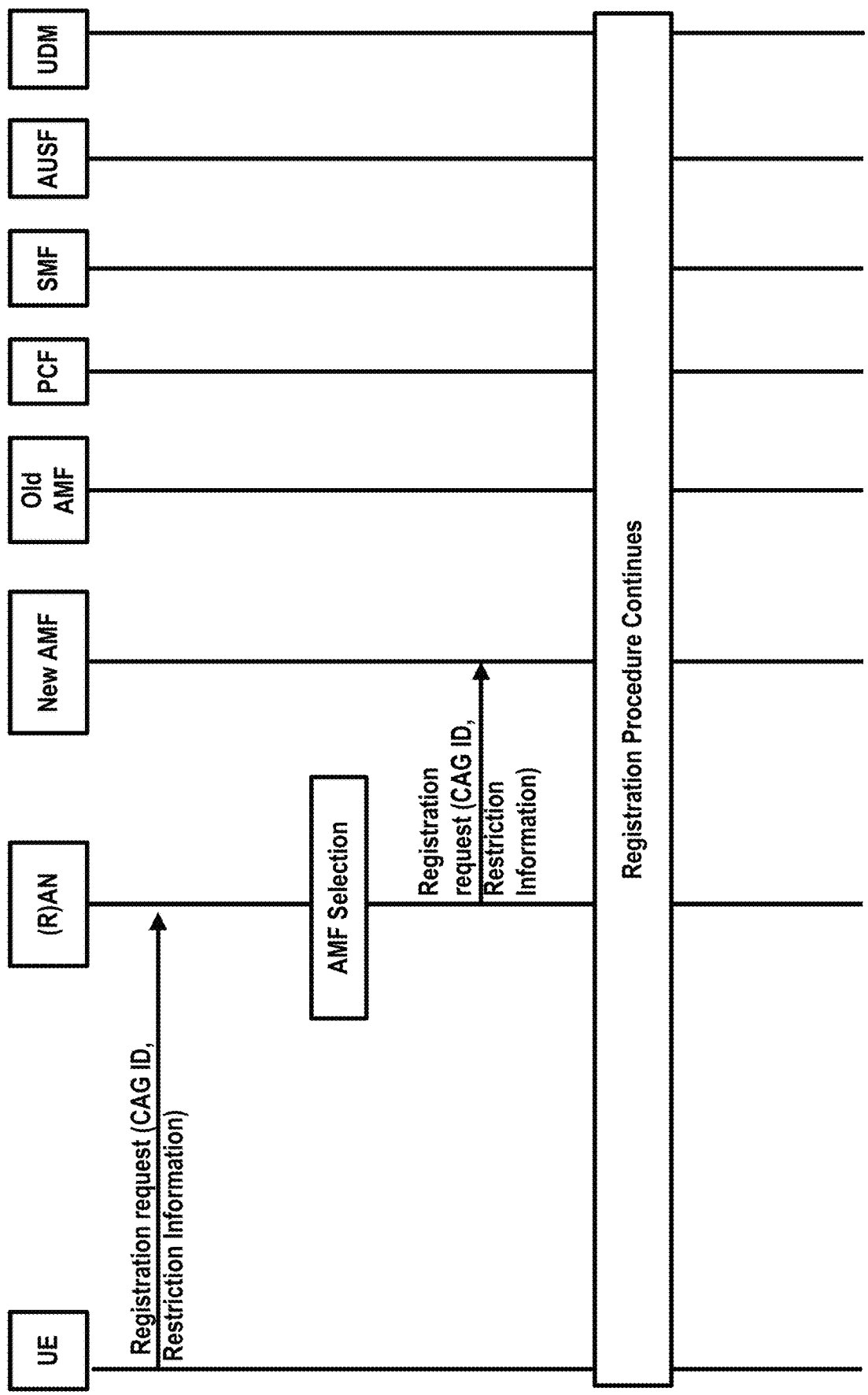
FIG. 14 is an example call flow as per an aspect of an embodiment of the present disclosure.

In an example embodiment as depicted in FIG. 14, the registration procedure (as in FIG. 8 and FIG. 9) may be performed.

As shown in FIG. 8, the UE 100 may transmit an AN message 805 to the RAN 105. In an example embodiment, the wireless device (the UE) may send an AN message to the RAN node (e.g., base station, NG-RAN, gNB, NG-eNB, and/or the like). The AN message may comprise AN parameters, registration request (e.g., Registration type, SUCI or 5G-GUTI or PEI, last visited TAI (if available), Security parameters, Requested NSSAI, [Mapping Of Requested NSSAI], Default Configured NSSAI Indication, UE Radio Capability Update, UE MM Core Network Capability, PDU Session status, List Of PDU Sessions To Be Activated, Follow-on request, MICO mode preference, Requested DRX parameters, [LADN DNN(s) or Indicator Of Requesting LADN Information]), UE Policy Container (e.g., the list of PSIs, indication of UE support for ANDSP and the operating system identifier), and/or the like. In the case of NG-RAN, the AN parameters may comprise e.g. 5G-S-TMSI or GUAMI, the Selected PLMN ID, NPN ID, NID, Requested NSSAI, and/or the like. In an example, the AN parameter may further comprise an establishment cause. The establishment cause may provide/indicate the reason for requesting the establishment of an RRC connection. In an example, the UE may employ a CAG cell to access the NG-RAN. The AN parameters may comprise an identifier of a closed access group (e.g., a CAG Identifier, a non-public network identifier, a network identifier, and/or the like), a closed access group restriction indicator (a CAG-only indication, a CAG-only UE indication, a cell mobility restriction for the UE, and/or the like), and/or the like. The closed access group restriction indicator may indicate whether the wireless device is restricted to cells associated with closed access groups. In an example, the closed access group restriction indicator may indicate that the UE may access one or more cells associated with one or more CAG(s)/CAG IDs. In an example, the closed access group restriction indicator may indicate that the UE may be allowed access to non-CAG cells, PLMN cells, and/or the like. In an example, the closed access group restriction indicator may indicate that the UE may be allowed access to CAG cells, non-CAG cells, PLMN cells, and/or the like. In an example, the UE may send to the RAN/NG-RAN requested NSSAI for the CAG, [mapping of (requested) NSSAI for the CAG], default configured NSSAI indication for one or more CAGs associated with the wireless device/UE.

In an example, if a 5G-S-TMSI or GUAMI is not included or the 5G-S-TMSI or GUAMI does not indicate a valid AMF the (R)AN, based on (R)AT and Requested NSSAI, if available, may select an AMF. The (R)AN may forward the Registration Request message to the AMF based on the N2 connection of the UE. If the (R)AN cannot select an appropriate AMF, it may forward the Registration Request to an AMF which has been configured, in (R)AN, to perform AMF selection. In an example, the RAN node may select the AMF on the CAG ID(s), one or more CAGs that the UE is allowed/configured to employ, mobility restriction, a CAG restriction indicator, and/or the like.

In an example, the RAN node may send to the AMF an N2 message. In an example, the N2 message may comprise N2 parameters, the registration request, UE Policy Container, and/or the like. In an example, when NG-RAN is used, the N2 parameters may comprise the selected PLMN ID, NPN ID, NID, location information and cell identity related to the cell in which the UE is camping, UE context request which indicates that a UE context including security information needs to be setup at the NG-RAN, and/or the like. In an example, when NG-RAN is employed, the N2 parameters may further comprise the establishment cause. In an example, the N2 parameters may comprise a CAG identifier if the UE is accessing the NG-RAN using a CAG cell, the closed access group restriction indicator, and/or the like.

In an example, the RAN node may send to the AMF, mapping of requested NSSAI. In an example, the RAN node may send to the AMF, mapping of requested NSSAI for one or more CAG(s), CAG IDs, and/or the like.

Figure 15:
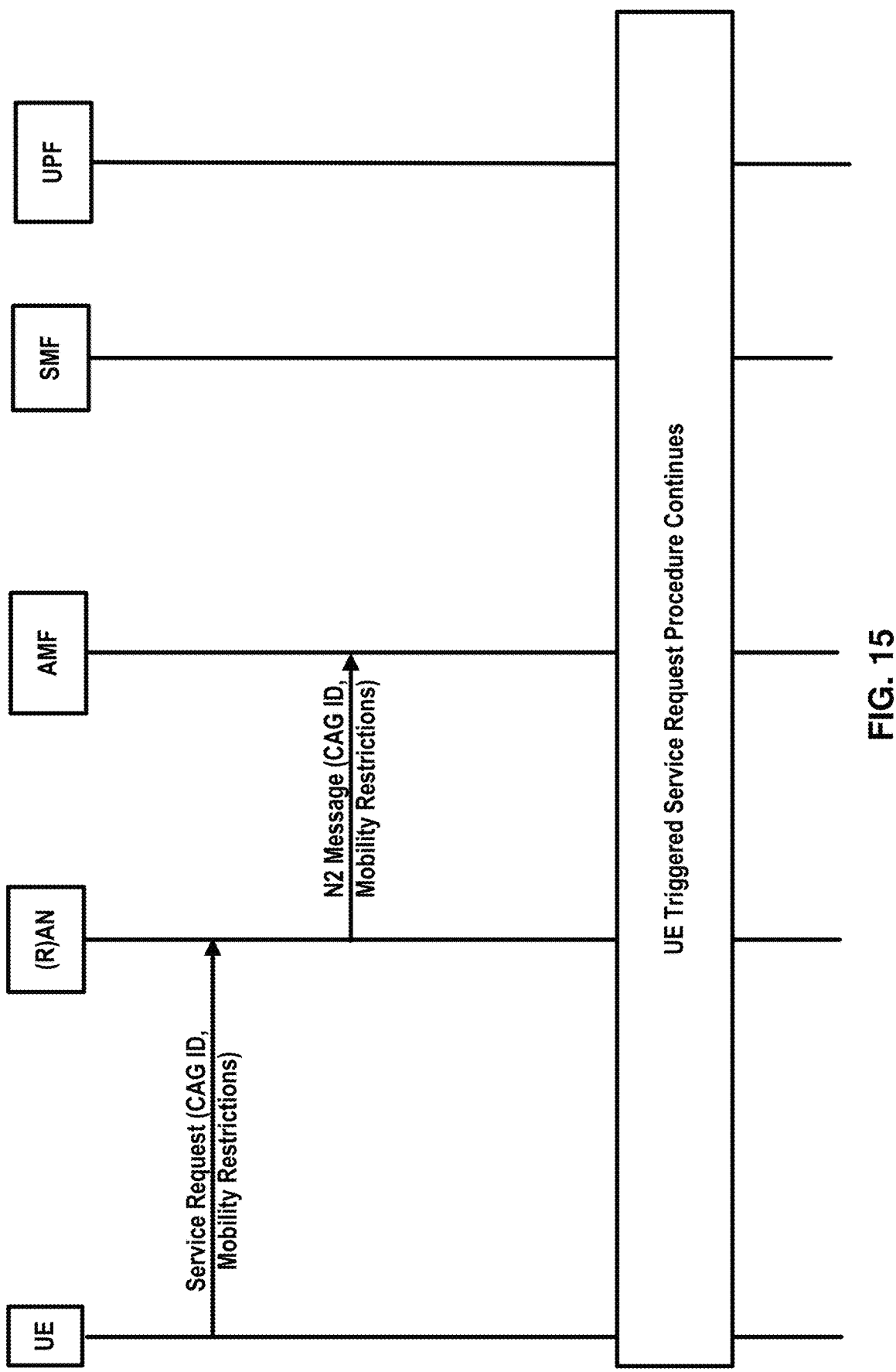
FIG. 15 is an example call flow as per an aspect of an embodiment of the present disclosure.

In an example as depicted in FIG. 10, FIG. 11 and FIG. 15, the service request procedure may be performed.

In an example embodiment, the UE may send to the NG-RAN/RAN node, an AN message. The AN message may comprise AN parameters, Service Request (e.g., list Of PDU Sessions To Be Activated, List Of Allowed PDU Sessions, security parameters, PDU Session status, 5G-S-TMSI, and/or the like), and/or the like. If the UE needs/ determines to send IEs which are not part of the cleartext IEs, then the UE may send the service request partially ciphered, providing only the IEs. The List Of PDU sessions to be activated may be provided by UE when the UE wants to re-activate the PDU Session(s). The List Of Allowed PDU Sessions may be provided by the UE when the service request is a response of a Paging or a NAS notification for a PDU session associated with non-3GPP access, and identifies the PDU sessions that can be transferred to 3GPP access. In an example, the AN parameters comprise 5G-S-TMSI, selected PLMN ID, NPN ID, NID, establishment cause, and/or the like. The establishment cause may determine/provide the reason for requesting the establishment of an RRC connection. The AN parameters may comprise a CAG Identifier if the UE is accessing the NG-RAN using a CAG cell, the closed access group restriction indicator, and/or the like. In an example, the UE may send the service request message towards the AMF encapsulated in an RRC message to the NG-RAN. The RRC message(s) may be employed to carry the 5G-S-TMSI and the NAS message.

In an example embodiment, the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like, may be transmitted from the UE to the network via a NAS message, RRC message, and/or the like.

In an example embodiment as depicted in FIG. 18, the AMF may receive the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like. In an example, the AMF may send to a RAN node, the NG-RAN node, and/or the like, an initial context setup message. The AMF may perform an initial context setup procedure. The initial context setup procedure may be employed to establish the necessary overall initial UE context at the NG-RAN node, when required, including PDU session context, the Security Key, Mobility Restriction List, UE Radio Capability and UE Security Capabilities, etc. The AMF may initiate the Initial Context Setup procedure if a UE-associated logical NG-connection exists for the UE or if the AMF has received the RAN UE NGAP ID IE in an INITIAL UE MESSAGE message or if the NG-RAN node has already initiated a UE-associated logical NG-connection by sending an INITIAL UE MESSAGE message via another NG interface instance. The procedure may employ UE-associated signalling.

In an example, the initial context setup message may comprise Message Type, AMF UE NGAP ID, RAN UE NGAP ID, Old AMF, UE Aggregate Maximum Bit Rate, Core Network Assistance Information, GUAMI, PDU Session Resource Setup Request List, PDU Session Resource Setup Request Item, PDU Session ID, NAS-PDU, S-NSSAI, PDU Session Resource Setup Request Transfer, Allowed NSSAI, UE Security Capabilities, Security Key, Trace Activation, Mobility Restriction List, UE Radio Capability, Index to RAT/Frequency Selection Priority, Masked IMEISV, NAS-PDU, Emergency Fallback Indicator, RRC Inactive Transition Report Request, UE Radio Capability for Paging, and/or the like.

In an example, the initial context setup message may further comprise one or more IEs comprising the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like.

In an example, the NG-RAN node may receive the one or more closed access group identifiers associated with the UE, the closed access group restriction indicator (a CAG-only indication, a CAG-only UE indication, a cell mobility restriction for the UE, and/or the like, the requested NSSAI for the CAG, [mapping of (requested) NSSAI for the CAG], default configured NSSAI indication for one or more CAGs associated with the wireless device/UE, and/or the like via RRC signaling. In an example, an RRC connection setup request message may be employed. In an example, an RRC connection establishment/re-establishment procedure may be employed. The RRC connection establishment procedure may comprise RRC connection setup request message, and/or the like. A capability IE within the RRC message, e.g., UE capability, RRC capability, and/or the like may be employed to transmit the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like. In an example, the RRC connection setup request message (e.g., RRCSetupRequest, and/or the like) may comprise the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like.

In an example embodiment as depicted in FIG. 19, one or more RAN (NG-RAN) nodes may employ an Xn interface (e.g., Xn-C) to exchange application level configuration data. In an example, an Xn setup procedure may be employed. The Xn Setup procedure may be employed to exchange application level configuration data needed for two NG-RAN nodes to interoperate correctly over the Xn-C interface. In an example, an NG-RAN node1 (e.g., Source NG-RAN) may initiate the procedure by sending an XN SETUP REQUEST message to a candidate NG-RAN node2 (Target NG-RAN). The candidate NG-RAN node2 may reply with an XN SETUP RESPONSE message. If Supplementary uplink is configured at the NG-RAN node1, the NG-RAN node1 may include in the XN SETUP REQUEST message the SUL Information IE and the Supported SUL band List IE for each served cell where supplementary uplink is configured. If Supplementary Uplink is configured at the NG-RAN node2, the candidate NG-RAN node2 may include in the XN SETUP RESPONSE message the SUL Information IE and the Supported SUL band List IE for each served cell where supplementary uplink is configured.

If the NG-RAN node1 is an ng-eNB, it may include the Protected E-UTRA Resource Indication IE into the XN SETUP REQUEST. If the XN SETUP REQUEST sent by an ng-eNB comprises the Protected E-UTRA Resource Indication IE, the receiving gNB may take this into account for cell-level resource coordination with the ng-eNB. The gNB may consider the received Protected E-UTRA Resource Indication IE content valid until reception of a new update of the IE for the same ng-eNB. The protected resource pattern indicated in the Protected E-UTRA Resource Indication IE may not be valid in subframes indicated by the Reserved Subframes IE, as well as in the non-control region of the MBSFN subframes e.g., it is valid only in the control region therein. The size of the control region of MBSFN subframes may be indicated in the Protected E-UTRA Resource Indication IE.

In an example, the Xn setup request message may comprise a list of closed access group identifiers (CAG IDs) that one or more cells of the NG-RAN (e.g., target NG-RAN, Source NG-RAN, and/or the like) node may support. In an example, the Xn setup request may comprise: a message type, Global NG-RAN Node ID, TAI Support List, AMF Set Information, List of Served Cells NR, Served Cell Information NR, Neighbour Information NR, Neighbour Information E-UTRA, List of Served Cells E-UTRA, Served Cell Information E-UTRA, Neighbour Information NR, Neighbour Information E-UTRA, and/or the like. In an example, Served Cell Information NR may comprise NR-PCI, NR CGI, TAC, RANAC, Broadcast PLMNs, PLMN Identity, CHOICE NR-Mode-Info, FDD, FDD Info, UL NR Frequency Info, DL NR Frequency Info, UL transmission Bandwidth, DL Transmission Bandwidth, TDD, TDD Info, Frequency Info, Transmission Bandwidth, Measurement Timing Configuration, Connectivity Support, and/or the like. In an example, the Served Cell Information NR may comprise the list of closed access group identifiers (CAG IDs). In an example the Xn setup request message may further comprise an information element (e.g., maxnoofCellsinNG-RAN node) indicating a number of cells (e.g., Maximum number of cells) that may be served by a NG-RAN node.

In an example, the Xn setup request message may comprise a list of closed access group identifiers (CAG IDs) that one or more cells (e.g., the CAG cells and/or non-CAG cells) of the NG-RAN (e.g., target NG-RAN, Source NG-RAN, and/or the like) node may support. In an example, the Xn setup request message may further comprise one or more S-NSSAIs, allowed NSSAI, slice identifiers that the CAG cells and/or non-CAG cells of the RAN node, NG-RAN node, gNB node and/or the like may support.

In an example, the Xn setup response may comprise a Message Type, Global NG-RAN Node ID, TAI Support List, List of Served Cells NR, Served Cell Information NR, Neighbour Information NR, Neighbour Information E-UTRA, List of Served Cells E-UTRA, Served Cell Information E-UTRA, Neighbour Information NR, Neighbour Information E-UTRA, Criticality Diagnostics, and/or the like. In an example, the Xn setup response message may comprise a list of closed access group identifiers that one or more cells of the NG-RAN (e.g., target NG-RAN, Source NG-RAN, and/or the like) node may support. In an example, the served cell information NR may comprise the list of closed access group identifiers. In an example the Xn setup response message may further comprise an information element (e.g., maxnoofCellsinNG-RAN node) indicating a number of cells (e.g., Maximum number of cells) that may be served by a NG-RAN node.

In an example, the Xn setup response message may comprise a list of closed access group identifiers (CAG IDs) that one or more cells (the CAG cells and/or non-CAG cells) of the NG-RAN (e.g., target NG-RAN, Source NG-RAN, and/or the like) node may support. In an example, the Xn setup response message may further comprise one or more S-NSSAIs, allowed NSSAI, slice identifiers that the CAG cells and/or non-CAG cells of the RAN node, NG-RAN node, gNB node and/or the like may support.

In an example embodiment as depicted in FIG. 19, a RAN node configuration update, NG-RAN node configuration update, RAN context update/exchange, and/or the like procedure may be employed. The NG-RAN node configuration update procedure may be employed to update application level configuration data needed for two NG-RAN nodes to interoperate correctly over the Xn, Xn-C, and/or the like interface. In an example, the NG-RAN node1 may initiate the procedure by sending a NG-RAN NODE CONFIGURATION UPDATE message to a peer NG-RAN node2. If Supplementary Uplink is configured at the NG-RAN node1, the NG-RAN node1 may include in the NG-RAN NODE CONFIGURATION UPDATE message the SUL Information IE and the Supported SUL band List IE for each cell added in the Served NR Cells To Add IE and in the Served NR Cells To Modify IE. If Supplementary Uplink is configured at the NG-RAN node2, the NG-RAN node2 may include in the NG-RAN NODE CONFIGURATION UPDATE ACKNOWLEDGE message the SUL Information IE and the Supported SUL band List IE for each cell added in the Served NR Cells IE if any. If the TAI Support List IE is included in the NG-RAN NODE CONFIGURATION UPDATE message, the receiving node may replace the previously provided TAI Support List IE by the received TAI Support List IE. If the Cell Assistance Information NR IE is present, the NG-RAN node2 may use it to generate the Served NR Cells IE and include the list in the NG-RAN NODE CONFIGURATION UPDATE ACKNOWLEDGE message.

In an example, the NG-RAN NODE CONFIGURATION UPDATE message and/or the CONFIGURATION UPDATE ACKNOWLEDGE message may comprise a list of closed access group identifiers (CAG IDs) that one or more cells (e.g., the CAG cells and/or non-CAG cells) of the NG-RAN (e.g., target NG-RAN, Source NG-RAN, and/or the like) node may support. In an example, the NG-RAN NODE CONFIGURATION UPDATE message may further comprise one or more S-NSSAIs, allowed NSSAI, slice identifiers that the CAG cells and/or non-CAG cells of the RAN node, NG-RAN node, gNB node and/or the like may support.

In an example, upon reception of the NG-RAN NODE CONFIGURATION UPDATE message, NG-RAN node2 may update the Served Cell Information NR. If Served Cells NR To Add IE is contained in the NG-RAN NODE CONFIGURATION UPDATE message, NG-RAN node2 may add cell information according to the information in the Served Cell Information NR IE. If Served Cells NR To Modify IE is contained in the NG-RAN NODE CONFIGURATION UPDATE message, NG-RAN node2 may modify information of cell indicated by Old NR-CGI IE according to the information in the Served Cell Information NR IE. When either served cell information or neighbour information of an existing served cell in NG-RAN node1 need to be updated, the whole list of neighbouring cells, if any, may be contained in the Neighbour Information NR IE. The NG-RAN node2 may overwrite the served cell information and the whole list of neighbour cell information for the affected served cell. If the Deactivation Indication IE is contained in the Served Cells NR To Modify IE, it may indicate that the concerned cell was switched off to lower energy consumption. If Served Cells NR To Delete IE is contained in the NG-RAN NODE CONFIGURATION UPDATE message, NG-RAN node2 may delete information of cell indicated by Old NR-CGI IE.

In an example, upon reception of the NG-RAN NODE CONFIGURATION UPDATE message, NG-RAN node2 may update Served Cell Information E-UTRA. If Served Cells E-UTRA To Add IE is contained in the NG-RAN NODE CONFIGURATION UPDATE message, NG-RAN node2 may add cell information according to the information in the Served Cell Information E-UTRA IE. If Served Cells E-UTRA To Modify IE is contained in the NG-RAN NODE CONFIGURATION UPDATE message, NG-RAN node2 may modify information of cell indicated by Old ECGI IE according to the information in the Served Cell Information E-UTRA IE. When either served cell information or neighbour information of an existing served cell in NG-RAN node1 need to be updated, the whole list of neighbouring cells, if any, may be contained in the Neighbour Information E-UTRA IE. The NG-RAN node2 may overwrite the served cell information and the whole list of neighbour cell information for the affected served cell. If the Deactivation Indication IE is contained in the Served Cells E-UTRA To Modify IE, it may indicate that the concerned cell was switched off to lower energy consumption. If the Served Cells E-UTRA To Delete IE is contained in the NG-RAN NODE CONFIGURATION UPDATE message, NG-RAN node2 may delete information of cell indicated by Old ECGI IE. If the Protected E-UTRA Resource Indication IE is included into the NG-RAN NODE CONFIGURATION UPDATE (inside the Served Cell Information E-UTRA IE), the receiving gNB may take this into account for cell-level resource coordination with the ng-eNB. The gNB may consider the received Protected E-UTRA Resource Indication IE content valid until reception of a new update of the IE for the same ng-eNB. The protected resource pattern indicated in the Protected E-UTRA Resource Indication IE may not be valid in subframes indicated by the Reserved Subframes IE (contained in E-UTRA—NR CELL RESOURCE COORDINATION REQUEST messages), as well as in the non-control region of the MBSFN subframes e.g., it may be valid in the control region therein. The size of the control region of MBSFN subframes may be indicated in the Protected E-UTRA Resource Indication IE.

In an example, upon reception of the NG-RAN NODE CONFIGURATION UPDATE message, NG-RAN node2 may update TNL addresses for SCTP associations. If the TNL Association to Add List IE is included in the NG-RAN NODE CONFIGURATION UPDATE message, the NG-RAN node2 may, if supported, use it to establish the TNL association(s) with the NG-RAN node1. The NG-RAN node2 may report to the NG-RAN node1, in the NG-RAN NODE CONFIGURATION UPDATE ACKNOWLEDGE message, the successful establishment of the TNL association(s) with the NG-RAN node1 as follows: A list of successfully established TNL associations shall be included in the TNL Association Setup List IE, a list of TNL associations that failed to be established shall be included in the TNL Association Failed to Setup List IE. In an example, if the TNL Association to Remove List IE is included in the NG-RAN NODE CONFIGURATION UPDATE message the NG-RAN node2 may, if supported, initiate removal of the TNL association(s) indicated by the received Transport Layer information towards the NG-RAN node1. If the TNL Association to Update List IE is included in the NG-RAN NODE CONFIGURATION UPDATE message the NG-RAN node2 may, if supported, update the TNL association(s) indicated by the received Transport Layer information towards the NG-RAN node1.

In an example embodiment, the NG-RAN NODE CONFIGURATION UPDATE message may comprise a list of closed access group identifiers (CAG IDs) that one or more cells of the NG-RAN (e.g., target NG-RAN, Source NG-RAN, and/or the like) node may support. In an example, the served cell information NR may comprise the list of closed access group identifiers.

Figure 17:
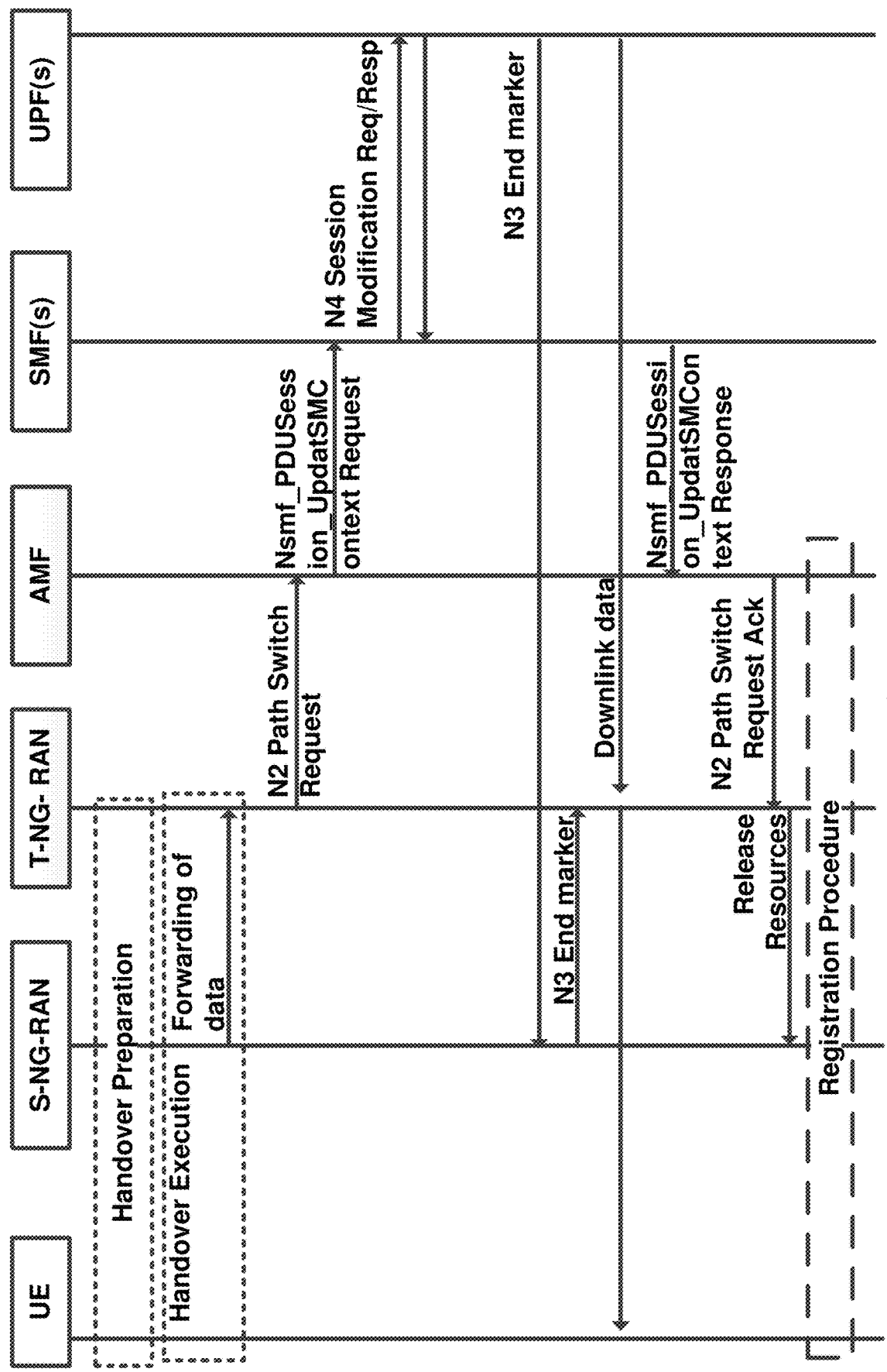
FIG. 17 is an example call flow as per an aspect of an embodiment of the present disclosure.

In an example embodiment as depicted in FIG. 17 and FIG. 20, handover procedures may be performed. The handover procedures may be employed to hand over the UE from a source NG-RAN node to a target NG-RAN node using the Xn or N2 reference points. The handover procedures may be triggered, for example, due to new radio conditions, load balancing, due to specific service e.g. in the presence of QoS Flow for voice, and/or the like, the source NG-RAN node being NR may trigger handover to E-UTRA or a different NR NG-RAN connected to 5GC and vice versa.

In an example embodiment, during the Xn setup procedure and/or configuration update procedure, the RAN/NG-RAN nodes may employ the list of closed access group identifiers (CAG IDs) that one or more cells (e.g., the CAG cells and/or non-CAG cells) of the NG-RAN (e.g., target NG-RAN, Source NG-RAN, and/or the like) node may support, the one or more S-NSSAIs, allowed NSSAI, slice identifiers that the CAG cells and/or non-CAG cells of the RAN node, NG-RAN node, gNB node and/or the like may support, to determine whether to accept or reject a handover request (e.g., from a RAN node, a UE, AMF, and/or the like), select a target RAN node for handover of the UE, and/or the like.

In an example embodiment, a handover preparation procedure may be employed to request the preparation of resources at the target side via the 5GC. In an example, a source NG-RAN node may initiate a handover preparation by sending the HANDOVER REQUIRED message to a serving AMF. When the source NG-RAN node sends the HANDOVER REQUIRED message, it may start a timer e.g., TNGRELOCprep, and/or the like. The source NG-RAN node may indicate the appropriate cause value for the handover in the Cause IE. Upon reception of the HANDOVER REQUIRED message the AMF may, for each PDU session indicated in the PDU Session ID IE, transparently transfer the Handover Required Transfer IE to the SMF associated with the concerned PDU session(s). In case of intra-system handover, the information in the Source to Target Transparent Container IE may be encoded according to the definition of the Source NG-RAN node to Target NG-RAN node Transparent Container IE. If the DL Forwarding IE is included for a given QoS flow in the PDU Session Resource Information Item IE within the Source NG-RAN node to Target NG-RAN node Transparent Container IE of the HANDOVER REQUIRED message and it is set to "DL forwarding proposed", it may indicate that the source NG-RAN node proposes forwarding of downlink data for that QoS flow. If the DRBs to QoS Flows Mapping List IE is included in the PDU Session Resource Information Item IE within the Source NG-RAN node to Target NG-RAN node Transparent Container IE of the HANDOVER REQUIRED message, it may indicates that the source NG-RAN node proposes forwarding of downlink data for those DRBs. If the QoS Flow Mapping Indication IE for a QoS flow is included in the Associated QoS Flow List IE within the DRBs to QoS Flows Mapping List IE within the Source NG-RAN node to Target NG-RAN node Transparent Container IE of the HANDOVER REQUIRED message, it may indicate that the source NG-RAN node has mapped the uplink or downlink of the QoS flow to the DRB. If the HANDOVER COMMAND message contains the DL Forwarding UP TNL Information IE for a given DRB within the Handover Command Transfer IE, the source NG-RAN node may consider that the forwarding of downlink data for this DRB is accepted by the target NG-RAN node. If the HANDOVER COMMAND message contains the UL Forwarding UP TNL Information IE for a given DRB in the Data Forwarding Response DRB List IE within the Handover Command Transfer IE, it means the target NG-RAN node has requested the forwarding of uplink data for this DRB.

In an example, in case of inter-system handover to LTE, the information in the Source to Target Transparent Container IE may be encoded according to the Source eNB to Target eNB Transparent Container IE. When the preparation, including the reservation of resources at the target side is ready, the AMF may respond with the HANDOVER COMMAND message to the source NG-RAN node. Upon reception of the HANDOVER COMMAND message the source NG-RAN node may stop the timer TNGRELOCprep and start the timer TNGRELOCoverall.

If there are any PDU Sessions that could not be admitted in the target, they may be indicated in the PDU Session Resources to Release List IE. If the HANDOVER COMMAND message contains the QoS Flow to be Forwarded List IE within the Handover Command Transfer IE for a given PDU session, then the source NG-RAN node may initiate data forwarding for the listed QoS flows. If the Target to Source Transparent Container IE has been received by the AMF from the handover target then the transparent container may be included in the HANDOVER COMMAND message. If the Index to RAT/Frequency Selection Priority IE is contained in the Source NG-RAN Node to Target NG-RAN Node Transparent Container IE, the target NG-RAN node may store the content of the received Index to RAT/Frequency Selection Priority IE in the UE context.

In an example, interactions with other NGAP procedures may comprise the following. If, after a HANDOVER REQUIRED message is sent and before the Handover Preparation procedure is terminated, the source NG-RAN node receives an AMF initiated PDU Session Management procedure on the same UE-associated signalling connection, the source NG-RAN node may cancel the handover preparation procedure by executing the handover cancellation procedure with an appropriate cause value. After successful completion of the Handover Cancellation procedure, the source NG-RAN node may continue the AMF initiated PDU Session Management procedure. In an example, the source NG-RAN node may terminate the AMF initiated PDU Session Management procedure by sending the appropriate response message with an appropriate cause value, e.g. "NG intra-system handover triggered" or "NG inter-system handover triggered" to the AMF and then the source NG-RAN node may continue with the handover procedure.

In an example, if the 5GC or the target side is not able to accept any of the PDU session resources or a failure occurs during the Handover Preparation, the AMF may send a HANDOVER PREPARATION FAILURE message with an appropriate cause value to the source NG-RAN node. If there is no response from the AMF to the HANDOVER REQUIRED message before timer TNGRELOCprep expires in the source NG-RAN node, the source NG-RAN node may cancel the Handover Preparation procedure by initiating the Handover Cancel procedure with the appropriate value for the Cause IE. The source NG-RAN node may ignore any HANDOVER COMMAND message or HANDOVER PREPARATION FAILURE message received after the initiation of the Handover Cancel procedure.

In an example, if the NG-RAN node receives at least one PDU Session ID included in the PDU Session Resource Handover List IE without at least one valid associated GTP tunnel address pair (in either UL or DL), then the NG-RAN node may consider it as a logical error. A GTP tunnel address pair may be considered valid if both the GTP-TEID IE and the Endpoint IP Address IE are present.

In an example, a handover resource allocation procedure may be employed to reserve resources at the target NG-RAN node for the handover of the UE. In an example the AMF may initiate the procedure by sending the HANDOVER REQUEST message to the target NG-RAN node. If the Masked IMEISV IE is contained in the HANDOVER REQUEST message the target NG-RAN node may, if supported, use it to determine the characteristics of the UE for subsequent handling. Upon receipt of the HANDOVER REQUEST message the target NG-RAN node may attempt to execute the requested PDU session configuration and associated security, store the UE Aggregate Maximum Bit Rate in the UE context, and use the received UE Aggregate Maximum Bit Rate for all non-GBR QoS flows for the concerned UE, store the received Mobility Restriction List in the UE context, store the received UE Security Capabilities in the UE context, store the received Security Context in the UE context, and/or the like.

Upon reception of the UE History Information IE, which is included within the Source to Target Transparent Container IE of the HANDOVER REQUEST message, the target NG-RAN node may collect the information defined as mandatory in the UE History Information IE and may, if supported, collect the information defined as optional in the UE History Information IE, for as long as the UE stays in one of its cells, and store the collected information to be used for future handover preparations. Upon receiving the PDU Session Resource Setup List IE contained in the HANDOVER REQUEST message, the target NG-RAN node may behave the same as defined in the PDU Session Resource Setup procedure. The target NG-RAN node may report to the AMF in the HANDOVER REQUEST ACKNOWLEDGE message the result for each PDU session resource requested to be setup. In particular, for each PDU session resource successfully setup, it may include the Handover Request Acknowledge Transfer IE that may comprise the list of QoS flows which have been successfully established in the QoS Flow Setup Response List IE, the Data Forwarding Accepted IE if the data forwarding for the QoS flow is accepted, the list of QoS flows which have failed to be established, if any, in the QoS Flow Failed to Setup List IE, the UP transport layer information to be used for the PDU session, the security result associated to the PDU session, and/or the like.

In an example, for one or more PDU session resource which failed to be setup, the Handover Resource Allocation Unsuccessful Transfer IE may be included in the HANDOVER REQUEST ACKNOWLEDGE message containing a cause value that should be precise enough to enable the SMF to know the reason for the unsuccessful establishment. Upon reception of the HANDOVER REQUEST ACKNOWLEDGE message the AMF may, for each PDU session indicated in the PDU Session ID IE, transfer transparently the Handover Request Acknowledge Transfer IE or Handover Resource Allocation Unsuccessful Transfer IE to the SMF associated with the concerned PDU session. If the HANDOVER REQUEST message contains the Data Forwarding Not Possible IE associated with a given PDU session within the Handover Request Transfer IE set to "data forwarding not possible", the target NG-RAN node may not include the DL Forwarding UP TNL Information IE and for intra-system handover the Data Forwarding Response DRB List IE within the Handover Request Acknowledge Transfer IE in the HANDOVER REQUEST ACKNOWLEDGE message for that PDU session. In case of intra-system handover, if the target NG-RAN node accepts the downlink data forwarding for at least one QoS flow for which the DL Forwarding IE is set to "DL forwarding proposed", it may include the DL Forwarding UP TNL Information IE in the Handover Request Acknowledge Transfer IE for the PDU session within the PDU Session Resource Admitted List IE of the HANDOVER REQUEST ACKNOWLEDGE message. In case of intra-system handover, if the target NG-RAN node accepts the data forwarding for a successfully configured DRB, the target NG-RAN node may include the DL Forwarding UP TNL Information IE for the DRB within the Data Forwarding Response DRB List IE within Handover Request Acknowledge Transfer IE of the HANDOVER REQUEST ACKNOWLEDGE message. If the HANDOVER REQUEST ACKNOWLEDGE message contains the UL Forwarding UP TNL Information IE for a given DRB in the Data Forwarding Response DRB List IE within the Handover Request Acknowledge Transfer IE, it may indicate the target NG-RAN node has requested the forwarding of uplink data for the DRB.

In case of inter-system handover from E-UTRAN, the target NG-RAN node may include the Data Forwarding Accepted IE for each QoS flow that the DL Forwarding IE is set to "DL forwarding proposed" for the corresponding E-RAB in the Source NG-RAN Node to Target NG-RAN Node Transparent Container IE and that the target NG-RAN node has admitted the proposed forwarding of downlink data for the QoS flow. If the target NG-RAN node accepts the downlink data forwarding for at least one QoS flow of an admitted PDU session it may include the DL Forwarding UP TNL Information IE in the PDU Session Resource Setup Response Transfer IE for that PDU session within the PDU Session Resources Admitted List IE of the HANDOVER REQUEST ACKNOWLEDGE message. The target NG-RAN node may employ the information in the Mobility Restriction List IE if present in the HANDOVER REQUEST message to determine a target for subsequent mobility action for which the target NG-RAN node provides information about the target of the mobility action towards the UE, select a proper SCG during dual connectivity operation, assign proper RNA(s) for the UE when moving the UE to RRC_INACTIVE state, and/or the like. If the Mobility Restriction List IE is not contained in the HANDOVER REQUEST message, the target NG-RAN node may consider that no roaming and no access restriction may apply to the UE. The target NG-RAN node may consider that no roaming and no access restriction apply to the UE when one of the QoS flows includes a particular ARP value. If the Trace Activation IE is included in the HANDOVER REQUEST message the target NG-RAN node may, if supported, initiate the requested trace function.

In an example, if the Location Reporting Request Type IE is included in the HANDOVER REQUEST message, the target NG-RAN node may perform the requested location reporting functionality for the UE. If the Core Network Assistance Information IE is included in the HANDOVER REQUEST message, the target NG-RAN node may, if supported, store this information in the UE context and use it for e.g. the RRC_INACTIVE state decision and RNA configuration for the UE and RAN paging if any for a UE in RRC_INACTIVE state, and/or the like. If the RRC Inactive Transition Report Request IE is included in the HANDOVER REQUEST message, the NG-RAN node may, if supported, store this information in the UE context. After all necessary resources for the admitted PDU session resources have been allocated, the target NG-RAN node may generate the HANDOVER REQUEST ACKNOWLEDGE message.

In an example embodiment, the handover required message, the handover command message, mobility restriction IE, the handover request message, and/or the like may comprise one or more closed access group identifiers associated with the UE.

In an example embodiment, the handover required message, the handover command message, mobility restriction IE, the handover request message, and/or the like may comprise the closed access group restriction indicator (a CAG-only indication, a CAG-only UE indication, a cell mobility restriction for the UE, and/or the like).

In an example embodiment, the handover required message, the handover command message, mobility restriction IE, the handover request message, and/or the like may comprise the requested NSSAI for the CAG, [mapping of (requested) NSSAI for the CAG], default configured NSSAI indication for one or more CAGs associated with the wireless device/UE, and/or the like.

In an example embodiment, the source NG-RAN node may receive one or more closed access group identifiers associated with the UE, that may comprise the closed access group restriction indicator, the requested NSSAI for the CAG, and/or the like via an RRC message. The source NG-RAN node may determine the target NG-RAN node based on the one or more closed access group identifiers associated with the UE, the closed access group restriction indicator, the requested NSSAI for the CAG, and/or the like. In an example, the AMF may receive the one or more closed access group identifiers associated with the UE, the closed access group restriction indicator, the requested NSSAI for the CAG, and/or the like from the sources NG-RAN node and may employ the information to determine the target NG-RAN node or whether the target NG-RAN node may serve the UE. If the closed access group restriction indicator indicates that the UE is restricted to CAG cells, and the CAG ID associated with the UE does not match with one or more CAG IDs served by the target NG-RAN node, the AMF may notify with a failure indication, handover failure message, and/or like with an error/rejection cause IE.

In an example, the target NG-RAN node may send a HANDOVER NOTIFY message to the AMF when the UE has been identified in the target cell and the NG-based handover has been successfully completed.

In an example, a path switch request procedure may be employed to request the switch of the downlink termination point of the NG-U transport bearer towards a new termination point. The NG-RAN node may initiate the procedure by sending the PATH SWITCH REQUEST message to the AMF. Upon reception of the PATH SWITCH REQUEST message the AMF may, for each PDU session indicated in the PDU Session ID IE, transparently transfer the Path Switch Request Transfer IE to the SMF associated with the concerned PDU session. After one or more necessary updates including the UP path switch have been successfully completed in the 5GC for at least one of the PDU session resources included in the PATH SWITCH REQUEST, the AMF may send the PATH SWITCH REQUEST ACKNOWLEDGE message to the NG-RAN node. The list of accepted QoS flows may be included in the PATH SWITCH REQUEST message within the Path Switch Request Transfer IE. The list of PDU sessions which failed to be setup, if any, may be included in the PATH SWITCH REQUEST message within the Path Switch Request Setup Failed Transfer IE. For each PDU session for which the User Plane Security Information IE is included in the Path Switch Request Transfer IE of the PATH SWITCH REQUEST message, the SMF may send back the Security Indication IE within the Path Switch Request Acknowledge Transfer IE of the PATH SWITCH REQUEST ACKNOWLEDGE message. For each PDU session for which the DL NG-U TNL Information Reused IE set to "true" is included in the Path Switch Request Transfer IE of the PATH SWITCH REQUEST message, the SMF may, if supported, consider that the DL TNL information contained in the DL NG-U UP TNL Information IE has been reused. If the UL NG-U UP TNL Information IE is included within the Path Switch Request Acknowledge Transfer IE of the PATH SWITCH REQUEST ACKNOWLEDGE message, the NG-RAN node may store this information and use it as the uplink termination point for the user plane data for this PDU session. if the core network assistance information IE is included in the PATH SWITCH REQUEST ACKNOWLEDGE message, the NG-RAN node may, if supported, store this information in the UE context and use it for e.g., the RRC_INACTIVE state decision and RNA configuration for the UE and RAN paging if any for a UE in RRC_INACTIVE state. If the RRC Inactive Transition Report Request IE is included in the PATH SWITCH REQUEST ACKNOWLEDGE message, the NG-RAN node may, if supported, store this information in the UE context. Upon reception of the PATH SWITCH REQUEST ACKNOWLEDGE message the NG-RAN node may store the received Security Context IE in the UE context. If the PDU Session Resource Released List IE is included in the PATH SWITCH REQUEST ACKNOWLEDGE message, the NG-RAN node may release the corresponding QoS flows and regard the PDU session(s) indicated in the PDU Session Resource Released List IE as being released. The appropriate cause value for each PDU session released may be included in the path switch request unsuccessful transfer IE contained in the PATH SWITCH REQUEST ACKNOWLEDGE message.

In an example, a handover cancellation procedure may be employed to enable a source NG-RAN node to cancel an ongoing handover preparation or an already prepared handover.

In an example, an Uplink RAN Status Transfer procedure may be employed to enable lossless NG-based handover. The source NG-RAN node may initiate the procedure by stopping the assigning of PDCP-SNs to downlink SDUs and sending the UPLINK RAN STATUS TRANSFER message to the AMF at the point in time when it considers the transmitter/receiver status to be frozen. For one or more DRB for which PDCP-SN and HFN status preservation applies, the source NG-RAN node may include the DRB ID IE, the UL COUNT Value IE and the DL COUNT Value IE within the DRBs Subject to Status Transfer List IE in the RAN Status Transfer Transparent Container IE of the UPLINK RAN STATUS TRANSFER message. The source NG-RAN node may include in the UPLINK RAN STATUS TRANSFER message the missing and the received uplink SDUs in the Receive Status of UL PDCP SDUs IE for each DRB for which the source NG-RAN node has accepted the request from the target NG-RAN node for uplink forwarding.

In an example, a Downlink RAN Status Transfer procedure may be employed to enable lossless NG-based handover. The AMF may initiate the procedure by sending the DOWNLINK RAN STATUS TRANSFER message to the target NG-RAN node. The target NG-RAN node using Full Configuration for this handover may ignore the information received in this message. For one or more DRB in the DRBs Subject to Status Transfer List IE within the RAN Status Transfer Transparent Container IE, the target NG-RAN node may not deliver any uplink packet which has a PDCP-SN lower than the value of the UL Count Value IE. For one or more DRB in the DRBs Subject to Status Transfer List IE within the RAN Status Transfer Transparent Container IE, the target NG-RAN node may employ the value of the DL COUNT Value IE for the first downlink packet for which there is no PDCP-SN yet assigned. If the Receive Status of UL PDCP SDUs IE is included for at least one DRB in the RAN Status Transfer Transparent Container IE of the DOWNLINK RAN STATUS TRANSFER message, the target NG-RAN node may use it in a Status Report message sent to the UE over the radio interface.

In an example embodiment, the handover request message, and/or the like may comprise one or more closed access group identifiers associated with the UE.

In an example embodiment, the handover request message, and/or the like may comprise the closed access group restriction indicator (a CAG-only indication, a CAG-only UE indication, a cell mobility restriction for the UE, and/or the like).

In an example embodiment, the handover request message, and/or the like may comprise the requested NSSAI for the CAG, [mapping of (requested) NSSAI for the CAG], default configured NSSAI indication for one or more CAGs associated with the wireless device/UE, and/or the like.

In an example embodiment, mobility procedures may be employed to establish necessary resources in an NG-RAN node. In an example, the source NG-RAN node may initiate the procedure by sending the HANDOVER REQUEST message to the target NG-RAN node. When the source NG-RAN node sends the HANDOVER REQUEST message, it may start a timer (e.g., TXnRELOCprep). For one or more E-RAB ID IE included in the QoS Flow To Be Setup List IE in the HANDOVER REQUEST message, the target NG-RAN node may, if supported, store the content of the IE in the UE context and use it for subsequent inter-system handover. If the Masked IMEISV IE is contained in the HANDOVER REQUEST message the target NG-RAN node may, if supported, use it to determine the characteristics of the UE for subsequent handling. At reception of the HANDOVER REQUEST message the target NG-RAN node may prepare the configuration of the AS security relation between the UE and the target NG-RAN node by using the information in the UE Security Capabilities IE and the AS Security Information IE in the UE Context Information IE. The target NG-RAN node may report in the HANDOVER REQUEST ACKNOWLEDGE message the successful establishment of the result for all the requested PDU session resources. When the target NG-RAN node reports the unsuccessful establishment of a PDU session resource, the cause value may be precise enough to enable the source NG-RAN node to know the reason for the unsuccessful establishment. For one or more PDU session(s) if the PDU Session Aggregate Maximum Bit Rate IE is included in the PDU Session Resources To Be Setup List IE contained in the HANDOVER REQUEST message, the target NG-RAN node may store the received PDU Session Aggregate Maximum Bit Rate in the UE context and use it when enforcing traffic policing for non-GBR QoS flows for the concerned UE. For one or more QoS flow(s) for which the source NG-RAN node proposes to perform forwarding of downlink data, the source NG-RAN node may include the DL Forwarding IE set to "DL forwarding proposed" within the QoS Flows To Be Setup List IE in the PDU Session Resource To Be Setup List IE in the HANDOVER REQUEST message. For each PDU session that the target NG-RAN node decides to admit the data forwarding for at least one QoS flow, the target NG-RAN node may include the PDU Session level DL data forwarding GTP-U Tunnel Endpoint IE within the Data Forwarding Info from target NG-RAN node IE in the PDU Session Admitted Response Transfer IE contained in the PDU Sessions Admitted List IE in the HANDOVER REQUEST ACKNOWLEDGE message. For one or more DRB(s) for which the source NG-RAN node proposes to perform forwarding of downlink data, the source NG-RAN node may include the DRB ID IE and the mapped QoS Flows List IE within the Source DRB to QoS Flow Mapping List IE contained in the PDU Session Resources To Be Setup List IE in the HANDOVER REQUEST message. The source NG-RAN node may include the QoS Flow Mapping Indication IE in the Source DRB to QoS Flow Mapping List IE to indicate that the uplink or downlink QoS flow is mapped to the DRB. If the target NG-RAN node decides to use the same DRB configuration and to map the same QoS flows as the source NG-RAN node, the target NG-RAN node may include the DL Forwarding GTP Tunnel Endpoint IE within the Data Forwarding Response DRB List IE in the HANDOVER REQUEST ACKNOWLEDGE message to indicate that it accepts the proposed forwarding of downlink data for this DRB. If the HANDOVER REQUEST ACKNOWLEDGE message contains the UL Forwarding GTP Tunnel Endpoint IE for a given DRB in the Data Forwarding Response DRB List IE within Data Forwarding Info from target NG-RAN node IE in the PDU Session Resources Admitted List IE and the source NG-RAN node accepts the data forwarding proposed by the target NG-RAN node, the source NG-RAN node may perform forwarding of uplink data for the DRB. If the HANDOVER REQUEST includes PDU session resources for PDU sessions associated to S-NSSAIs not supported by target NG-RAN, the target NG-RAN may reject such PDU session resources. In this case, and if at least one PDU Session Resource To Be Setup Item IE is admitted, the target NG-RAN may send the HANDOVER REQUEST ACKNOWLEDGE message including the PDU Session Resources Not Admitted List IE listing corresponding PDU sessions rejected at the target NG-RAN. If the Mobility Restriction List IE is contained in the HANDOVER REQUEST message, the target NG-RAN node may store the information received in the Mobility Restriction List IE in the UE context, use this information to determine a target for the UE during subsequent mobility action for which the NG-RAN node provides information about the target of the mobility action towards the UE, except when one of the PDU sessions has a particular ARP value in which case the information shall not apply, use this information to select a proper SCG during dual connectivity operation, use this information to select proper RNA(s) for the UE when moving the UE to RRC_INACTIVE, and/or the like.

In an example embodiment, the handover request message sent from the source NG-RAN node to the target NG-RAN node, and/or the like may comprise one or more closed access group identifiers (CAG IDs) associated with the UE.

In an example embodiment, the handover request message may comprise the closed access group restriction indicator (a CAG-only indication, a CAG-only UE indication, a cell mobility restriction for the UE, and/or the like).

In an example embodiment, the handover request message may comprise the requested NSSAI for the CAG, [mapping of (requested) NSSAI for the CAG], default configured NSSAI indication for one or more CAGs associated with the wireless device/UE, and/or the like.

In an example embodiment, the Mobility Restriction List IE may comprise the closed access group restriction indicator (a CAG-only indication, a CAG-only UE indication, a cell mobility restriction for the UE, and/or the like), one or more CAG IDs that the UE is allowed to access, one or more S-NSSAIs per CAG or a mapping of allowed NSSAIs for the CAG, and/or the like.

In an example embodiment, the source NG-RAN node may employ the CAG IDs, the closed access group restriction indicator, mapping of (requested) NSSAI for the CAG, and/or the like to select the target NG-RAN for handover of the UE. In an example, the target NG-RAN may employ the CAG IDs, the closed access group restriction indicator, mapping of (requested) NSSAI for the CAG, and/or the like to determine whether to accept or reject the handover request. For example, if the UE is restricted to CAG cells and not allowed to access via non-CAG cells and the target NG-RAN does not serve/support the CAG IDs associated with the UE, the handover request may be rejected.

If the Mobility Restriction List IE is not contained in the HANDOVER REQUEST message, the target NG-RAN node may consider that no roaming and no access restriction may apply to the UE.

In an example, if the Trace Activation IE is included in the HANDOVER REQUEST message the target NG-RAN node may, if supported, initiate the requested trace function. If the Index to RAT/Frequency Selection Priority IE is contained in the HANDOVER REQUEST message, the target NG-RAN node may store this information. For each PDU session, if the Network Instance IE is included in the PDU Session Resource To Be Setup List IE, the target NG-RAN node may, if supported, use it when selecting transport network resource.

For each PDU session for which the Security Indication IE is included in the PDU Session Resource To Be Setup List IE and the Integrity Protection Indication IE or Confidentiality Protection Indication IE is set to "required", the target NG-RAN node may perform user plane integrity protection or ciphering, respectively. If the NG-RAN node is not able to perform the user plane integrity protection or ciphering, it may reject the setup of the PDU Session Resources with an appropriate cause value. If the NG-RAN node is an ng-eNB, it may reject all PDU sessions for which the Integrity Protection Indication IE is set to "required".

For each PDU session for which the Security Indication IE is included in the PDU Session Resource To Be Setup List IE and the Integrity Protection Indication IE or the Confidentiality Protection Indication IE is set to "preferred", the target NG-RAN node may, if supported, perform user plane integrity protection or ciphering, respectively and shall notify the SMF whether it succeeded the user plane integrity protection or ciphering or not for the concerned security policy.

For each PDU session for which the Maximum Integrity Protected Data Rate IE is included in the Security Indication IE in the PDU Session Resources To Be Setup List IE, the NG-RAN node may store the respective information and, if integrity protection is to be performed for the PDU session, it may enforce the traffic corresponding to the received Maximum Integrity Protected Data Rate IE, for the concerned PDU session and concerned UE.

For each PDU session for which the Security Indication IE is included in the PDU Session Resource To Be Setup List IE and the Integrity Protection Indication IE or Confidentiality Protection Indication IE is set to "not needed", the target NG-RAN node may not perform user plane integrity protection or ciphering, respectively, for the concerned PDU session If the Location Reporting Information IE is included in the HANDOVER REQUEST message, then the target NG-RAN node should initiate the requested location reporting functionality. Upon reception of UE History Information IE in the HANDOVER REQUEST message, the target NG-RAN node may collect the information defined as mandatory in the UE History Information IE and shall, if supported, collect the information defined as optional in the UE History Information IE, for as long as the UE stays in one of its cells, and store the collected information to be used for future handover preparations.

In an example embodiment, if the target NG-RAN node does not admit at least one PDU session resource, or a failure occurs during the Handover Preparation, the target NG-RAN node may send the HANDOVER PREPARATION FAILURE message to the source NG-RAN node. The message may contain the Cause IE with an appropriate value. If there is no response from the target NG-RAN node to the HANDOVER REQUEST message before timer TXnRELOCprep expires in the source NG-RAN node, the source NG-RAN node may cancel the Handover Preparation procedure towards the target NG-RAN node by initiating the Handover Cancel procedure with the appropriate value for the Cause IE. The source NG-RAN node may ignore any HANDOVER REQUEST ACKNOWLEDGE or HANDOVER PREPARATION FAILURE message received after the initiation of the Handover Cancel procedure and remove any reference and release any resources related to the concerned Xn UE-associated signalling.

In an example embodiment, if the supported algorithms for encryption defined in the UE Security Capabilities IE in the UE Context Information IE, plus the mandated support of the EEA0 and NEA0 algorithms in all UEs do not match any allowed algorithms defined in the configured list of allowed encryption algorithms in the NG-RAN node, the NG-RAN node may reject the procedure using the HANDOVER PREPARATION FAILURE message.

In an example, SN Status Transfer procedure may be employed to transfer the uplink PDCP SN and HFN receiver status and the downlink PDCP SN and HFN transmitter status either, from the source to the target NG-RAN node during an Xn handover, or between the NG-RAN nodes involved in dual connectivity, for each respective DRB of the source DRB configuration for which PDCP SN and HFN status preservation applies. In an example, the source NG-RAN node may initiate the procedure by stop assigning PDCP SNs to downlink SDUs and stop delivering UL SDUs towards the 5GC and sending the SN STATUS TRANSFER message to the target NG-RAN node at the time point when it considers the transmitter/receiver status to be frozen. The target NG-RAN node using full configuration for this handover may ignore the information received in this message. For each DRB for which PDCP-SN and HFN status preservation applies, the source NG-RAN node may include the DRB ID IE, the UL COUNT Value IE and the DL COUNT Value IE within the DRBs Subject to Status Transfer List IE in the SN STATUS TRANSFER message. The source NG-RAN node may include in the SN STATUS TRANSFER message the missing and the received uplink SDUs in the Receive Status of UL PDCP SDUs IE for each DRB for which the source NG-RAN node has accepted the request from the target NG-RAN node for uplink forwarding. For each DRB in the DRBs Subject to Status Transfer List IE, the target NG-RAN node may not deliver any uplink packet which has a PDCP-SN lower than the value contained within the UL Count Value IE. For each DRB in the DRBs Subject to Status Transfer List IE, the target NG-RAN node may use the value of the PDCP SN contained within the DL COUNT Value IE for the first downlink packet for which there is no PDCP-SN yet assigned. If the Receive Status of UL PDCP SDUs IE is included for at least one DRB in the SN STATUS TRANSFER message, the target NG-RAN node may use it in a Status Report message sent to the UE over the radio interface.

In an example embodiment, a handover cancel procedure may be employed to enable a source NG-RAN node to cancel an ongoing handover preparation or an already prepared handover. The source NG-RAN node may initiate the procedure by sending the HANDOVER CANCEL message to the target NG-RAN node. The source NG-RAN node may indicate the reason for cancelling the handover by means of an appropriate cause value.

In an example embodiment, a retrieve ue context procedure may be employed. The Retrieve UE Context procedure may be employed to retrieve the UE context from the old NG-RAN node and transfer it to the NG-RAN node where the UE RRC Connection has been requested to be established, and/or to enable the old NG-RAN node to forward an RRC message to the UE via the new NG-RAN node without context transfer.

The new NG-RAN node may initiate the procedure by sending the RETRIEVE UE CONTEXT REQUEST message to the old NG-RAN node. If the old NG-RAN node is able to identify the UE context by means of the UE Context ID, and to successfully verify the UE by means of the integrity protection contained in the RETRIEVE UE CONTEXT REQUEST message, and decides to provide the UE context to the new NG-RAN node, it may respond to the new NG-RAN node with the RETRIEVE UE CONTEXT RESPONSE message. If the old NG-RAN node determines/decides to keep the UE context in case of periodic RNAU, it may store the Allocated C-RNTI IE and the Access PCI IE in the UE Context ID IE. If the Index to RAT/Frequency Selection Priority IE is contained in the RETRIEVE UE CONTEXT RESPONSE message, the new NG-RAN node may store this information. If the Location Reporting Information IE is included in the RETRIEVE UE CONTEXT RESPONSE message, then the new NG-RAN node may initiate the requested location reporting functionality.

In an example, if the old NG-RAN node is not able to identify the UE context by means of the UE Context ID, or if the integrity protection contained in the RETRIEVE UE CONTEXT REQUEST message is not valid, or, if it decides not to provide the UE context to the new NG-RAN node, it may respond to the new NG-RAN node with the RETRIEVE UE CONTEXT FAILURE message. If the Old NG-RAN node to New NG-RAN node Resume Container IE is included in the RETRIEVE UE CONTEXT FAILURE message, the new NG-RAN node may transparently forward the content of this IE to the UE.

In an example embodiment, the RETRIEVE UE CONTEXT REQUEST/RESPONSE message may comprise one or more closed access group identifiers (CAG IDs) associated with the UE.

In an example embodiment, the RETRIEVE UE CONTEXT REQUEST/RESPONSE message may comprise the closed access group restriction indicator (a CAG-only indication, a CAG-only UE indication, a cell mobility restriction for the UE, and/or the like).

In an example embodiment, the RETRIEVE UE CONTEXT REQUEST/RESPONSE message may comprise the requested NSSAI for the CAG, [mapping of (requested) NSSAI for the CAG], default configured NSSAI indication for one or more CAGs associated with the wireless device/UE, and/or the like.

In an example embodiment, based on one or more of the one or more closed access group identifiers (CAG IDs) associated with the UE, the closed access group restriction indicator, the requested NSSAI for the CAG, and/or the like, a RETRIEVE UE CONTEXT FAILURE message, a HANDOVER CANCEL operation, HANDOVER PREPARATION FAILURE message, and/or the like may be sent from the target NG-RAN node to the source NG-RAN node. In an example, the target RAN (NG-RAN) node may reject the handover if the UE cell access (CAG) restrictions do not allow the UE to handover to the target cell of the target NG-RAN. In an example, the target RAN (NG-RAN) node may reject the handover if one or more CAGs (CAG IDs) associated with the UE is not served/supported by the target cells of the target NG-RAN node.

In an example embodiment, cell level mobility may require (explicit) RRC signalling to be triggered, e.g., handover. For inter-gNB handover, the signalling procedures may comprise the following. A source gNB may initiate a handover and may issue a handover request over the Xn interface. A target gNB may perform admission control and may provide the RRC configuration as part of the Handover Acknowledgement. The source gNB may provide the RRC configuration to the UE in the Handover Command. The Handover Command message may comprise at least cell ID and all information required to access the target cell so that the UE can access the target cell without reading system information. For some cases, the information required for contention-based and contention-free random access may be included in the handover command message. The access information to the target cell may include beam specific information, if any. The UE may move the RRC connection to the target gNB and replies the handover complete.

The handover mechanism triggered by RRC may require the UE at least to reset the MAC entity and re-establish RLC. RRC managed handovers with and without PDCP entity re-establishment are both supported. For DRBs using RLC AM mode, PDCP may be re-established together with a security key change or initiate a data recovery procedure without a key change. For DRBs using RLC UM mode and for SRBs, PDCP may be re-established together with a security key change or remain as it is without a key change. Timer based handover failure procedure may be supported in NR. RRC connection re-establishment procedure may be employed for recovering from handover failure. Beam Level Mobility does not require explicit RRC signalling to be triggered. The gNB may provide via RRC signalling the UE with measurement configuration comprising configurations of SSB/CSI resources and resource sets, reports and trigger states for triggering channel and interference measurements and reports. SSB-based Beam Level Mobility may be based on the SSB associated to the initial DL BWP and can only be configured for the initial DL BWPs and for DL BWPs containing the SSB associated to the initial DL BWP. For other DL BWPs, Beam Level Mobility may be performed based on CSI-RS.

In an example embodiment, an intra-NR RAN handover may perform the preparation and execution phase of the handover procedure performed without involvement of the 5GC, e.g., preparation messages may be directly exchanged between the gNBs. The release of the resources at the source gNB during the handover completion phase may be triggered by the target gNB.

In an example embodiment, the UE context within the source gNB may comprise information regarding roaming and access restrictions which were provided either at connection establishment or at the last TA update. The source gNB may configures the UE measurement procedures and the UE reports according to the measurement configuration. The source gNB may determine/decide to handover the UE, based on Measurement Report and RRM information. The source gNB may issue a handover request message to the target gNB by passing/transmitting a transparent RRC container with necessary information to prepare the handover at the target side. The information may comprise at least the target cell ID, KgNB, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and may comprise the UE reported measurement information including beam-related information if available. The PDU session related information may comprise the slice information (if supported) and QoS flow level QoS profile(s). In an example, admission control may be performed by the target gNB. Slice-aware admission control may be performed if the slice information is sent to the target gNB.

In an example embodiment, the Slice-aware admission control may further comprise determining by the gNB that one or more requested slices or S-NSSAIs may not belong or be mapped to one or more CAGs. In an example, the gNB may determine not to admit based on CAG restrictions, NSSAI mapping of CAGs, and/or the like. The admission control may further comprise determining the admissibility based on the one or more of the one or more closed access group identifiers (CAG IDs) associated with the UE, the closed access group restriction indicator, the requested NSSAI for the CAG, and/or the like.

In an example, if the PDU sessions are associated with non-supported slices the target gNB may reject such PDU Sessions. The target gNB may prepare the handover with L1/L2 and may send the HANDOVER REQUEST ACKNOWLEDGE to the source gNB, which may comprise a transparent container to be sent to the UE as an RRC message to perform the handover. The source gNB may trigger the Uu handover by sending an RRCReconfiguration message to the UE, comprising the information required to access the target cell e.g., at least the target cell ID, the new C-RNTI, the target gNB security algorithm identifiers for the selected security algorithms, and/or the like. It may also include a set of dedicated RACH resources, the association between RACH resources and SSB(s), the association between RACH resources and UE-specific CSI-RS configuration(s), common RACH resources, and system information of the target cell, and/or the like. The source gNB may send the SN STATUS TRANSFER message to the target gNB. The UE may synchronise to the target cell and may complete the RRC handover procedure by sending RRCReconfigurationComplete message to target gNB. The target gNB may sends a PATH SWITCH REQUEST message to the AMF to trigger 5GC to switch the DL data path towards the target gNB and to establish an NG-C interface instance towards the target gNB. 5GC may switch the DL data path towards the target gNB. The UPF may send one or more "end marker" packets on the old path to the source gNB per PDU session/tunnel and then may release any U-plane/TNL resources towards the source gNB. The AMF may confirms the PATH SWITCH REQUEST message with the PATH SWITCH REQUEST ACKNOWLEDGE message. Upon reception of the PATH SWITCH REQUEST ACKNOWLEDGE message from the AMF, the target gNB may send the UE CONTEXT RELEASE to inform the source gNB about the success of the handover. The source gNB may release radio and C-plane related resources associated to the UE context. Any ongoing data forwarding may continue. The RRM configuration may comprise beam measurement information (for layer 3 mobility) associated to SSB(s), CSI-RS(s) for the reported cell(s) if both types of measurements are available, and/or the like.

In an example, the U-plane handling during the Intra-NR-Access mobility activity for UEs in RRC_CONNECTED may take the following principles into account to avoid data loss during HO. During HO preparation U-plane tunnels may be established between the source gNB and the target gNB. During HO execution, user data may be forwarded from the source gNB to the target gNB. Forwarding may take place in order as long as packets are received at the source gNB from the UPF or the source gNB buffer has not been emptied.

In an example, during HO completion, the target gNB may send a path switch request message to the AMF to inform that the UE has gained access and the AMF may trigger path switch related 5GC internal signalling and actual path switch of the source gNB to the target gNB in UPF. The source gNB may continue forwarding data as long as packets are received at the source gNB from the UPF or the source gNB buffer has not been emptied.

In an example, for RLC-AM bearers, for in-sequence delivery and duplication avoidance, PDCP SN may be maintained on a per DRB basis and the source gNB may inform the target gNB about the next DL PDCP SN to allocate to a packet which does not have a PDCP sequence number. For security synchronization, HFN may be maintained and the source gNB may provide to the target one reference HFN for the UL and one for the DL e.g., HFN and corresponding SN. In both the UE and the target gNB, a window-based mechanism may be employed for duplication detection and reordering. The occurrence of duplicates over the air interface in the target gNB may be minimized by means of PDCP SN based reporting at the target gNB by the UE. In uplink, the reporting may be configured on a per DRB basis by the gNB and the UE may first start by transmitting those reports when granted resources are in the target gNB. In downlink, the gNB may decide when and for which bearers a report may be sent and the UE may not wait for the report to resume uplink transmission. The target gNB may re-transmit and prioritize downlink data forwarded by the source gNB (i.e. the target gNB may first send all forwarded PDCP SDUs with PDCP SNs, then all forwarded downlink PDCP SDUs without SNs before sending new data from 5GC). The UE may re-transmit in the target gNB uplink PDCP SDUs starting from the oldest PDCP SDU that has not been acknowledged at RLC in the source.

In an example, for RLC-UM bearers, the PDCP SN and HFN may be reset in the target gNB. No PDCP SDUs are retransmitted in the target gNB, the target gNB may prioritise downlink SDAP SDUs forwarded by the source gNB over the data from the core network. The UE may not retransmit any PDCP SDU in the target cell for which transmission had been completed in the source cell.

The intra NR handover may further comprise data forwarding. In an example, the source NG-RAN node may determine/suggest downlink data forwarding per QoS flow established for a PDU session and may provide information how it maps QoS flows to DRBs. The target NG-RAN node may determine/decide data forwarding per QoS flow established for a PDU Session. If "lossless handover" is required and the QoS flows to DRB mapping applied at the target NG-RAN node allows applying for data forwarding the same QoS flows to DRB mapping as applied at the source NG-RAN node for a DRB and if all QoS flows mapped to that DRB are accepted for data forwarding, the target NG-RAN node establishes a downlink forwarding tunnel for that DRB. For a DRB for which preservation of SN status applies, the target NG-RAN node may decide/determine to establish an UL data forwarding tunnel. The target NG-RAN node may determine/decide to establish a downlink forwarding tunnel for each PDU session. In this case the target NG-RAN node may provide information for which QoS flows data forwarding has been accepted and corresponding UP TNL information for data forwarding tunnels to be established between the source NG-RAN node and the target NG-RAN node. As long as data forwarding of DL user data packets takes place, the source NG-RAN node may forward user data in the same forwarding tunnel. For any QoS flow accepted for data forwarding by the target NG-RAN node and for which a DRB DL forwarding tunnel was established for a DRB to which this QoS flow was mapped at the source NG-RAN node, any fresh packets of this QoS flow may be forwarded as PDCP SDUs via the mapped DRB DL forwarding tunnel. For DRBs for which preservation of SN status applies, the source NG-RAN node may forward in order to the target NG-RAN node via the DRB DL forwarding tunnel all downlink PDCP SDUs with their SN corresponding to PDCP PDUs which have not been acknowledged by the UE. For any QoS flow accepted for data forwarding by the target NG-RAN node for which a DL PDU session forwarding tunnel was established, the source NG-RAN node may forward SDAP SDUs as received on NG-U from the UPF. As long as data forwarding of UL user data packets takes place for DRBs for which preservation of SN status applies the source NG-RAN node may discard the uplink PDCP PDUs received out of sequence if the source NG-RAN node has not accepted the request from the target NG-RAN node for uplink forwarding or if the target NG-RAN node has not requested uplink forwarding for the bearer during the Handover Preparation procedure. The source NG-RAN node may forward to the target NG-RAN node the uplink PDCP SDUs with their SN corresponding to PDCP PDUs received out of sequence if the source NG-RAN node has accepted the request from the target NG-RAN node for uplink forwarding for the bearer during the Handover Preparation procedure.

In an example, handling of end marker packets may comprise the following. The source NG-RAN node may receive one or several GTP-U end marker packets per PDU session from the UPF and may replicate the end marker packets into one or more data forwarding tunnel when no more user data packets are to be forwarded over that tunnel. End marker packets sent via a data forwarding tunnel may be applicable to all QoS flows forwarded via that tunnel. After end marker packets have been received over a forwarding tunnel, the target NG-RAN node may start taking into account the packets of QoS flows associated with that forwarding tunnel received at the target NG-RAN node from the NG-U PDU session tunnel.

In an example, a UE in RRC_CONNECTED may initiate the re-establishment procedure to continue the RRC connection when a failure condition occurs (e.g., radio link failure, reconfiguration failure, integrity check failure, and/or the like). The UE may re-establish the connection, providing the UE Identity (PCI+C-RNTI) to the gNB where the trigger for the re-establishment occurred. If the UE Context is not locally available, the gNB, may request the last serving gNB to provide UE Context data. The last serving gNB may provide the UE context data. The gNB may continue the re-establishment of the RRC connection. The message may be sent on SRB1. The gNB may perform the reconfiguration to re-establish SRB2 and DRBs when the re-establishment procedure is ongoing. If loss of DL user data buffered in the last serving gNB may be prevented, the gNB may provide forwarding addresses. The gNB may perform path switch. The gNB may trigger the release of the UE resources at the last serving gNB.

In an example embodiment, in RRC_CONNECTED mode, the network may control UE mobility, for example, the network may decide when the UE connects to which NR cell(s) or inter-RAT cell (e.g., E-UTRA). For network controlled mobility in RRC_CONNECTED, the PCell may be changed using an RRC Connection Reconfiguration message including the mobilityControlInfo (handover). The SCell(s) may be changed using the RRC Connection Reconfiguration message either with or without the mobilityControlInfo. The network may trigger the handover procedure e.g. based on radio conditions, load, QoS, UE category, and/or the like. To facilitate this, the network may configure the UE to perform measurement reporting (possibly including the configuration of measurement gaps). The network may also initiate handover blindly, for example without having received measurement reports from the UE. Before sending the handover message to the UE, the source gNB may prepare one or more target cells. The source gNB may select the target PCell. The source gNB may also provide the target gNB with a list of best cells on each frequency for which measurement information is available, for example, in order of decreasing RSRP. The source gNB may also include available measurement information for the cells provided in the list. The target gNB may decide which SCells are configured for use after handover, which may include cells other than the ones indicated by the source gNB.

According to some of the various aspects of embodiments, the target gNB may generate a message used to configure the UE for the handover, for example, the message including the access stratum configuration to be used in the target cell(s). The source gNB may transparently (for example, does not alter values/content) forward the handover message/information received from the target gNB to the UE. When appropriate, the source gNB may initiate data forwarding for (a subset of) the dedicated radio bearers. After receiving the handover message, the UE may attempt to access the target PCell at the available RACH occasion according to a random access resource selection. When allocating a dedicated preamble for the random access in the target PCell, RAN may ensure the preamble is available from the first RACH occasion the UE may use. Upon successful completion of the handover, the UE may send a message used to confirm the handover to the target gNB.

According to some of the various aspects of embodiments, if the target gNB does not support the release of RRC protocol which the source gNB used to configure the UE, the target gNB may be unable to comprehend the UE configuration provided by the source gNB. In this case, the target gNB may use the full configuration option to reconfigure the UE for handover and re-establishment. Full configuration option includes an initialization of the radio configuration, which makes the procedure independent of the configuration used in the source cell(s) with the exception that the security algorithms are continued for the RRC re-establishment.

According to some of the various aspects of embodiments, after the successful completion of handover, PDCP SDUs may be re-transmitted in the target cell(s). This may apply for dedicated radio bearers using RLC-AM mode and/or for handovers not involving full configuration option. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. UE behaviour to be performed upon handover may be the same regardless of the handover procedures used within the network (e.g. whether the handover includes Xn or N2 signaling procedures).

The source gNB may, for some time, maintain a context to enable the UE to return in case of handover failure. After having detected handover failure, the UE may attempt to resume the RRC connection either in the source PCell or in another cell using the RRC re-establishment procedure. This connection resumption may succeed if the accessed cell is prepared. For example, when the access cell is a cell of the source gNB or of another gNB towards which handover preparation has been performed. The cell in which the re-establishment procedure succeeds becomes the PCell while SCells, if configured, may be released.

Normal measurement and mobility procedures may be used to support handover to cells broadcasting a CSG (closed subscriber group) identity. In addition, RAN may configure the UE to report that it is entering or leaving the proximity of cell(s) included in its CSG whitelist. RAN may request the UE to provide additional information broadcast by the handover candidate cell e.g. cell global identity, CSG identity, CSG membership status. RAN may use the proximity report to configure measurements as well as to decide whether or not to request additional information broadcast by the handover candidate cell. The additional information may be used to verify whether or not the UE is authorized to access the target PCell and may also be needed to identify handover candidate cell. This may involve resolving PCI confusion, for example, when the physical layer identity that is included in the measurement report may not uniquely identify the cell.

The purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from RAN to the UE. If the received RRC (Connection) Reconfiguration message includes the sCellToReleaseList, UE performs SCell release. If the received RRC Connection Reconfiguration message includes the sCellToAddModList, UE performs SCell additions or modification.

The UE context within the source gNB may contain information regarding roaming/handover restrictions which may be provided either at connection establishment or at the last TA (tracking area) update process. The source gNB may configure the UE measurement procedures employing at least one RRC connection reconfiguration message. The UE may be triggered to send at least one measurement report by the rules set by, for example, system information, RRC configuration, and/or the like. The source gNB may make a handover decision based on many parameters, for example, the measurement reports, RRM information, traffic and load, a combination of the above, and/or the like. The source gNB may initiate the handover procedure by sending a handover request message to one or more potential target gNBs. When the source gNB sends the handover request message, it may start a handover preparation timer. Upon reception of the handover request acknowledgement message the source gNB may stop the handover preparation timer.

In an Xn handover process, the source gNB may transmit a handover request message to one or more potential target gNB passing information to prepare the handover at the target side. The handover request message may comprise one or more closed access group identifiers associated with the UE. The handover request message may comprise the closed access group restriction indicator (a CAG-only indication, a CAG-only UE indication, a cell mobility restriction for the UE, and/or the like. In an example embodiment, handover request message may further comprise the requested NSSAI for the CAG, [mapping of (requested) NSSAI for the CAG], default configured NSSAI indication for one or more CAGs associated with the wireless device/UE, and/or the like. In an example, a Mobility Restriction IE in the handover request message may comprise the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like. In an example embodiment, a UE context information IE in the handover request message may comprise the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like.

In an example embodiment, the handover required message, the handover command message, mobility restriction IE, the handover request message, and/or the like may comprise one or more closed access group identifiers associated with the UE.

In an example embodiment, the handover required message, the handover command message, mobility restriction IE, the handover request message, and/or the like may comprise the closed access group restriction indicator (a CAG-only indication, a CAG-only UE indication, a cell mobility restriction for the UE, and/or the like).

In an example embodiment, the handover required message, the handover command message, mobility restriction IE, the handover request message, and/or the like may comprise the requested NSSAI for the CAG, [mapping of (requested) NSSAI for the CAG], default configured NSSAI indication for one or more CAGs associated with the wireless device/UE, and/or the like.

In an N2 handover process without AMF relocation, the source gNB may transmit a handover required message to an AMF for one or more potential target gNB, and the AMF may transmit a handover request message to the potential target gNBs. The handover required message and/or the handover request message may pass information to prepare the handover at the target side. The handover required message and/or the handover request message may comprise the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like. In an example, a Source to Target Transparent Container IE in the handover required message and/or the handover request message may contain the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], default configured NSSAI indication for one or more CAGs associated with the wireless device/UE, and/or the like.

In an N2 handover process relocating an AMF, the source gNB may transmit a handover required message to a source AMF for one or more potential target gNB, the source AMF may transmit a forward relocation request message to one or more potential target AMFs serving the potential target gNBs, and the potential target AMFs may transmit a handover request message to the potential target gNBs. The handover required message, the forward relocation request message, and/or the handover request message may pass information to prepare the handover at the target side. The handover required message, the forward relocation request message, and/or the handover request message may comprise the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], allowed NSSAIs per CAG, default configured NSSAI indication for one or more CAGs associated with the wireless device/UE, and/or the like. In an example, a Source to Target Transparent Container IE in the handover required message and/or the handover request message may contain the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], allowed NSSAIs per CAG, default configured NSSAI indication for one or more CAGs associated with the wireless device/UE, and/or the like. In an example, an RAN Transparent Container IE in the forward relocation request message may contain the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], allowed NSSAIs per CAG, default configured NSSAI indication for one or more CAGs associated with the wireless device/UE, and/or the like.

During the handover preparation phase, the serving gNB may transmit the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], allowed NSSAIs per CAG, default configured NSSAI indication for one or more CAGs associated with the wireless device/UE, and/or the like to one or more potential target gNBs. This information may be employed, at least in part, by the potential target gNB, for example, to configure the UE admission control, accept/reject a handover request, and/or the like. This information may be employed, at least in part, by the potential target gNB, for example, to transmit to the next one or more potential gNBs that the UE may handover. This information may be employed, at least in part, by the potential target gNB, for example, to determine the one or more cells (the CAG cells, normal cells, and/or the like that may serve the UE and that may be employed after completing the handover.

The target gNB may employ the one or more closed access group identifiers associated with the UE, the closed access group restriction indicator (a CAG-only indication, a CAG-only UE indication, a cell mobility restriction for the UE, and/or the like, the requested NSSAI for the CAG, [mapping of (requested) NSSAI for the CAG], allowed NSSAIs per CAG, default configured NSSAI indication for one or more CAGs associated with the wireless device/UE, and/or the like in order to properly configure the UE before UE connects to the target gNB. The target gNB may configure the UE considering the one or more closed access group identifiers associated with the UE, the closed access group restriction indicator (a CAG-only indication, a CAG-only UE indication, a cell mobility restriction for the UE, and/or the like, the requested NSSAI for the CAG, [mapping of (requested) NSSAI for the CAG], allowed NSSAIs per CAG, default configured NSSAI indication for one or more CAGs associated with the wireless device/UE, and/or the like. For example, if the UE does not support the CAG IDs associated with one or more cells of the target gNB, the target gNB may reject the request by sending a handover failure message with an appropriate error cause, and/or the like.

Handover admission control may be performed by the target gNB dependent on many factors, for example, QoS required for the UE bearers, UE capabilities, UE configuration, target gNB load, a combination of the above, and/or the like. The target gNB may configure the required resources according to the received information from the serving gNB and may reserve a C-RNTI and/or a RACH preamble. The access stratum configuration to be used in the target cell may be specified independently (for example as an establishment) or as a delta compared to the access stratum-configuration used in the source cell (for example as a reconfiguration).

The target gNB may prepare handover with L1/L2 and may send the handover request acknowledge message to the source gNB. In an Xn handover procedure, the handover request acknowledge message may include a transparent container to be sent to the UE as an RRC message to perform the handover. In an N2 handover procedure without AMF relocation, the handover request acknowledge message from the target gNB to the AMF and/or the handover command message from the AMF to the source gNB may include a transparent container to be sent to the UE as an RRC message to perform the handover. In an N2 handover procedure relocating an AMF, the handover request acknowledge message from the target gNB to the target AMF, the forward relocation response message from the target AMF to the source AMF, and/or the handover command message from the source AMF to the source gNB may include a transparent container to be sent to the UE as an RRC message to perform the handover. The container may include a new C-RNTI, target gNB security algorithm identifiers for the selected security algorithms, a dedicated RACH preamble, access parameters, SIBs, and/or other configuration parameters. The transparent container may further comprise the one or more closed access group identifiers associated with the UE, the closed access group restriction indicator (a CAG-only indication, a CAG-only UE indication, a cell mobility restriction for the UE, and/or the like), the requested NSSAI for the CAG, [mapping of (requested) NSSAI for the CAG], allowed NSSAIs per CAG, default configured NSSAI indication for one or more CAGs associated with the wireless device/UE, and/or the like. The target gNB may modify the transparent container, context of the UE, and/or the like or may keep the same transparent container, context, and/or the like that the UE has with the serving base station. The target gNB may generate the RRC message to perform the handover, for example, RRC connection reconfiguration message including the mobility control information. The RRC message may be sent by the source gNB towards the UE.

The source gNB may perform the necessary integrity protection and ciphering of the message. The UE may receive the RRC connection reconfiguration message from the source gNB and may start performing the handover. The UE may not need to delay the handover execution for delivering the HARQ/ARQ responses to the source gNB.

After receiving the RRC connection reconfiguration message including the mobility control information, UE may perform synchronization to the target gNB and accesses the target cell via RACH on the primary cell. The UE Random access procedure may employ a contention-free procedure if a dedicated RACH preamble was indicated in the mobility control information. The UE random access procedure may employ a contention-based procedure if no dedicated preamble was indicated. The UE may derive target gNB specific keys and may configure the selected security algorithms to be used in the target cell. The target gNB may respond with uplink allocation and timing advance.

After the UE has successfully accessed the target cell, the UE may send an RRC connection reconfiguration complete message (C-RNTI) to confirm the handover and to indicate that the handover procedure is completed for the UE. UE may transmit a MAC uplink Buffer Status Report (BSR) Control Element (CE) along with the uplink RRC Connection Reconfiguration Complete message or may transmit a MAC uplink BSR CE whenever possible to the target gNB. In an example, UE may transmit, along with the RRC Connection Reconfiguration Complete message, a path switch request message that the receiving gNB may consider when switching the DL data path towards the target gNB and to establish an NG-C interface instance towards the target gNB for the UE. The target gNB verifies the C-RNTI sent in the RRC (Connection) Reconfiguration Complete message. The target gNB may now begin sending data to the UE and receiving data from the UE.

After receiving the RRC (Connection) Reconfiguration Complete message, the target gNB may release the UE resources at the last serving gNB.

Figure 21:
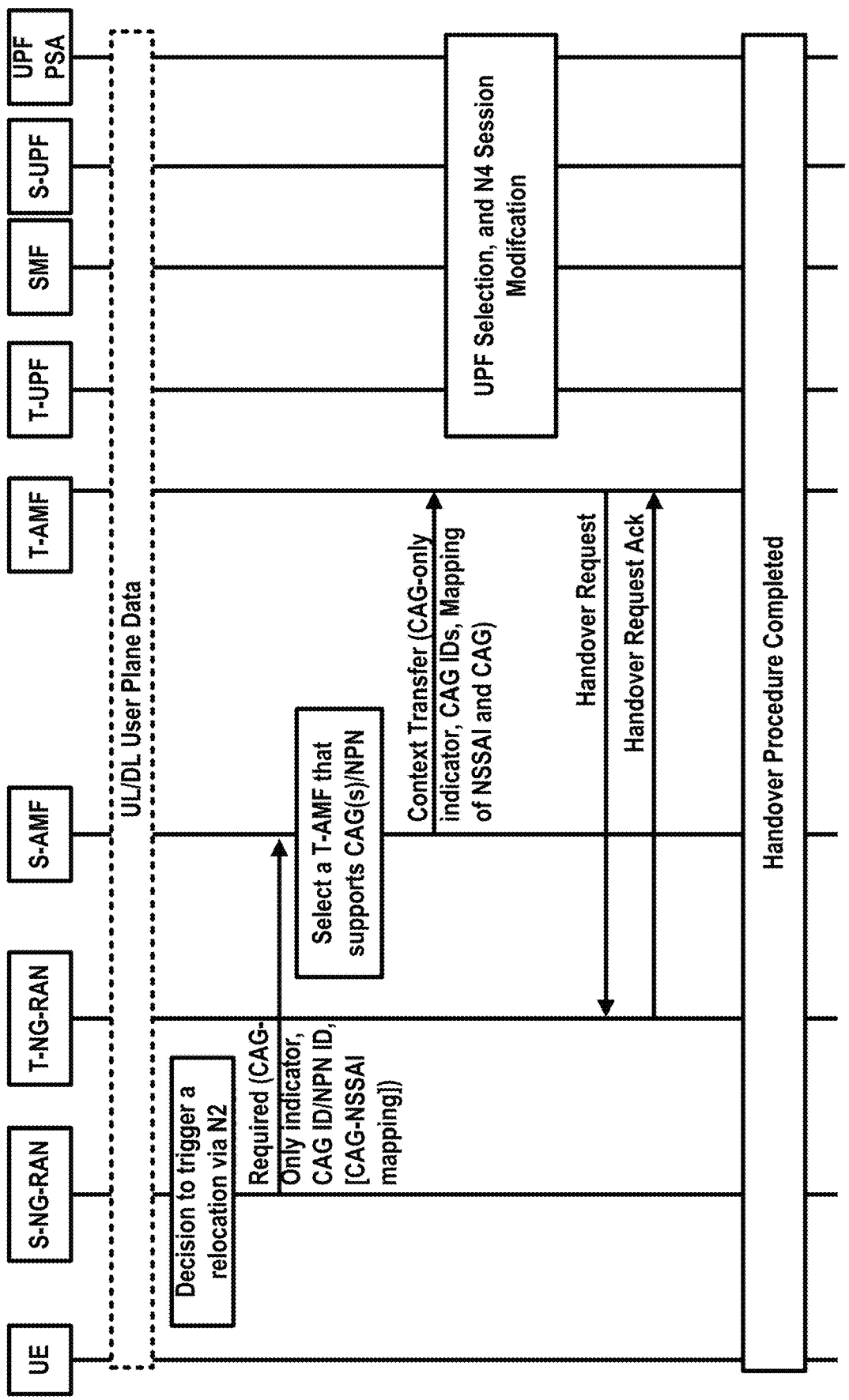
FIG. 21 is an example call flow as per an aspect of an embodiment of the present disclosure.

In an example embodiment as depicted in FIG. 21, an inter NG-RAN node N2 based handover procedure without Xn interface may be employed. In an example, the source NG-RAN may determine/decide to initiate an N2-based handover to the target NG-RAN. This may be triggered, for example, due to new radio conditions or load balancing, if there is no Xn connectivity to the target NG-RAN, an error indication from the target NG-RAN after an unsuccessful Xn-based handover (i.e. no IP connectivity between T-RAN and S-UPF), based on dynamic information learnt by the S-RAN, and/or the like. The availability of a direct forwarding path may be determined in the source NG-RAN and indicated to the SMFs. If IP connectivity is available between the source and target NG-RAN and security association(s) is in place between them, a direct forwarding path is available. If a direct forwarding path is not available, indirect forwarding may be used. The SMFs may employ the indication from the source NG-RAN to determine whether to apply indirect forwarding. In the case of handover to a shared network, the source NG-RAN may determine a PLMN to be used in the target network. The source NG-RAN may indicate the selected PLMN ID, NPN ID, CAG ID, and/or the like to be used in the target network to the AMF as part of the Tracking Area sent in the HO Required message. If the AMF may generate the N2 downlink signalling during the ongoing handover and may receive a rejection to a N2 interface procedure (e.g. DL NAS message transfer; Location reporting control, and/or the like) from the NG-RAN with an indication that an Inter NG-RAN node handover procedure is in progress, the AMF may reattempt the same N2 interface procedure either when the handover is complete or the handover is deemed to have failed if the AMF is still the serving AMF, when possible. If the Inter NG-RAN node handover changes the serving AMF, the source AMF may terminate any other ongoing N2 interface procedures except the handover procedure. In an example, if during the handover procedure the AMF determines/detects that the AMF needs be changed, the AMF may reject any SMF initiated N2 request received since handover procedure started and may include an indication that the request has been temporarily rejected due to handover procedure in progress. Upon reception for an SMF initiated N1 and/or N2 request(s) with an indication either from the NG-RAN (via N2 SM Info) or AMF that the request has been temporarily rejected due to handover procedure in progress, the SMF may stars a locally configured guard timer. The SMF may hold any signalling messages targeted towards AMF for a given UE during the handover preparation phase unless it detects that the handover execution is completed or handover has failed/cancelled. The SMF may re-attempt, up to a pre-configured number of times, when either it detects that the handover is completed or has failed using message reception or at expiry of the guard timer.

In an example as depicted in FIG. 21, a S-RAN may send to a S-AMF a Handover Required message. The handover required message may comprise a Target ID, Source to Target transparent container, SM N2 info list, PDU Session IDs, intra system handover indication. In an example, the Target ID may comprise a selected PLMN ID, NPN ID, NID, CAG ID, and/or the like. The Source to Target transparent container may comprise NG-RAN information created by S-RAN to be used by T-RAN, and may be transparent to 5GC. It may further comprise for each PDU session the corresponding User Plane Security Enforcement information, QoS flows/DRBs information subject to data forwarding. All PDU Sessions handled by S-RAN (e.g., all existing PDU Sessions with active UP connections) may be included in the Handover Required message, indicating which of those PDU Session(s) are requested by S-RAN to handover. The SM N2 info may comprise Direct Forwarding Path Availability (indication) if direct data forwarding is not available. Direct Forwarding Path Availability may indicate whether direct forwarding is available from the S-RAN to the T-RAN. This indication from S-RAN may be based on e.g., the presence of IP connectivity and security association(s) between the S-RAN and the T-RAN.

In an example, T-AMF Selection may be performed. When the S-AMF can't serve the UE anymore, the S-AMF may select the T-AMF. In an example, the T-AMF may be selected based on CAGs, CAG IDs, NPN support, and/or the like.

In an example embodiment, the AMF selection functionality may be applicable to both 3GPP access and non-3GPP access. The AMF selection functionality may be supported by the 5G-AN (e.g. RAN, N3 IWF) and may be employed to select an AMF for a given UE. An AMF may support the AMF selection functionality to select an AMF for relocation or because the initially selected AMF may not be an appropriate AMF to serve the UE (e.g. due to CAG restriction, NPN, allowed NSSAI for the CAGs associated with the UE, due to change of Allowed NSSAI, and/or the like). Other CP NF(s), e.g. SMF, may support the AMF selection functionality to select an AMF from the AMF set when the original AMF serving a UE is unavailable.

5G-AN, RAN, NG-RAN, and/or the like may select an AMF Set and an AMF from the AMF Set. The AMF selection functionality in the 5G-AN may consider the following factors for selecting the AMF Set: AMF Region ID and AMF Set ID derived from GUAMI, Requested NSSAI, Local operator policies, one or more CAG IDs, CAGs, NPN ID, CAG restriction indicator(s), and/or the like. AMF selection functionality in the 5G-AN or CP NFs may consider the following factors for selecting an AMF from AMF Set: Availability of candidate AMFs, Load balancing across candidate AMFs (e.g. considering weight factors of candidate AMFs in the AMF Set), and/or the like.

In an example, the AMF or other CP NFs may employ an NRF to discover the AMF instance(s) unless AMF information is available by other means, e.g. locally configured on AMF or other CP NFs. A Nnrf discovery and selection procedure may be employed. The AMF may send a Nnrf discovery request to the NRF indicating the CAGs, CAG ID, CAG restriction indicators, and/or the like. The NRF may provide the IP address or the FQDN of AMF instance(s) or the Endpoint Address(es) of AMF service instance(s) to the AMF or other CP NFs. The AMF selection function in the AMF or other CP NFs may select an AMF instance based on the available AMF instances (obtained from the NRF or locally configured in the AMF or other CP NFs). In an example, the AMF selection functionality in AMF or other CP NFs may employ GUAMI, TAI to discover the AMF instance(s), the NRF may provides the IP address, or the FQDN of the associated AMF instance(s) or the Endpoint Address(es) of the associated AMF service instance(s) if it is available. If the associated AMF is unavailable due to AMF planned removal, the backup AMF used for planned removal may be provided by the NRF. If the associated AMF is unavailable due to AMF failure, the backup AMF used for failure may be provided by the NRF. If no AMF instances related to the indicated GUAMI can be found or AMF Pointer value used by more than one AMF is found, a list of candidate AMF instances in the same AMF Set together with additional information (e.g. priority) may be provided by the NRF. The NRF may provide the TAI(s), if available. In this case, other CP NF may select any AMF instance from the list of candidate AMF instances. AMF selection functionality in AMF may employ AMF Set ID to discover the AMF instance(s), the NRF may provide a list of AMF/AMF service instances in the same AMF Set together with additional information (e.g. priority).

At intra-PLMN mobility, the AMF selection functionality in source AMF may employ CAG IDs supported by the source AMF, source AMF Set ID, source AMF Region ID, and the target location information, S-NSSAI(s) of Allowed NSSAI to discover target AMF instance(s), and/or the like. The NRF may provide the target AMF instance belonged to the target AMF set in target AMF Region which may be the mapping of the source AMF set in source AMF region. In an example, at inter PLMN mobility, inter NPN mobility, mobility within one or more CAGs, the source AMF may select an AMF in the target PLMN, NPN, CAG, via the PLMN, NPN, CAG level NRF.

In an example, the S-AMF may send to the T-AMF, a Namf_Communication_CreateUEContext Request. The request may comprise N2 Information (e.g., Target ID, Source to Target transparent container, SM N2 information list, PDU Session IDs, Service area restriction, and/or the like), UE context information (e.g., SUPI, Allowed NSSAI for each Access Type if available, Tracing Requirements, the list of PDU Session IDs along with the corresponding SMF information and the corresponding S-NSSAI(s), PCF ID(s), DNN, and/or the like), and/or the like. If the subscription information includes Tracing Requirements, the old AMF may provide the target AMF with Tracing Requirements. In an example, the Namf_Communication_CreateUEContext Request message may further comprise the one or more closed access group identifiers associated with the UE, the closed access group restriction indicator (a CAG-only indication, a CAG-only UE indication, a cell mobility restriction for the UE, and/or the like, the requested NSSAI for the CAG, allowed NSSAI per CAG, [mapping of (requested) NSSAI for the CAG], default configured NSSAI indication for one or more CAGs associated with the wireless device/ UE, and/or the like.

In an example, the S-AMF may initiate a handover resource allocation procedure by invoking the Namf_Communication_CreateUEContext service operation towards the T-AMF. If Service area restrictions are available in the S-AMF, they may be forwarded to the T-AMF. If both Home and Visited PCF ID(s) are provided by the S-AMF, the T-AMF may contact the (V-) PCF identified by the (V-)PCF ID. If the (V-)PCF identified by the (V-)PCF ID is not used or there are no PCF ID(s) received from the S-AMF, the T-AMF may select the PCF(s). The T-AMF may inform the S-AMF that the PCF ID is not used and then the S-AMF may terminate the AM Policy Association with the PCF identified by the PCF ID. In an example, the T-AMF may send to the SMF, a Nsmf_PDUSession_UpdateSMContext that may comprise PDU Session ID, Target ID, T-AMF ID, N2 SM Info (Secondary RAT Usage Data), and/or the like. For one or more PDU Session(s) indicated by S-RAN, the AMF may invoke the Nsmf_PDUSession_UpdateSMContext Request to the associated SMF. However, if the S-NSSAI associated with PDU Session is not available in the T-AMF, the T-AMF may not invoke Nsmf_PDUSession_UpdateSMContext for this PDU Session. The PDU Session ID may indicate a PDU Session candidate for N2 Handover. Target ID may indicate the UE location information, CAG cells the UE is connected to, and/or the like. SM N2 Info may include the Direct Forwarding Path Availability. If the (T-)AMF determines/detects that the UE moves into a non-allowed area based on Service area restrictions, CAG restrictions, mobility restriction, and/or the like, the (T-)AMF may notify each SMF corresponding to the list of PDU Sessions received from the Handover Required message that the UE is only reachable for regulatory prioritized services. Based on the Target ID, the SMF may check if N2 Handover for the indicated PDU Session may be accepted. The SMF may check the UPF Selection Criteria. If the UE has moved out of the service area of the UPF connecting to NG-RAN, the SMF may select a new intermediate UPF.

The SMF may send to UPF (PSA) an N4 Session Modification Request. If the SMF selects a new UPF to act as intermediate UPF for the PDU Session, and the different CN Tunnel Info need be used, the SMF may send N4 Session Modification Request message to UPF (PSA). The SMF may provide the CN Tunnel Info (on N9) if the CN Tunnel Info is allocated by the SMF, and UL Packet detection rules associate the CN Tunnel Info (on N9) to be installed on the UPF (PSA). The UPF (PSA) may send to the SMF an N4 Session Modification Response. The UPF (PSA) may send an N4 Session Establishment Response message to the SMF. If the UPF (PSA) allocates CN Tunnel Info (on N9) of UPF (PSA), it may provide CN Tunnel Info (on N9) to the SMF. The UPF (PSA) may associate the CN Tunnel Info (on N9) with UL Packet detection rules provided by the SMF. The SMF may send to T-UPF (intermediate) an N4 Session Establishment Request. If the SMF selects a new intermediate UPF, e.g., the target UPF (T-UPF), for the PDU Session and if CN Tunnel Info is allocated by the T-UPF, an N4 Session Establishment Request message may be sent to the T-UPF, providing Packet detection, enforcement and reporting rules to be installed on the T-UPF. The CN Tunnel Info (on N9) of UPF (PSA) for this PDU Session, which is used to setup N9 tunnel, may be provided to the T-UPF. The T-UPF (intermediate) may send to the SMF an N4 Session Establishment Response. The T-UPF may send an N4 Session Establishment Response message to the SMF with DL CN Tunnel Info and UL CN Tunnel Info (i.e. N3 tunnel info). The SMF may start a timer to release the resource of S-UPF.

In an example, the SMF may send to the T-AMF a Nsmf_PDUSession_UpdateSMContext Response that may comprise PDU Session ID, N2 SM Information, Reason for non-acceptance, and/or the like. If N2 handover for the PDU Session is accepted, the SMF may include in the Nsmf_PDUSession_UpdateSMContext response the N2 SM Information containing the N3 UP address and the UL CN Tunnel ID of the UPF and the QoS parameters indicating that the N2 SM Information is for the Target NG-RAN. If the Direct Forwarding Path Availability indicates direct forwarding is not available and the SMF knows that there is no indirect data forwarding connectivity between source and target, the N2 SM Information may comprise a Data forwarding not possible indication. If N2 handover for the PDU Session is not accepted, the SMF may not include an N2 SM Information regarding the PDU Session to avoid establishment of radio resources at the target NG-RAN. The SMF may provide a reason for non-acceptance. If the SMF is notified that the UE is only reachable for regulatory prioritized services, the SMF may not include any N2 SM info regarding the PDU Session for non-regulatory prioritized services to avoid establishment of radio resources at the target NG-RAN.

In an example, the T-AMF may send to the T-RAN a Handover Request (Source to Target transparent container, N2 MM Information, N2 SM Information list, Tracing Requirements). If the subscription information includes Tracing Requirements, the target AMF provides the target RAN with Tracing Requirements in the Handover Request. In an example, the handover request, one or more IEs of the handover request, and/or the like may comprise the one or more closed access group identifiers associated with the UE, the closed access group restriction indicator (a CAG-only indication, a CAG-only UE indication, a cell mobility restriction for the UE, and/or the like, the requested NSSAI for the CAG, allowed NSSAI per CAG, [mapping of (requested) NSSAI for the CAG], default configured NSSAI indication for one or more CAGs associated with the wireless device/UE, and/or the like.

In an example, the source to target transparent container, and/or the like may comprise the one or more closed access group identifiers associated with the UE, the closed access group restriction indicator (a CAG-only indication, a CAG-only UE indication, a cell mobility restriction for the UE, and/or the like, the requested NSSAI for the CAG, allowed NSSAI per CAG, [mapping of (requested) NSSAI for the CAG], default configured NSSAI indication for one or more CAGs associated with the wireless device/UE, and/or the like.

In an example, the T-AMF may determine T-RAN based on the Target ID, the one or more closed access group identifiers associated with the UE, the closed access group restriction indicator (a CAG-only indication, a CAG-only UE indication, a cell mobility restriction for the UE, and/or the like, the requested NSSAI for the CAG, allowed NSSAI per CAG, [mapping of (requested) NSSAI for the CAG], default configured NSSAI indication for one or more CAGs associated with the wireless device/UE, and/or the like. The T-AMF may allocate a 5G-GUTI valid for the UE in the AMF and target TAI. The Source to Target transparent container may be forwarded as received from S-RAN. N2 MM Information may comprise e.g., security information and Mobility Restriction List if available in the T-AMF. The N2 SM Information list may comprise N2 SM Information received from SMFs for the T-RAN in the Nsmf_PDUSession_UpdateSMContext Response messages received within allowed max delay supervised by the T-AMF. The Mobility Restriction List may be sent in N2 MM Information if available in the Target AMF. In an example, the mobility restriction list may further comprise the one or more closed access group identifiers associated with the UE, the closed access group restriction indicator (a CAG-only indication, a CAG-only UE indication, a cell mobility restriction for the UE, and/or the like, the requested NSSAI for the CAG, allowed NSSAI per CAG, [mapping of (requested) NSSAI for the CAG], default configured NSSAI indication for one or more CAGs associated with the wireless device/UE, and/or the like.

In an example, the T-RAN may send to the T-AMF a Handover Request Acknowledge (e.g., Target to Source transparent container, List Of PDU Sessions to Hand-over with for each PDU Session N2 SM information, List Of PDU Sessions failed to be setup with for each PDU Session N2 SM information containing the reason for failure). The Target to Source transparent container may comprise a UE container with an access stratum part and a NAS part. The UE container may be sent transparently via T-AMF, S-AMF and S-RAN to the UE. The T-RAN may create a List Of PDU Sessions failed to be setup and reason for failure (e.g., CAG restrictions, SMF decision, SMF response too late, or T-RAN decision, S-NSSAI is not available, unable to fulfill User Plane Security Enforcement, and/or the like) based on T-RAN determination. The information may be provided to the S-RAN. The N2 SM information in the List Of PDU Sessions to Hand-over, may comprise per each PDU Session ID T-RAN N3 addressing information e.g., N3 UP address and Tunnel ID of T-RAN for the PDU Session. The N2 SM information may further comprise: an Indication whether UP integrity protection is performed or not on the PDU Session, whether the PDU Session has at least one QoS Flow subject for data forwarding, N3 UP address and Tunnel ID of T-RAN for receiving forwarded data, and/or the like. The T-RAN may provide data forwarding addresses for each data forwarding tunnel which it decided/determined to setup.

In an example, the AMF may send to the SMF an Nsmf_PDUSession_UpdateSMContext Request (PDU Session ID, N2 SM response received from T-RAN, and/or the like). For each N2 SM response received from the T-RAN (N2 SM information included in Handover Request Acknowledge), the AMF may send the received N2 SM response to the SMF indicated by the respective PDU Session ID. If no new T-UPF is selected, SMF may store the N3 tunnel info of T-RAN from the N2 SM response if N2 handover is accepted by T-RAN. The SMF/UPF may allocate the N3 UP address and Tunnel IDs for indirect data forwarding corresponding to the data forwarding tunnel endpoints established by T-RAN. The SMF may send to the T-UPF an N4 Session Modification Request (e.g., T-RAN SM N3 forwarding Information list, indication to allocate DL forwarding tunnel(s) for indirect forwarding, and/or the like). If the SMF selected a T-UPF, the SMF may update the T-UPF by providing the T-RAN SM N3 forwarding information list by sending a N4 Session Modification Request to the T-UPF. If indirect forwarding applies based on indication from the S-RAN and the UPF is re-allocated and if the SMF determines/decides to setup the indirect forwarding tunnel on the same T-UPF, the SMF may request in the N4 Session Modification Request message to the T-UPF, to allocate DL forwarding tunnel(s) for indirect forwarding. Indirect forwarding may be performed via a UPF which is different from the T-UPF, in which case the SMF may select a T-UPF for indirect forwarding.

In an example, the T-UPF may send to the SMF an N4 Session Modification Response (T-UPF SM N3 forwarding Information list). The T-UPF may allocate Tunnel Info and may return an N4 Session Modification Response message to the SMF. The T-UPF SM N3 forwarding info list may comprise a T-UPF N3 address, a T-UPF N3 Tunnel identifiers for forwarding data.

In an example, the SMF may send to the S-UPF an N4 Session Modification Request (T-RAN SM N3 forwarding Information list or T-UPF SM N3 forwarding Information list, indication to allocate DL forwarding tunnel(s) for indirect forwarding). If the UPF is re-allocated, this message may comprise the T-UPF SM N3 forwarding info list. If the UPF is not re-allocated, this message may comprise the T-RAN SM N3 forwarding info list. If indirect forwarding applies based on indication from NG-RAN and UPF allocates tunnel identities, the SMF may indicate in the N4 Session Modification Request message to the S-UPF to allocate DL forwarding tunnel(s) for indirect forwarding. Indirect forwarding may be performed via a UPF which is different from the S-UPF.

In an example, the S-UPF may send to the SMF an N4 Session Modification Response (S-UPF SM N3 forwarding Information list). The S-UPF may allocate Tunnel Info and may return an N4 Session establishment Response message to the SMF. The S-UPF SM N3 forwarding Information list may comprise S-UPF N3 address, S-UPF N3 Tunnel identifiers for DL data forwarding, and/or the like.

The SMF may send to the T-AMF Nsmf_PDUSession_UpdateSMContext Response (N2 SM Information). The SMF may send an Nsmf_PDUSession_UpdateSMContext Response message per PDU Session to T-AMF. The SMF may create an N2 SM information comprising the DL forwarding Tunnel Info to be sent to the S-RAN by the AMF. The SMF may include this information in the Nsmf_PDUSession_UpdateSMContext response.

In an example, the T-AMF may send to the S-AMF, Namf_Communication_CreateUEContext Response (e.g., N2 information necessary for S-AMF to send Handover Command to S-RAN including Target to Source transparent container, PDU Sessions failed to be setup list, N2 SM information (N3 DL forwarding Information, PCF ID), and/or the like). The AMF may supervise the Nsmf_PDUSession_UpdateSMContext Response message from the involved SMFs. At expiry of the maximum wait time or when all Nsmf_PDUSession_UpdateSMContext Response messages are received, the T-AMF may send the Namf_Communication_CreateUEContext Response to the S-AMF. The PDU Sessions failed to be setup list may comprise the List Of PDU Sessions failed to be setup received from target RAN and the Non-accepted PDU session List generated by the T-AMF. Non-accepted PDU Session List may comprise following PDU Session(s) with proper cause value: Non-accepted PDU Session(s) by the SMF(s), Non-accepted PDU Session(s) by the AMF due to no response from the SMF within maximum wait time, Non-accepted PDU Session(s) by the AMF due to non-available S-NSSAI in the T-AMF, and/or the like. The Target to Source transport container may be received from the T-RAN. The N2 SM Information may be received from the SMF.

Figure 22:
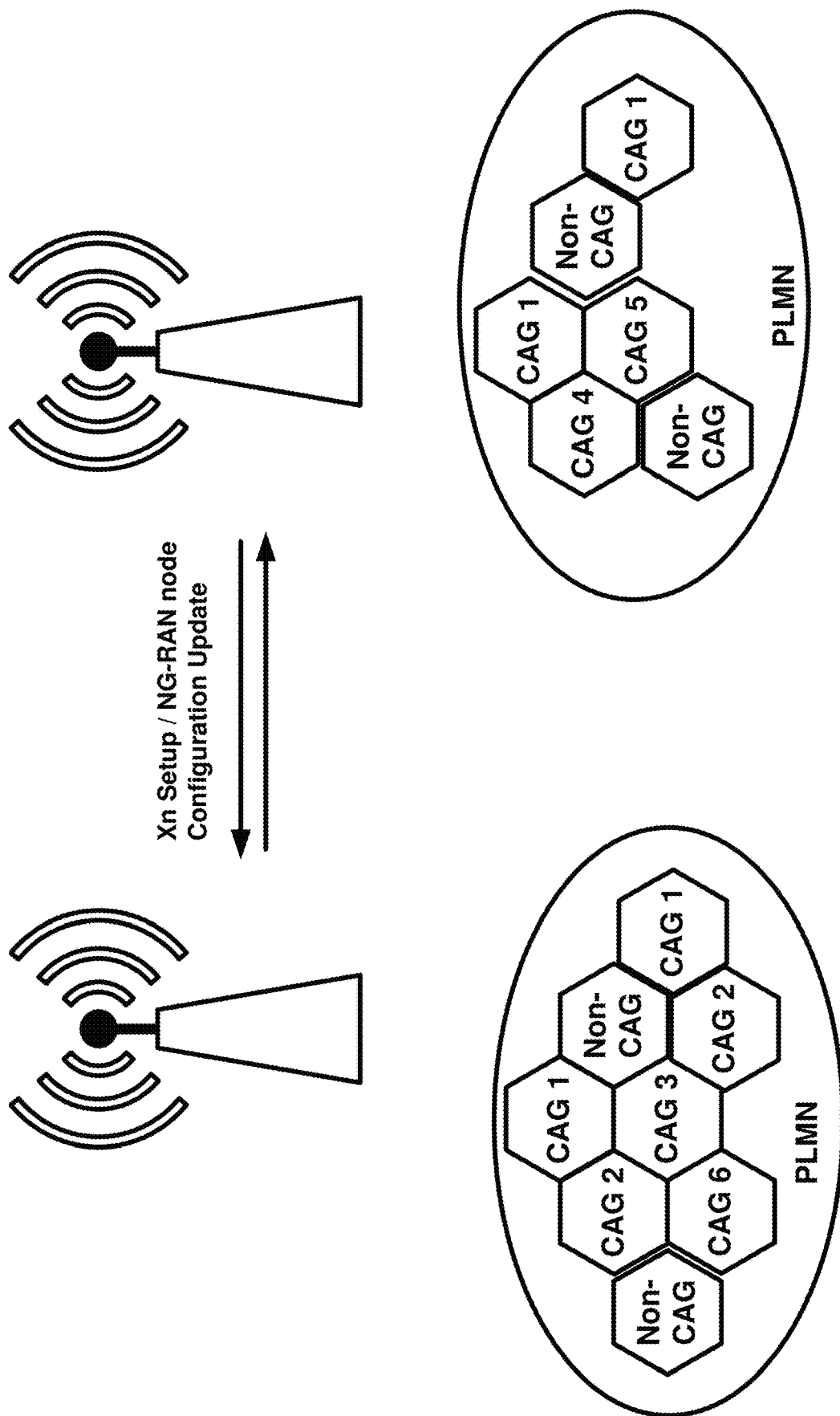
FIG. 22 is an example diagram as per an aspect of an embodiment of the present disclosure.

As depicted in an example FIG. 22, one or more NG-RAN, RAN, and/or the like may be associated to or serve one or more cells. The cells may be CAG cells or non-CAG cells, normal cells, and/or the like. The CAG cell may be identified within the scope of a PLMN. The CAG ID may be unique within the scope of a PLMN.

Figure 23:
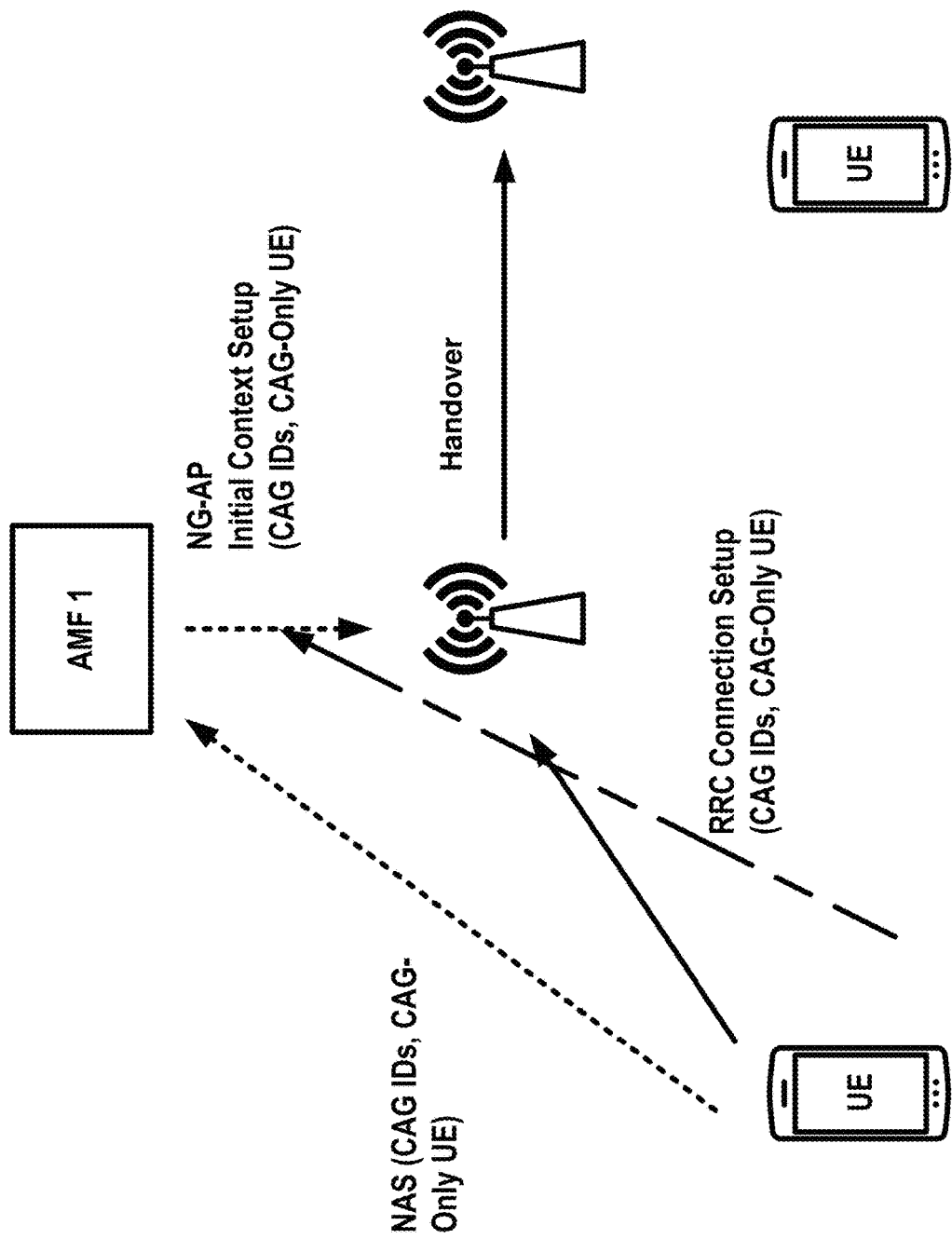
FIG. 23 is an example diagram as per an aspect of an embodiment of the present disclosure.
Figure 24:
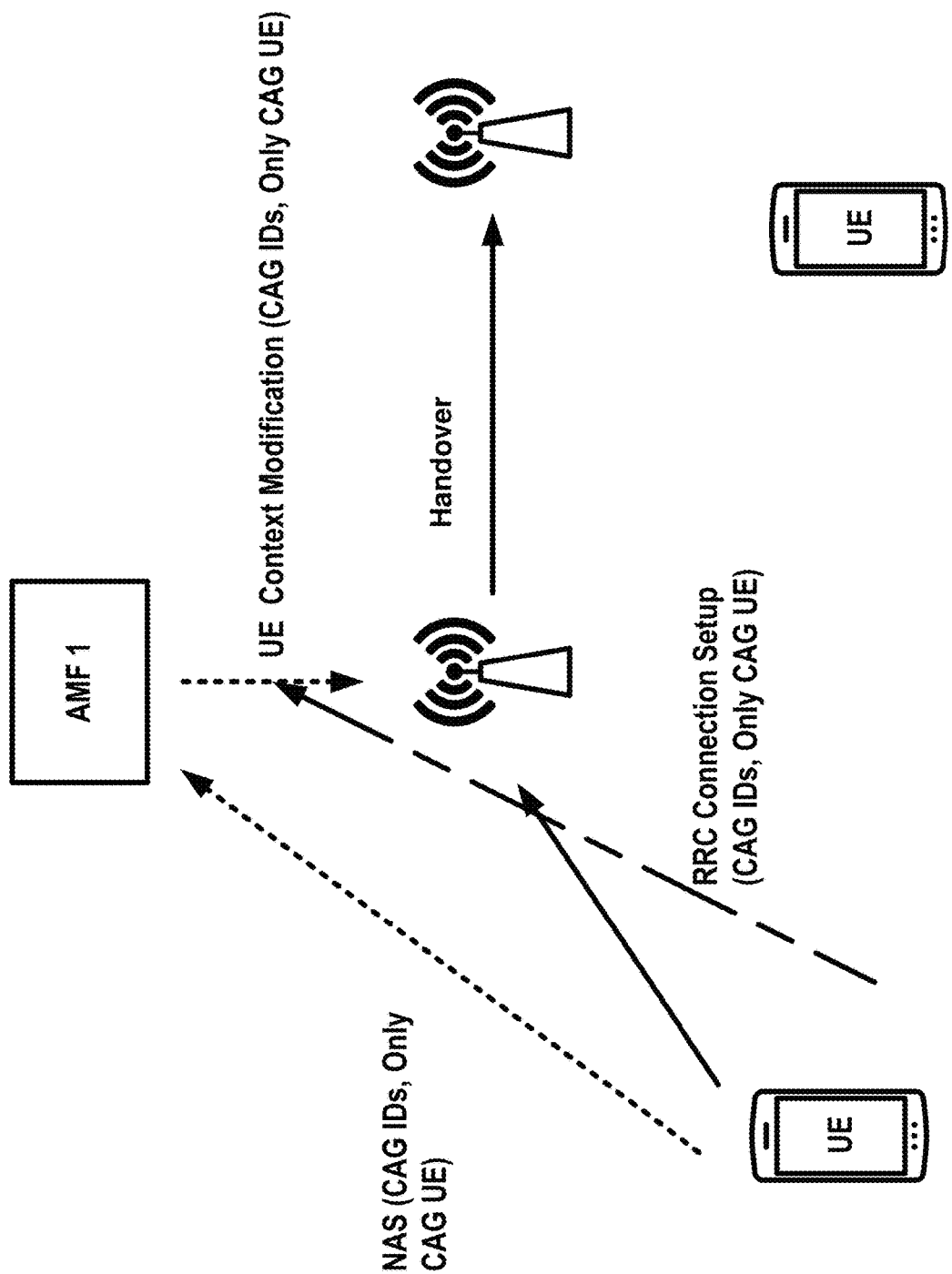
FIG. 24 is an example diagram as per an aspect of an embodiment of the present disclosure.

Example FIG. 23 and FIG. 24, depict a UE that may provide the configuration information of the UE to the network via a NAS message to the AMF or via an RRC message to the NG-RAN. The AMF may perform an initial context setup or context modification to the NG-RAN node. The NG-RAN node may employ the information during the handover procedure.

Figure 25:
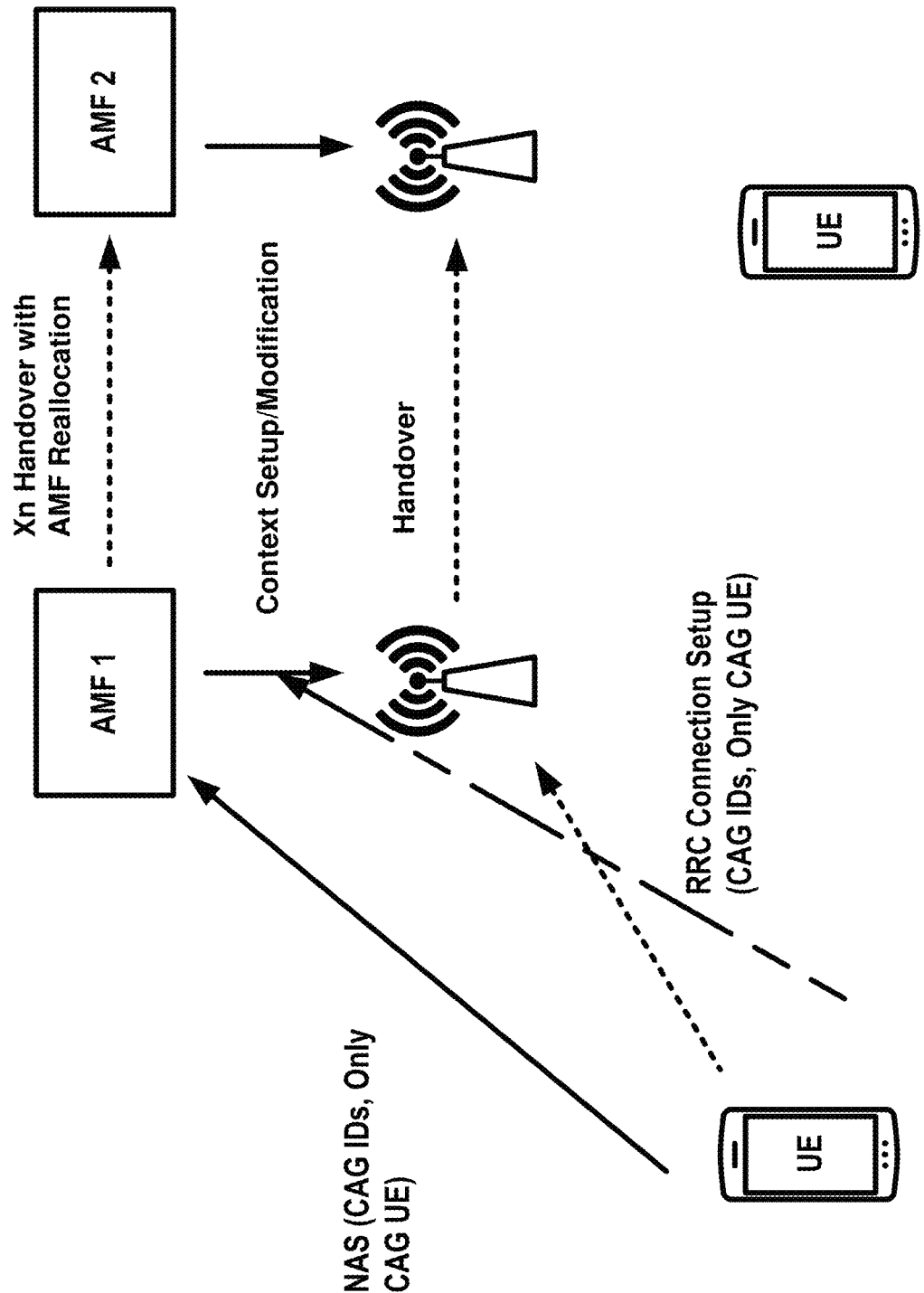
FIG. 25 is an example diagram as per an aspect of an embodiment of the present disclosure.

As depicted in example FIG. 25, a handover procedure with AMF reallocation may be performed.

Figure 26:
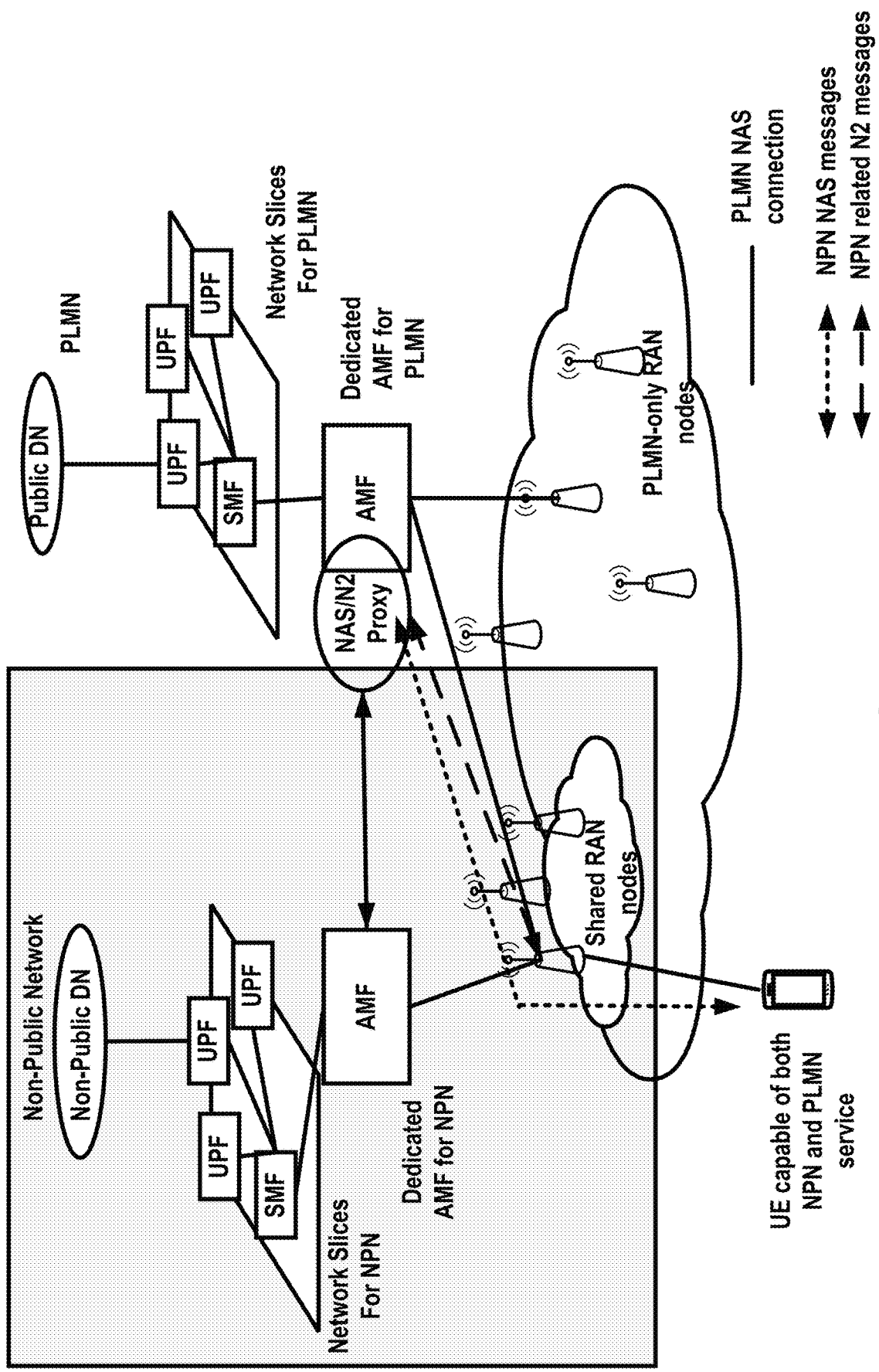
FIG. 26 is an example diagram as per an aspect of an embodiment of the present disclosure.

As depicted in example FIG. 26, a network model for hosting a Non-Public Network with a PLMN infrastructure may be employed. In this model, a Non-Public Network may be deployed using the infrastructure resources of a PLMN. Some RAN nodes may be shared by both the NPN and the PLMN so the UEs that are capable of both NPN and PLMN services may access both networks through these shared RAN nodes. Besides the shared RAN nodes, the NPN may have its dedicated network functions/resources such as dedicated AMFs, dedicated Network Slices, data network, and/or the like.

Figure 27:
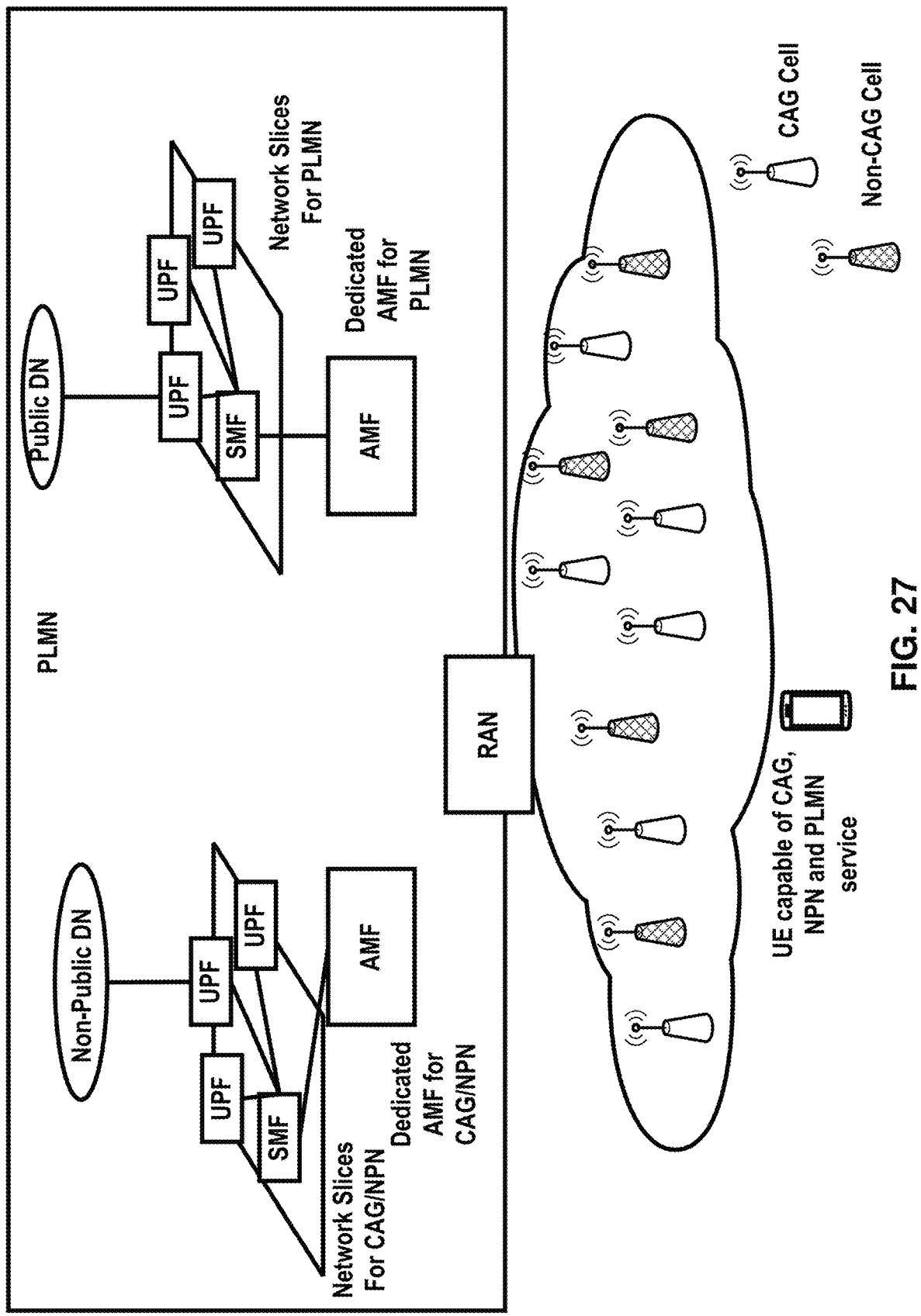
FIG. 27 is an example diagram as per an aspect of an embodiment of the present disclosure.

As depicted in example FIG. 27, Public network integrated NPNs are NPNs made available via PLMNs e.g., by means of dedicated DNNs, or by one (or more) Network Slice instances allocated for the NPN or a CAG. The existing network slicing functionalities may apply. When an NPN is made available via a PLMN, then the UE may have a subscription for the PLMN. As network slicing may not enable the possibility to prevent UEs from trying to access the network in areas which the UE is not allowed to use the Network Slice allocated for the NPN, Closed Access Groups may be employed in addition to network slicing to apply access control.

Figure 28:
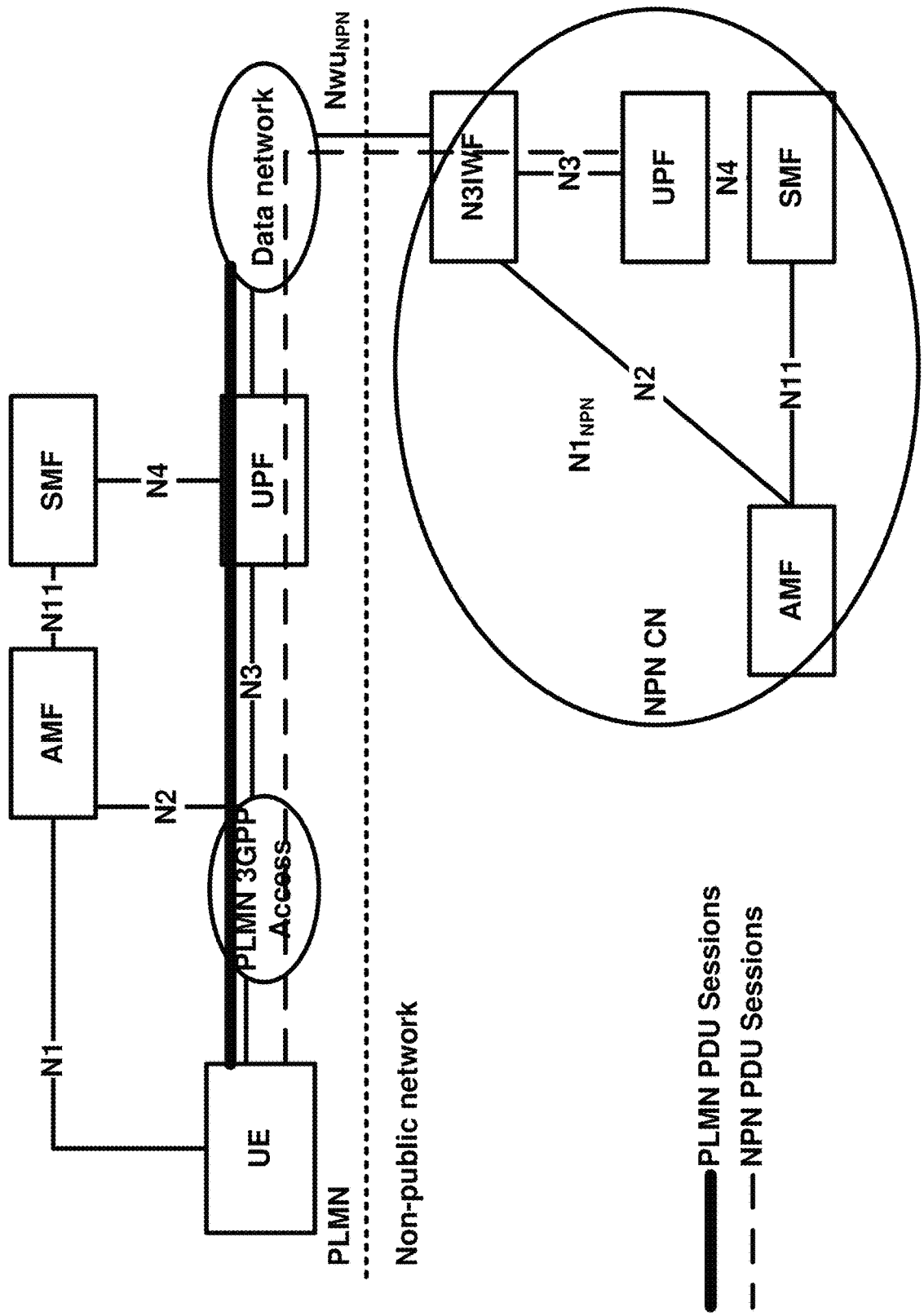
FIG. 28 is an example diagram as per an aspect of an embodiment of the present disclosure.
Figure 29:
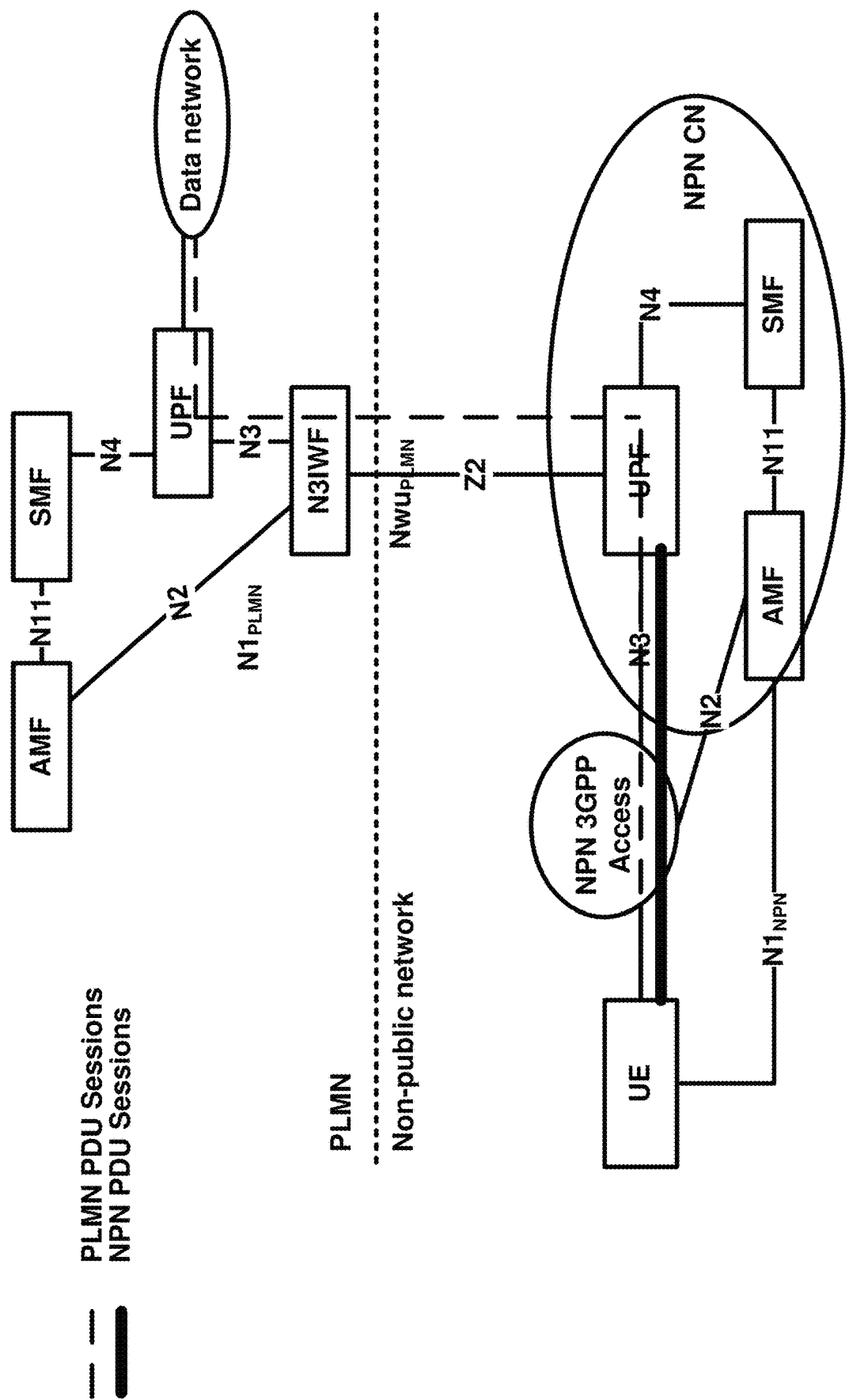
FIG. 29 is an example diagram as per an aspect of an embodiment of the present disclosure.

As depicted in example FIG. 28, and FIG. 29, non-public networks may be restricted for use by authorized subscribers and may not be available for public use. The UE may be authorized to use both a Public PLMN and non-public networks in which case, it may possible for the UE to obtain service continuity for services offered by Public PLMN via non-public network and vice versa.

Figure 30:
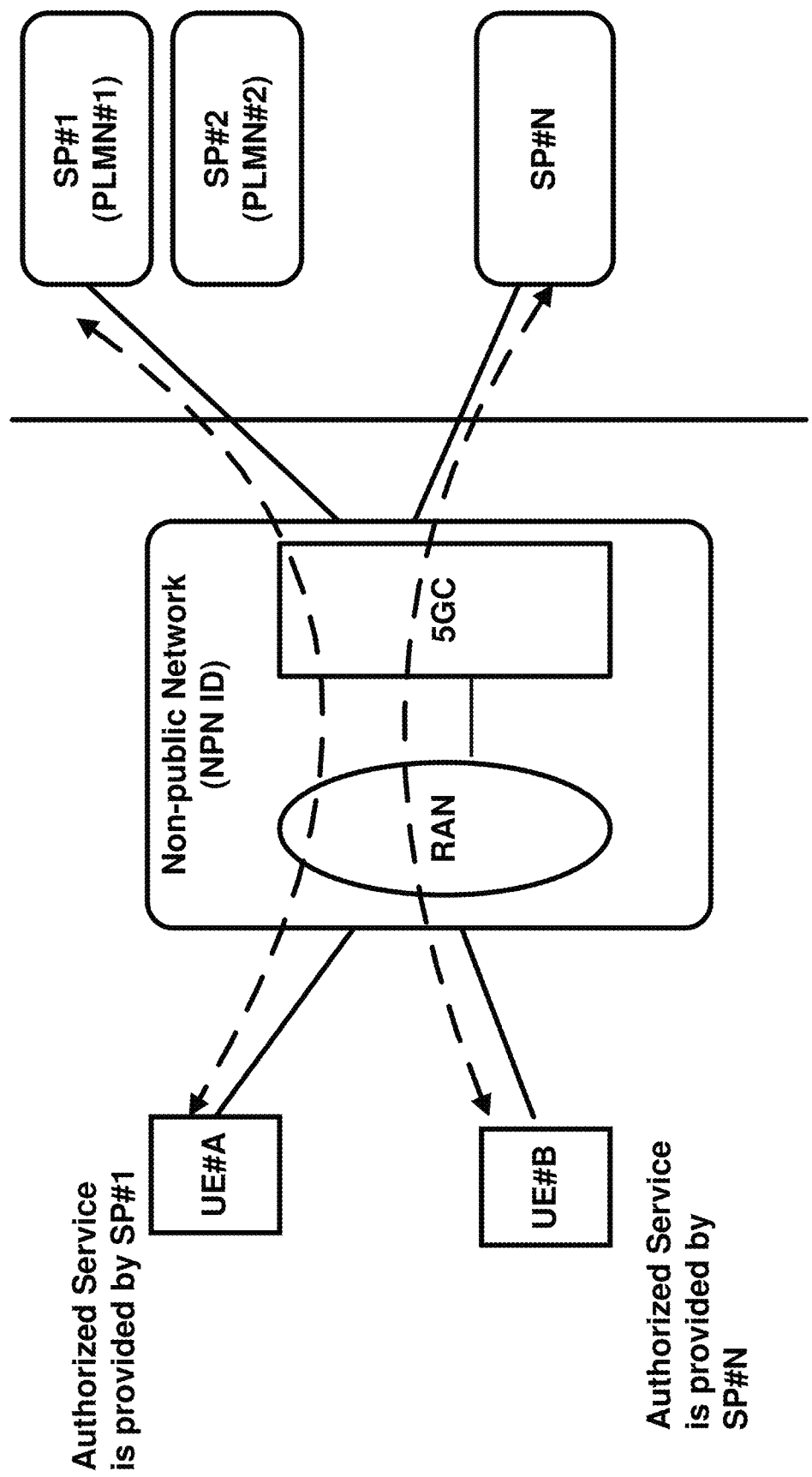
FIG. 30 is an example diagram as per an aspect of an embodiment of the present disclosure.
Figure 32:
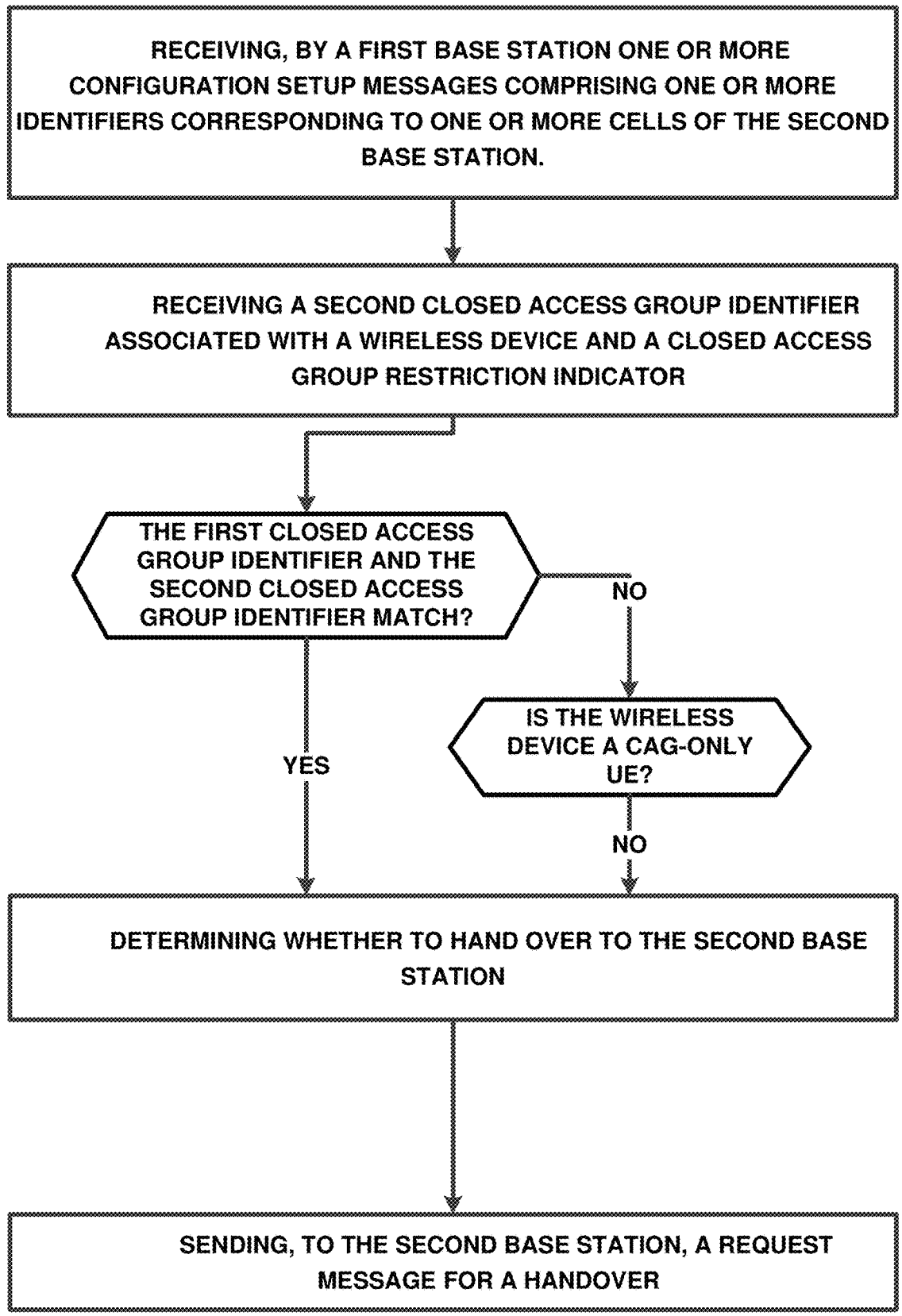
FIG. 32 is an example diagram as per an aspect of an embodiment of the present disclosure.

As depicted in example FIG. 30, a network may be identified with a non-public network identifier (e.g., NPN ID, NID, and/or the like) advertised in the broadcast channels of a non-public network cell. A non-public network may support services provided by one or more Service Providers (SP), which may comprise MNOs, 3rd party service provider, and/or the like. As depicted in example FIG. 30, UE #A and UE #B may be registered to the non-public network (NPN) identified by a Non-public network ID (NPN-ID). Service provider represented by SP #1, which is a PLMN, may provide the authorized service for UE #A. Service provider represented by SP #N, which is 3rd party service provider, may provide the authorized service for UE #B.

In an example, a first base station may receive from a second base station, a configuration setup message comprising a list of closed access group identifiers that one or more cells of the second base station support. The first base station may receive a closed access group restriction indicator indicating whether the wireless device is restricted to cells associated with closed access groups. The first base station may receive, from a wireless device, a measurement report message comprising the measurement results of a target cell of the second base station. The first base station may determine a handover for the wireless device to the target cell based on the configuration setup message, the measurement report, the closed access group restriction indicator, and/or the like. The first base station may send, to the second base station, a request message for the handover, the request message comprising an identifier of the closed access group of the wireless device, the closed access group restriction indicator, and/or the like.

In an example, a first base station may receive from a second base station, a configuration setup message comprising a first closed access group identifier for a first cell, and/or the like. The first base station may receive a second closed access group identifier, a closed access group restriction indicator, and/or the like. The first base station may determine a handover for a wireless device to the first cell based on the second closed access group identifier being identical to the first closed access group identifier. The first base station may send, to the second base station, a request message for the handover, the request message comprising the second closed access group identifier, the closed access group restriction indicator, and/or the like.

In an example, a first base station may receive, from a second base station, a configuration setup message comprising a first closed access group identifier for a first cell. The first base station may receive a second closed access group identifier and a closed access group restriction indicator indicating that the wireless device is restricted to cells associated with closed access groups. The first base station may determine not to handover for the wireless device to the first cell based on the closed access group restriction indicator, the second closed access group identifier being different from the first closed access group identifier, and/or the like. The first base station may send to the second base station, a handover failure message, the handover failure message may comprise a cause value for the handover failure.

In an example, a first base station may receive from a second base station, one or more configuration setup messages comprising one or more identifiers corresponding to one or more cells of the second base station, the one or more identifiers including a first closed access group identifier for a first cell of the one or more cells. The first base station may receive a second closed access group identifier associated with a wireless device and a closed access group restriction indicator indicating whether the wireless device is restricted to cells associated with closed access groups. The first base station may determine whether to hand over to the second base station based on the first closed access group identifier, the second closed access group identifier, the closed access group restriction indicator, and/or the like. The first base station may send to the second base station, a request message for a handover to the first cell based on the closed access group restriction indicator indicating that the wireless device is restricted to cells associated with closed access groups. The request message may comprise the second closed access group identifier, the closed access group restriction indicator, and/or the like.

In an example, the sending may be further based on the first closed access group identifier being the same as the second closed access group identifier. The first base station may determine not to handover the wireless device to the first cell based on the first closed access group identifier being different from the second closed access group identifier. The first base station may determine not to handover the wireless device to the first cell based on the closed access group restriction indicator indicating that the wireless device is restricted to cells associated with closed access groups, the first base station not supporting the second closed access group associated with the wireless device, and/or the like. The first base station may send the request message for the handover based on the closed access group restriction indicator indicating that the wireless device is not restricted to cells associated with closed access groups, the first base station supporting the second closed access group associated with the wireless device, and/or the like. The first base station may receive from the second base station a second configuration setup message comprising an identifier for a second cell that is not associated with a closed access group. The first base station may send to the second base station, a request message for a handover to the second cell based on the closed access group restriction indicator indicating that the wireless device is not restricted to cells associated with closed access groups.

In an example, a first base station may receive from a second base station, one or more configuration setup messages comprising one or more identifiers corresponding to one or more cells of the second base station. The one or more identifiers may include a first closed access group identifier for a first cell of the one or more cells. The first base station may receive a second closed access group identifier associated with a wireless device, wherein the second closed access group identifier is different from the first closed access group identifier. The first base station may receive a closed access group restriction indicator indicating whether the wireless device is restricted to cells associated with closed access groups. The first base station may send to the second base station a request message for a handover based on the one or more configuration setup messages further comprising an identifier for a second cell of the one or more cells wherein the second cell is not a closed access group cell, and/or the closed access group restriction indicator indicating that the wireless device is not restricted to cells associated with closed access groups wherein the request message may comprise the closed access group restriction indicator and requests a handover to the second cell.

In an example, the sending the request message for the handover to the second cell may be further based on the second closed access group identifier being different from the first closed access group identifier. In an example, the sending the request message for the handover to the second cell may be further based on receiving a measurement report from the wireless device indicating that the second cell is a handover target cell. In an example, determining not to send to the second base station the request message for the handover may be based on: the second closed access group identifier being different from the first closed access group identifier, and/or the closed access group restriction indicator indicating that the wireless device is restricted to cells associated with closed access groups. In an example, the first base station may determine not to send to the second base station the request message for the handover based on the second closed access group identifier being different from the first closed access group identifier, the closed access group restriction indicator indicating that the wireless device is not restricted to cells associated with closed access groups, a determination that the one or more configuration setup messages do not include the identifier for the second cell, and/or the like.

In an example embodiment as depicted in FIG. 31, a target base station may send to a source base station, a configuration setup message comprising a list of closed access group identifiers that one or more cells of the target base station supports. The target base station may receive a request for a handover to a target cell of the target base station. The request may comprise an identifier of the closed access group associated with a wireless device, a closed access group restriction indicator indicating whether the wireless device is restricted to cells associated with closed access groups, and/or the like. The target base station may determine whether to hand over to the target cell of the target base station based on the closed access group restriction indicator, the identifier of the closed access group associated with the wireless device, and/or the like. The source base station may select the target base station based on the configuration setup message. The selection of the target base station by the source base station may be based on the list of closed access group identifiers that one or more cells of the target base station supports. The configuration setup message may further comprise a mapping information for one or more S-NSSAIs associated with one or more closed access groups. The configuration setup message may comprise a Xn setup message. The configuration setup message may comprise a node configuration update message. The source base station may determine not to handover the wireless device to the target base station based on the closed access group associated with the wireless device being different from an identifier of the closed access group that the one or more cells of the target base station supports. The source base station may determine not to handover the wireless device to the first cell based on the closed access group restriction indicator indicating that the wireless device is restricted to cells associated with closed access groups, the target base station not supporting the closed access group associated with the wireless device, and/or the like. In an example, sending the request message for the handover may be based on the closed access group restriction indicator indicating that the wireless device is not restricted to cells associated with closed access groups, the first base station supporting the second closed access group associated with the wireless device, and/or the like. The source base station may receive from a wireless device an RRC message. The RRC message may comprise the closed access group restriction indicator, the identifier of the closed access group associated with the wireless device, and/or the like. The source base station may receive from an AMF, a context setup request comprising: the closed access group restriction indicator, the identifier of the closed access group associated with the wireless device, and/or the like. In an example, The AMF may receive from the wireless device the context setup request via a NAS message. The NAS message may comprise the closed access group restriction indicator, the identifier of the closed access group associated with the wireless device, and/or the like. The configuration setup message may further comprise a served cell information NR element. The served cell information NR element may comprise the list of closed access group identifiers that one or more cells of the target base station supports, the closed access group restriction indicator, the CAG-only indicator, and/or the like. The target base station may send to the source bases station a configuration setup response message comprising the list of closed access group identifiers that one or more cells of the target base station supports. The request message for the handover to the target base station may be further based on receiving a measurement report from the wireless device indicating that the target base station is a handover target base station. The request for a handover may comprise a handover request message. The handover request message may further comprise context information of the wireless device. The context information of the wireless device may comprise the closed access group restriction indicator, the identifier of the closed access group associated with the wireless device, and/or the like.

In an example embodiment, a first base station may receive from a second base station, a configuration setup message comprising: a list of closed access group identifiers that one or more cells of the second base station supports. The first base station may receive from an access and mobility management function a context setup request, indicating whether the wireless device is restricted to closed access groups (one or more restrictions), the connection request message comprising one or more closed access group identifiers that the wireless device requested/configured. The first base station may receive from a wireless device, a connection request message. The first base station may determine that a handover is required. The first base station may send to the second base station based on the determining, a handover request message indicating whether the wireless device is restricted to closed access groups (one or more restrictions). The handover request message may comprise the one or more closed access group identifiers that the wireless device requested/supports/configured.

In an example embodiment, a first access and mobility management function may receive from a base station, a message indicating that a handover is required, the message comprising an identifier of a closed access group, a closed access group restriction indicator, one or more S-NSSAIs associated with the closed access group, and/or the like. The first access and mobility management function may select a second access and mobility management function that supports the closed access group. the first access and mobility management function may send to a second access and mobility management function a handover request message comprising the one or more S-NSSAIs associated with the closed access group, the identifier of the closed access group, the closed access group restriction indicator, and/or the like. The message may further comprise an indication of whether the wireless device is restricted to closed access groups (one or more restrictions). The message may further comprise one or more closed access group identifiers that the wireless device requested.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 33 is a flow diagram as per an aspect of an example embodiment of the present disclosure. At 3310, the first base station may receive from a second base station, a message comprising a network slice configuration parameter associated with a closed access group that one or more cells of the second base station support. At 3320, the first base station may determine based on the network slice configuration parameter, a handover for the wireless device to a cell of the one or more cells. At 3330, the first base station may send to the second base station, a request message for the handover, the request message comprising an identifier of the closed access group of the wireless device.

In an example, the first base station may select the second base station based on the network slice configuration parameter associated with the closed access group that the one or more cells of the second base station support. In an example, the first base station may receive a radio resource control (RRC) message comprising mapping information for one or more single network slice selection assistance informations (S-NSSAIs) associated with the closed access group, or a default configured NSSAI indication for the closed access group. In an example, the first base station may receive from an access and mobility management function (AMF), a context setup request comprising: mapping information for one or more single network slice selection assistance informations (S-NSSAIs) associated with the closed access group, or a default configured NSSAI indication for the closed access group.

In an example, the message may comprise mapping information for one or more single network slice selection assistance informations (S-NSSAIs) associated with one or more closed access groups. In an example, the message may be a Xn setup message, a node configuration update message, and/or the like. In an example, the message may comprise a served cell information new radio (NR) element, wherein the served cell information NR element may comprise a list of closed access group identifiers that one or more cells of the second base station supports.

In an example, the first base station may send to the second base station, a configuration setup response message comprising a network slice configuration parameter associated with a closed access group that one or more cells of the first base station support.

In an example, the request for a handover may be a handover request message comprising context information of the wireless device. The context information of the wireless device may comprise a closed access group restriction indicator, an identifier of the closed access group.

In an example, the closed access group may be associated with a non-public network.

FIG. 34 is a flow diagram as per an aspect of an example embodiment of the present disclosure. At 3410, a first access and mobility management function may receive from a base station, a message indicating that a handover is required, the message comprising an identifier of a closed access group. At 3420, the first access and mobility management function may select a second access and mobility management function that supports the closed access group. At 3430, the first access and mobility management function may send to the second access and mobility management function a handover request message comprising a network slice configuration parameter associated with the closed access group.

In an example, the message may further comprise an indication of whether the wireless device is restricted to closed access groups (one or more restrictions). In an example, the message may comprise one or more closed access group identifiers that the wireless device requested. The message may comprise an identifier of a non-public network. In an example, the message may comprise mapping information for one or more single network slice selection assistance informations (S-NSSAIs) associated with the closed access group.

In an example, the selection may be based on the indication. In an example, the selection may be based on the second access and mobility management function supporting a non-public network.

In an example, the handover request message may comprise a network slice configuration parameter for a non-public network.

In an example, the first access and mobility management function may receive from the second access and mobility management function, a response message indicating acceptance of the request.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1, cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
    receiving, by a first base station from a second base station, a next generation radio access network (NG-RAN) node configuration update message comprising:
        a neighbor information evolved universal mobile telecommunications system terrestrial radio access (E-UTRA) information element (IE);
        a served cells new radio (NR) to add IE;
        a slice identifier of a first network slice supported by a cell of the second base station, wherein the cell is identified by the served cells NR to add IE; and
        a second served cell information NR IE indicating that the cell of the second base station is in a second closed access group (CAG), wherein the neighbor information E-UTRA IE is distinct from the second served cell information NR IE;
    sending, by the first base station to the second base station, an NG-RAN configuration update acknowledge message comprising a first served cell information NR IE indicating that a cell of the first base station is in a first CAG; and
    sending, by the first base station to the second base station, a handover request message to handover a wireless device to the cell of the second base station.

2. The method of claim 1, wherein the NG-RAN configuration update message further comprises parameters of one or more cells of the second base station, wherein the parameters indicate the neighbor information E-UTRA IE and the served cells NR to add IE.

3. The method of claim 1, wherein the cell of the second base station is of one or more cells of the second base station.

4. The method of claim 1, wherein the served cells NR to add IE further comprises an NR physical cell identifier (NR-PCI) of the cell of the second base station.

5. The method of claim 1, wherein the sending, by the first base station to the second base station, the NG-RAN configuration update acknowledge message is in response to receiving the served cells NR to add IE.

6. The method of claim 1, further comprising receiving, by the first base station from the wireless device, one or more messages comprising:
    an identifier of the cell of the second base station;
    a measurement report of a signal strength for the cell;
    a slice identifier of the first network slice; and
    an indication that the wireless device is allowed to access the first CAG.

7. The method of claim 1, further comprising determining, by the first base station, to send the handover request message for handover of the wireless device to the cell of the second base station based on:
    a measurement report received from the wireless device; and
    the cell being in the first CAG.

8. The method of claim 1, wherein the handover request message comprises an identifier of the cell of the second base station.

9. The method of claim 1, further comprising selecting, by the first base station, the second base station based on parameters of the NG-RAN node configuration update message.

10. The method of claim 1, wherein the message further comprises mapping information of the slice identifier to one or more CAGs.

11. A first base station comprising:
    one or more processors;
    memory storing instructions that, when executed by the one or more processors, cause the first base station to:
    receive, from a second base station, a next generation radio access network (NG-RAN) node configuration update message comprising:
        a neighbor information evolved universal mobile telecommunications system terrestrial radio access (E-UTRA) information element (IE);
        a served cells new radio (NR) to add IE;
        a slice identifier of a first network slice supported by a cell of the second base station; and
        a second served cell information NR IE indicating that the cell of the second base station is in a second closed access group (CAG), wherein the neighbor information E-UTRA IE is distinct from the second served cell information NR IE;
    send, to the second base station, an NG-RAN configuration update acknowledge message comprising a first served cell information NR IE indicating that a cell of the first base station is in a first CAG; and
    send, to the second base station, a handover request message to handover a wireless device to the cell of the second base station.

12. The first base station of claim 11, wherein the NG-RAN configuration update message further comprises parameters of one or more cells of the second base station, wherein the parameters indicate the neighbor information E-UTRA IE and the served cells NR to add IE.

13. The first base station of claim 11, wherein the cell of the second base station is of one or more cells of the second base station.

14. The first base station of claim 11, wherein the served cells NR to add IE further comprises an NR physical cell identifier (NR-PCI) of the cell of the second base station.

15. The first base station of claim 11, wherein the sending the NG-RAN configuration update acknowledge message is in response to receiving the served cells NR to add IE.

16. The first base station of claim 11, wherein the instructions further cause the first base station to receive, from the wireless device, one or more messages comprising:
- an identifier of the cell of the second base station;
- a measurement report of a signal strength for the cell;
- a slice identifier of the first network slice; and
- an indication that the wireless device is allowed to access the first CAG.

17. The first base station of claim 11, wherein the instructions further cause the first base station to determine to send the handover request message for handover of the wireless device to the cell of the second base station based on:
- a measurement report received from the wireless device; and
- the cell being in the first CAG.

18. The first base station of claim 11, wherein the handover request message comprises an identifier of the cell of the second base station.

19. The first base station of claim 11, wherein the instructions further cause the first base station to select the second base station based on parameters of the NG-RAN node configuration update message.

20. A first base station comprising:
one or more processors;
memory storing instructions that, when executed by the one or more processors, cause the first base station to:
- receive, from a second base station, a next generation radio access network (NG-RAN) node configuration update message comprising:
  - a slice identifier of a first network slice supported by a cell of the second base station; and
  - a second served cell information NR IE indicating that the cell of the second base station is in a second closed access group (CAG), wherein a neighbor information evolved universal mobile telecommunications system terrestrial radio access (E-UTRA) information element (IE) is distinct from the second served cell information NR IE;
- send, to the second base station, an NG-RAN configuration update acknowledge message comprising a first served cell information NR IE indicating that a cell of the first base station is in a first CAG; and
- send, to the second base station, a handover request message to handover a wireless device to the cell of the second base station.

\* \* \* \* \*